United States Patent [19]
Tagawa et al.

[11] Patent Number: 5,949,152
[45] Date of Patent: Sep. 7, 1999

[54] METHOD OF AND SYSTEM FOR ENTERING IDENTIFICATION CODES INTO VEHICLE ANTITHEFT SYSTEM

[75] Inventors: Hiroshi Tagawa; Atsushi Okamitsu; Hiroshi Fujimoto, all of Hiroshima, Japan

[73] Assignee: Mazda Motor Corporation, Hiroshima, Japan

[21] Appl. No.: 08/908,932

[22] Filed: Aug. 8, 1997

[30] Foreign Application Priority Data

Aug. 8, 1996 [JP] Japan .................................. 8-209965

[51] Int. Cl.⁶ .................................................. B60R 25/04
[52] U.S. Cl. .......................................... 307/10.5; 180/287
[58] Field of Search ................................. 307/10.1–10.6; 180/287; 340/425.5, 426, 825.3–825.32, 825.34, 825.44, 825.54, 825.69, 825.72

[56] References Cited

U.S. PATENT DOCUMENTS

| | | | |
|---|---|---|---|
| 5,508,694 | 4/1996 | Treharne et al. | 340/825.31 |
| 5,621,380 | 4/1997 | Mutoh et al. | 307/10.5 |
| 5,635,916 | 6/1997 | Bucholtz et al. | 307/10.3 |
| 5,798,576 | 8/1998 | Ostermann et al. | 307/10.2 |

FOREIGN PATENT DOCUMENTS

| | | |
|---|---|---|
| 08040206 | 2/1996 | Japan . |
| 08-150899 | 3/1996 | Japan . |
| 08185579 | 7/1996 | Japan . |

*Primary Examiner*—Richard T. Elms
*Attorney, Agent, or Firm*—Sixbey, Friedman, Leedom & Ferguson, P.C.; Donald R. Studebaker

[57] ABSTRACT

In a vehicle antitheft system having an immobilizer unit which reads in an identification code generated by and transmitted from an ignition key of the type having a built-in signal transmitter, an ID code of a first ignition key is tentatively stored in the immobilizer unit until different ID codes of first and second ignition keys are registered even in the event where ID code entry operation is interrupted before registration of the first and second keys' ID codes during an entry of the first ignition key ID code and is resumed with the second ignition key.

15 Claims, 36 Drawing Sheets

FIG. 9A

| ELEMENT | FAULT TYPE | FAULT CODE |
|---|---|---|
| EGI UNIT | COMMUNICATION LINE BREAKING DOWN BETWEEN IM UNIT AND EGI UNIT | X1 |
| | ABSENCE OF CONSISTENCY BETWEEN CWs | X2 |
| | ABSENCE OF CONSISTENCT BETWEEN IDs | X3 |
| | UNSUCCESSFUL ID/CW REGISTRATION | X4 |
| | DISAPPEARANCE OF ID | X5 |
| | DISAPPEARANCE OF CW | X6 |
| | ZERO COUNT | X7 |

FIG. 9B

| ELEMENT | FAULT TYPE |
|---|---|
| TRANSPONDER | NOT REGISTERED ID |
| | DAMAGE OF TRANSPONDER |
| COIL ANTENNA | DAMAGE OF COIL (INCLUDING HARNESS BREAKING DOWN) |
| IM UNIT | DISORDER OF EEPROM |
| | DISCONNECTION OF BATTERY |
| | COMMUNICATION LINE BREAGING DOWN |

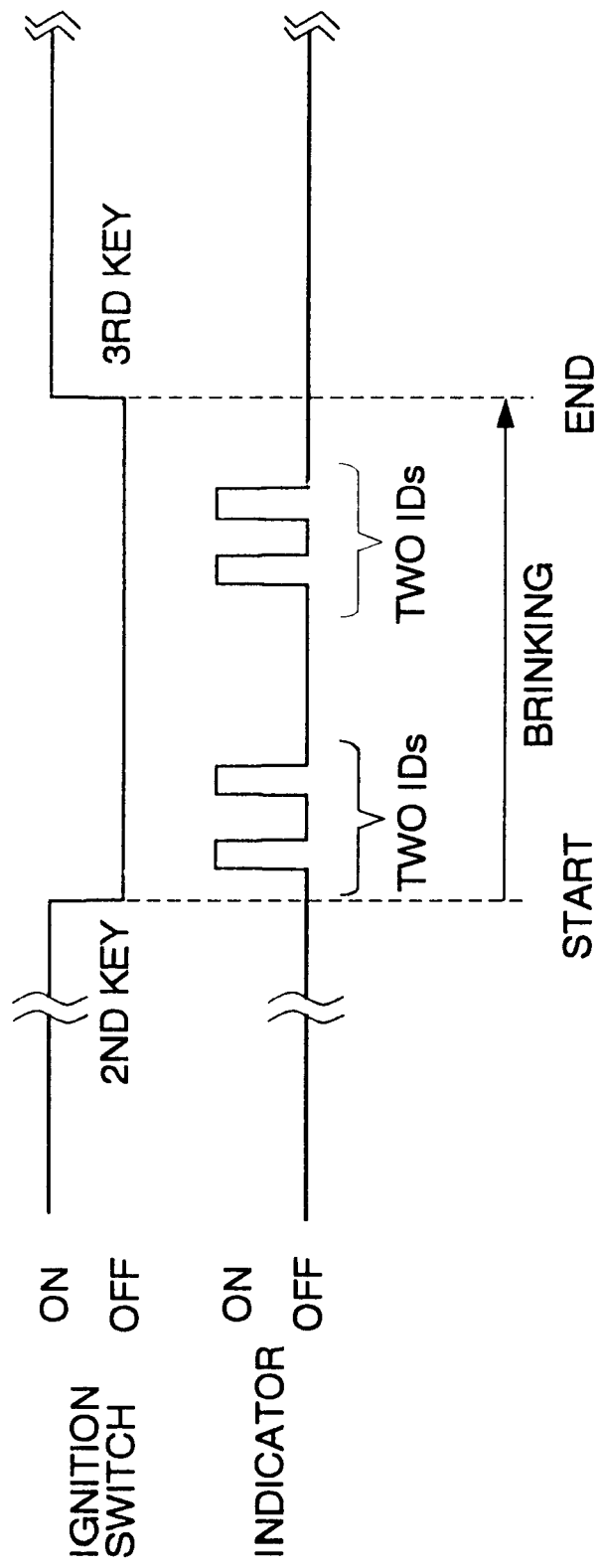

METHOD OF AND SYSTEM FOR ENTERING IDENTIFICATION CODES INTO VEHICLE ANTITHEFT SYSTEM

BACKGROUND OF THE INVENTION

1. Field of the Invention

This invention relates to a method of and a system for entering identification codes into a vehicle antitheft system.

2. Description of Related Art

In order to cope with frequent occurrence of vehicle thefts in recent years, various vehicle antitheft devices and systems have been proposed. One of the vehicle antitheft systems is called an immobilizing system comprising an identification code dispatching key and an immobilizer unit which monitors an identification code (which is hereafter referred to as an ID code) dispatched from the key to prevent an engine controlling unit (EGI) from actuating the engine when an ignition switch is turned on in the event that the key is identified as incorrect based on the ID code. Such a vehicle antitheft system is known from, for example, Japanese patent application No. 6 - 181146, filed on Aug. 2, 1994, by the applicant of this application and now opened to the public as Japanese Unexamined Patent Publication No. 8 - 40206.

Another type vehicle antitheft system employs encoded words (which are hereafter referred to as CWs) for permitting the engine controlling unit (EGI) to actuate the engine as is known from, for example, Japanese patent application No. 6 - 297086, filed on Nov. 30, 1994, by the applicant of this application and opened to the public as Japanese Unexamined Patent Publication No. 8 - 150899. Specifically, the immobilizer unit compares an ID code of a key read in through a transponder with an ID code registered therein and transfers a word code, different in form from these ID codes, to the engine controlling uniy (EGI) whenever verifying the coincidence between these ID codes for another verification of the coincidence between the word code from the immobilizer unit and a word code registered in the engine controlling unit (EGI). The immobilizer unit transfers a permission command signal to the engine controlling unit (EGI) to permit it to actuate the engine only when the engine controlling unit (EGI) verifies the coincidence between these encode words.

With regard to a vehicle antitheft system of the type in which, when an ID code of an ignition key read in through a transponder coincidents with an ID code stored in an immobilizer, a command signal is transmitted to an engine controlling unit from the immobilizer to permit the engine controlling unit to perform control of the engine, it has been proposed in Japanese patent application No. 6 - 340176, filed by the applicant of this application that the vehicle antitheft system is shifted to an additional code entry mode for altering ID codes in the immobilizer unit and the engine controlling unit when different ID codes of ignition keys read through the transponder are coincident with ID codes stored in the immobilizer. This prohibits the vehicle antitheft system to shift to the additional code entry mode with only one approved ignition key, so as to improve prevention against theft of the vehicle.

In order for the conventional vehicle antitheft systems to shift to the additional code entry mode, it is generally simple to verify coincidence between at least two different ID codes. However, in the event, for example, where ID code entry operation is interrupted for some reasons before entry of an ID code of the second ignition key in the immobilizer unit and/or the engine controlling unit, because there is only one or no ID code registered in the vehicle antitheft system, it is impossible to resume the ID code entry operation even when the vehicle antitheft system is in the additional code entry mode or to shift the vehicle antitheft system to shift to the additional code entry mode for another entry of ID codes. Further, in the vehicle assembly factory where assembling operation must be strictly controlled according to a time schedule, manually shifting the vehicle antitheft system to the additional code entry mode which is usually complicated is troublesome and unpractical in view of working efficiency. In addition, when it is intended to enter a plurality of ID codes in the vehicle antitheft system, newly or additionally, it is possible to make a double entry of a same ID code.

SUMMARY OF THE INVENTION

It is accordingly an object of the invention to provide a vehicle antitheft system and a method of entering ID codes into the vehicle antitheft system which permits ID code entry operation all over again even in the event where the ID code entry operation is interrupted for some reasons before at least two different ID codes are entered.

It is another object of the invention to provide a vehicle antitheft system and a method of entering ID codes into the vehicle antitheft system which prevents double entry of a same ID code, so as to improve ID code entry convenience and work efficiency in ID code entry.

The foregoing object of the invention is accomplished by providing a vehicle antitheft system comprising an ignition key of a type having a built-in signal transmitter for transmitting a first code assigned to the ignition key and code verifying means for reading in the first code of an ignition key of the type upon operation of the ignition key, comparing the first code read therein with a plurality of second codes registered in memory means and transmitting an engine actuation command to engine controlling means so as to permit the engine controlling means to perform control of operation of the engine when there is a specified relationship between the first code and any one of the second codes in the memory means. The vehicle antitheft system shifts its operation mode to a code alteration mode in which the second codes in the memory means are permitted to be altered when the code verifying means reads in at least two the first codes different from each other having a specified relationship, for example coincidence, with respect to the second codes in the memory means, and to a code registration mode in which the second codes are registered in the memory means. The first code transmitted from the signal transmitter is stored in a tentative memory means in the code registration mode, and at least two of the first codes are registered in the memory means when the tentative memory means becomes ready for storage of the at least two first codes.

With the vehicle antitheft system of the invention, until the memory means becomes rady for registration of at least more than two first codes, the first codes read in from the signal transmitters of the ignition keys are tentatively stored in a tentative memory means. Accordingly, the vehicle antitheft system permits first code entry operation all over again even in the event where the first code entry operation is interrupted for some reasons before at least two different first codes are entered and registered.

BRIEF DESCRIPTION OF THE DRAWINGS

The above and other objects and features of the present invention will be understood from the following description of a specific embodiment thereof when considering in conjunction with the accompanying drawings, in which:

FIG. 9A is a table showing fault types and their codes;

FIG. 9B is a table showing fault types of various elements;

FIG. 25 is a time chart of operation of the indicator with respect to operation of the ignition switch for an indication of the number of entered ID codes according to the sequence routine shown in FIG. 24;

DETAILED DESCRIPTION OF THE SPECIFIC EMBODIMENT

Figure 1:
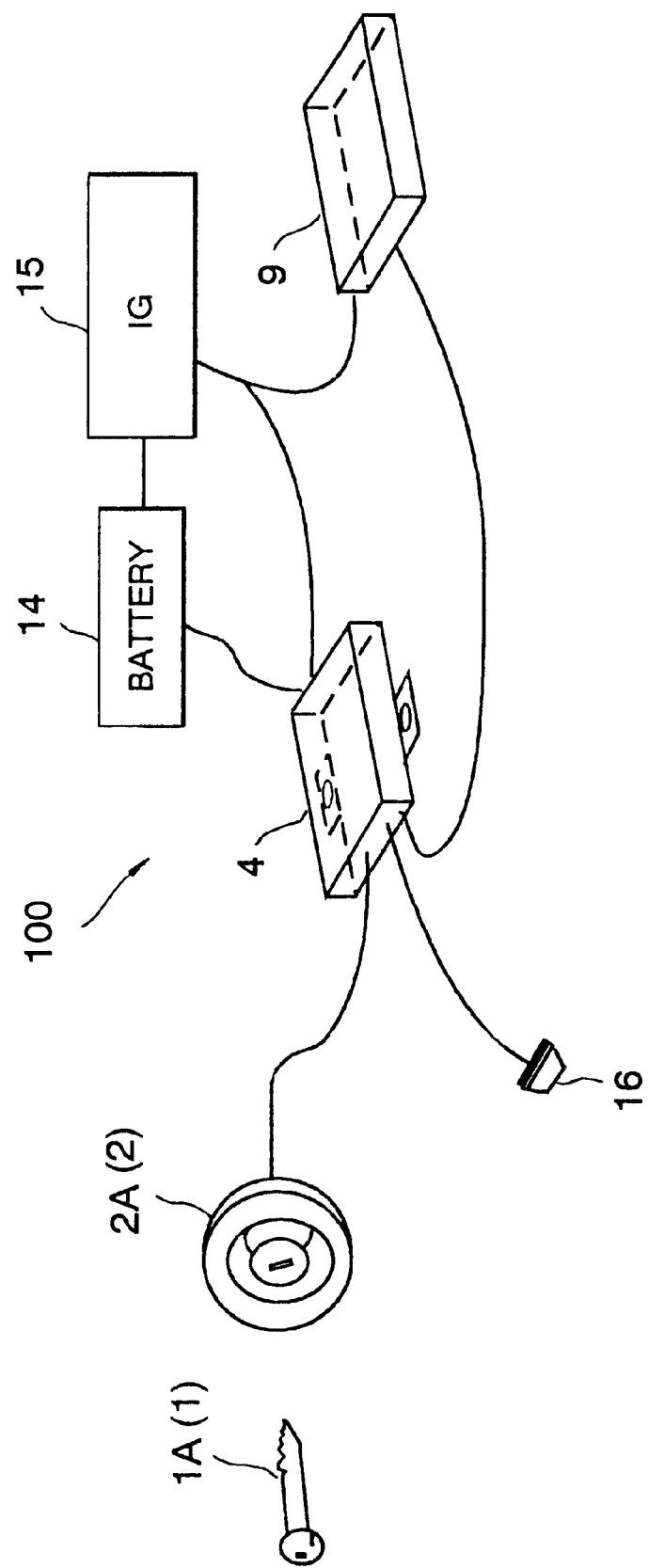
FIG. 1 is a schematic illustration of a vehicle antitheft system in accordance with an embodiment of the invention.
Figure 2:
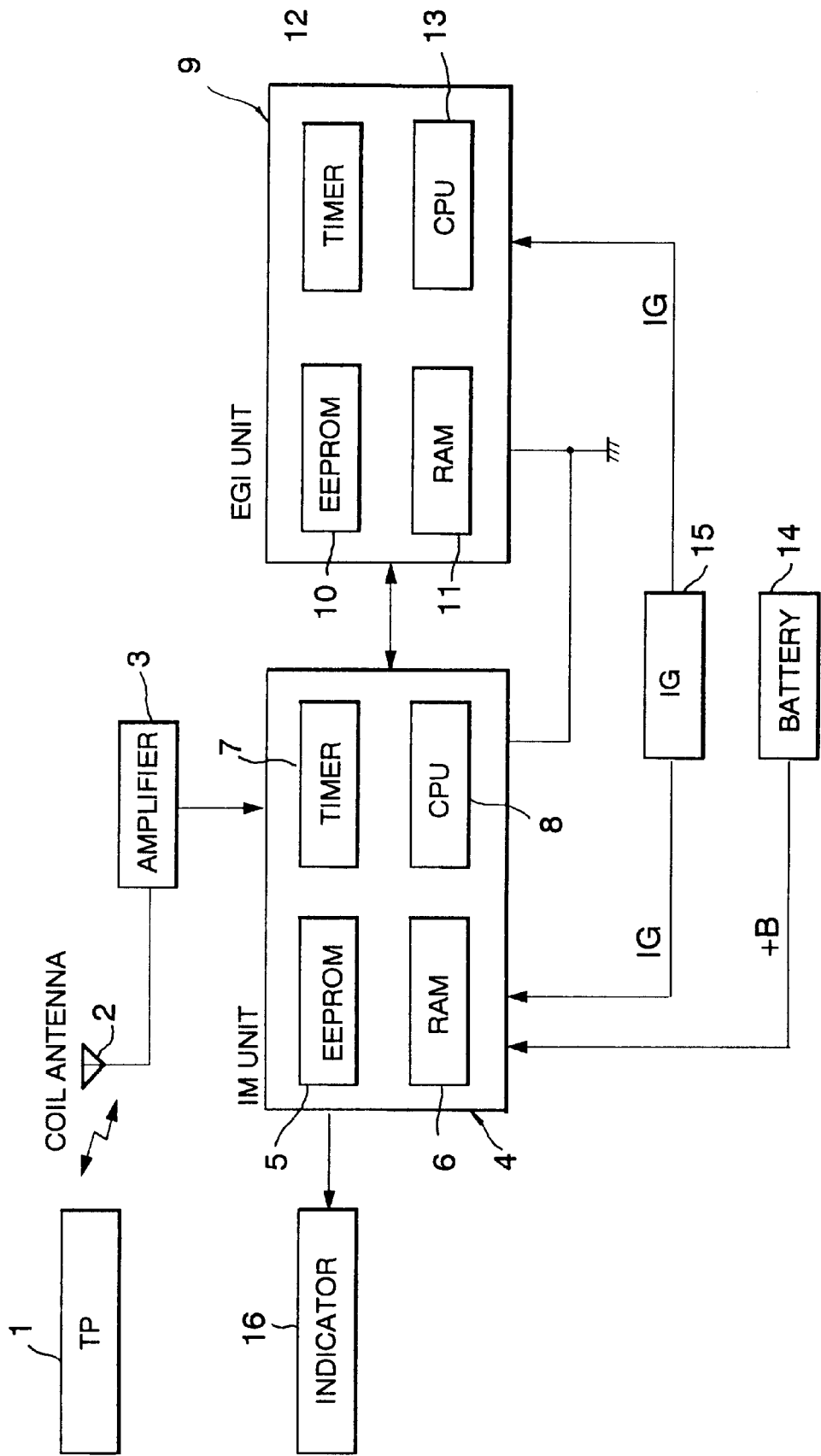
FIG. 2 is a block diagram showing the vehicle antitheft system.

Referring to the drawings in detail, particularly to FIGS. 1 and 2 which show a vehicle antitheft system 100 in accordance with an embodiment of the invention, the vehicle antitheft system 100 includes a transponder 1 incorporated within an ignition key 1A which a driver operates to turn on and off an ignition switch (IG) 15 and a coil antenna 2 incorporated in a key cylinder 2A to receive a signal generated by the transponder 1. The antenna 2 is connected to an immobilizer unit (IM) 4, which has been developed for the vehicle antitheft purpose, through an amplifier 3. The immobilizer unit (IM) 4 is connected to a power source battery (+B) 14, directly and through the ignition switch (IG) 15 and transfers signals to and from an engine controlling unit (EGI) 9. The coil antenna 2 generates in response to turning on and off of the ignition switch (IG) 15 a signal by means of which the amplifier 3 provides a voltage amplified to a specific level. The immobilizer unit (IM) 4 prohibits the engine control unit 9 from starting an engine (not shown). Specifically, when the ignition key 1A is operated to turn off the ignition switch (IG) 15 or when the immobilizer unit (IM) 4 verifies an absence of coincidence between an ID code (ID) of the ignition key 1A and an ID code (ID) registered in the immobilizer unit (IM) 4, the immobilizer unit (IM) 4 automatically changes the function mode of engine controlling unit (EGI) 9 to a lock mode in which the engine controlling unit (EGI) 9 is prohibited to start the engine.

Immobilizer unit (IM) 4 is activated and deactivated according to on-off operation of the ignition switch (IG) 15 and, when energized, reads in an ID code (ID) of the ignition key 1A through the transponder 1 based on the specific level of voltage to transmit a control command to the engine controlling unit (EGI) 9. The immobilizer unit (IM) 4 remains energized by means of the power source battery 14 even when the ignition key 1A is operated to turn off the ignition switch (IG) 15 in order to stop the engine. An indicator 16, which is installed in an instrument panel so as to be visible to the driver, comprising an light emitting diode (LED) lights up, blinks on and off or goes out according to the result of the comparison of the ID codes (IDs) in the immobilizer unit (IM) 4.

Immobilizer unit (IM) 4 comprises an EEP read only memory (ROM) 5 to store various control programs and ID code (ID), a random access memory (ROM) 6 to tentatively store ID code (ID) transferred from and to the transponder 1 and the engine controlling unit (EGI) 9, a timer 7 which times transfer the ID code (ID) between the memories 5 and 6, and a central processing unit (CPU) 8 to timely control transfer of data from and/or to the transponder 1 and the engine controlling unit (EGI) 9.

Engine controlling unit (EGI) 9, which controls engine operation and fuel injection, comprises an EEP read only memory (ROM) 10 to store various engine control programs and ID code (ID), a random access memory (RAM) 11 to tentatively store an ID code (ID) transferred from and to the transponder 1 and the immobilizer unit (IM) 4, a timer 12 which times transfer the ID code (ID) between the memories 10 and 11, and a central processing unit (CPU) 13 to timely control transfer of data from and to the immobilizer unit (IM) 4. The engine controlling unit (EGI) 9 receives control commands, namely an unlock command for ordinary engine operation and a lock command for fuel injection interruption. In this instance, differently from the immobilizer unit (IM) 4, the engine controlling unit (EGI) 9 is connected to the power source battery 14 only through the ignition switch (IG) 15, so as to be deactivated when the ignition key 1A is operated to turn off the ignition switch (IG) 15 and stop the engine.

Figure 3:
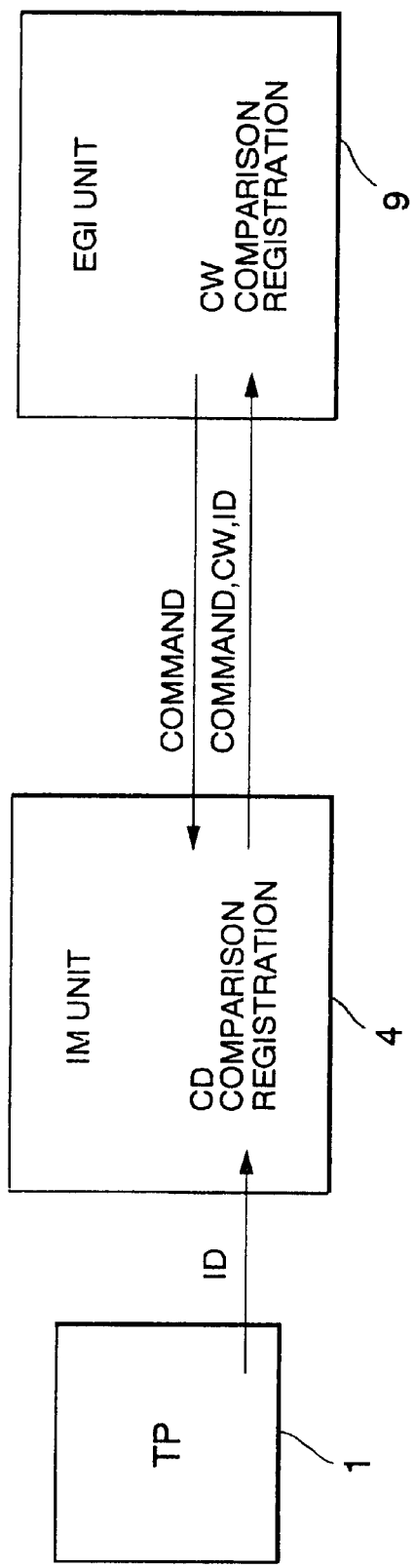
FIG. 3 is a functional block diagram showing data communication in the vehicle antitheft system.

FIG. 3 shows data transfer in the vehicle antitheft system. As shown, the immobilizer unit (IM) 4 reads an ID code (ID) of an ignition key 1A used to start the engine through the transponder 1 incorporated in the ignition key 1A and sends a control command, an ID code (ID) and an encoded word (CW), such as a kind of pass word, different from the ID code (ID). Each of EEPROM 5 of the immobilizer unit (IM) 4 and EEPROM 10 of the engine controlling unit (EGI) 9 is able to store at most eight ID codes (IDs) (ID1–ID8) and one same encoded word (CW). Each ID code (ID) is registered in the same addresses of the immobilizer unit (IM) 4 and the engine controlling unit (EGI) 9 (EGI). The immobilizer unit (IM) 4 transmits an ID code (ID) to the engine controlling unit (EGI) 9 to compare ID codes (IDs) at the same addresses and various control commands to the engine controlling unit (EGI) 9. Specifically, the control commands includes a lock command LOCK for prohibiting the engine controlling unit (EGI) 9 from starting the engine and an unlock command UNLOCK for permitting the engine controlling unit (EGI) 9 to starting the engine, additional code entry commands and (AD1–AD8) for specifying addresses of EEPROM 10 of the engine controlling unit (EGI) 9 where ID codes (IDs) be registered, an exchange command IE for placing the engine controlling unit (EGI) 9 in a condition to replace the immobilizer unit (IM) 4 without an ID code (ID) registered, and an exchange command RG for placing the engine controlling unit (EGI) 9 in a condition to replace the engine controlling unit (EGI) 9 and the immobilizer unit (IM) 4 when the immobilizer unit (IM) 4 has no ID code (ID) and receives a special request command SR, which is described below, from the engine controlling unit (EGI) 9. The engine controlling unit (EGI) 9 transmits various control commands to the immobilizer unit (IM) 4. Specifically, the control commands includes a regular request command REQ for requesting the immobilizer unit (IM) 4 to transmit control commands, an ID code (ID) and an encoded word (CW), a special request command SR for requesting the immobilizer unit (IM) 4 to transmit control commands, ID codes (IDs) and an encoded word (CW) and for placing the immobilizer unit (IM) 4 in a condition to replace the immobilizer unit (IM) 4 and the engine controlling unit (EGI) 9 when the engine controlling unit (EGI) 9 has no ID code (ID), a lock confirmation command CNFLOCK for confirming back the fact that the engine controlling unit (EGI) 9 is disabled to start the engine, an unlock confirmation command CNFUNLOCK for confirming back the fact that the engine controlling unit (EGI) 9 is enabled to start the engine, an encoded word entry confirmation command CNFCW for confirming back the fact that an encoded word (CW) is newly taken or replaced in the engine controlling unit (EGI) 9 in the IM unit exchange mode, an ID code entry confirmation command CNFID for confirming back the fact that ID codes (IDs) and an encoded word (CW) are newly entered or overwritten in response to the ID entry commands $AD_n$ and IE.

Retransmission of the regular request command REQ or the special request command SR from the engine controlling unit (EGI) 9 to the immobilizer unit (IM) 4 is restricted to at most five times. If the engine controlling unit (EGI) 9 is under the necessity of transmitting a sixth regular request command REQ or a sixth special request command SR, it sets therein an fault code X1 to stop the engine and terminates the present mode. In cases where a fault code X7 is set, the maximum number of command transmission is cancelled.

Engine controlling unit (EGI) 9 starts and terminates command transfer under various conditions. Specifically, the engine controlling unit (EGI) 9 starts to transmit the regular request command REQ to the immobilizer unit (IM) 4 on condition that the engine rotates at a speed higher than 500 rpm and a specific period of time, for example 500 msec, has passed after the ignition switch (IG) 15 turns on in the event that a communication counter has a count N other than 0 (zero), or that a specific period of time, for example 1000 msec, has passed after the ignition switch (IG) 15 turns on in the event that the communication counter has a count N of 0 (zero), and terminates transmission of the regular request command REQ to the immobilizer unit (IM) 4 on condition that the engine rotates at a speed lower than 312.5 rpm in the event that the communication counter has a count N other than 0 (zero), or that the power source battery 14 is at a level less than the lowest security voltage of 6V for the engine controlling unit (EGI) 9. The engine controlling unit (EGI) 9 starts to transmit the special request command SR to the immobilizer unit (IM) 4 on condition that a specific period of time, for example 1000 msec, has passed after the ignition switch (IG) 15 turns on, and terminates transmission of the special request command SR to the immobilizer unit (IM) 4 whenever the power source battery 14 is at a level less than the lowest security voltage of 6V for the engine controlling unit (EGI) 9.

Figure 4:
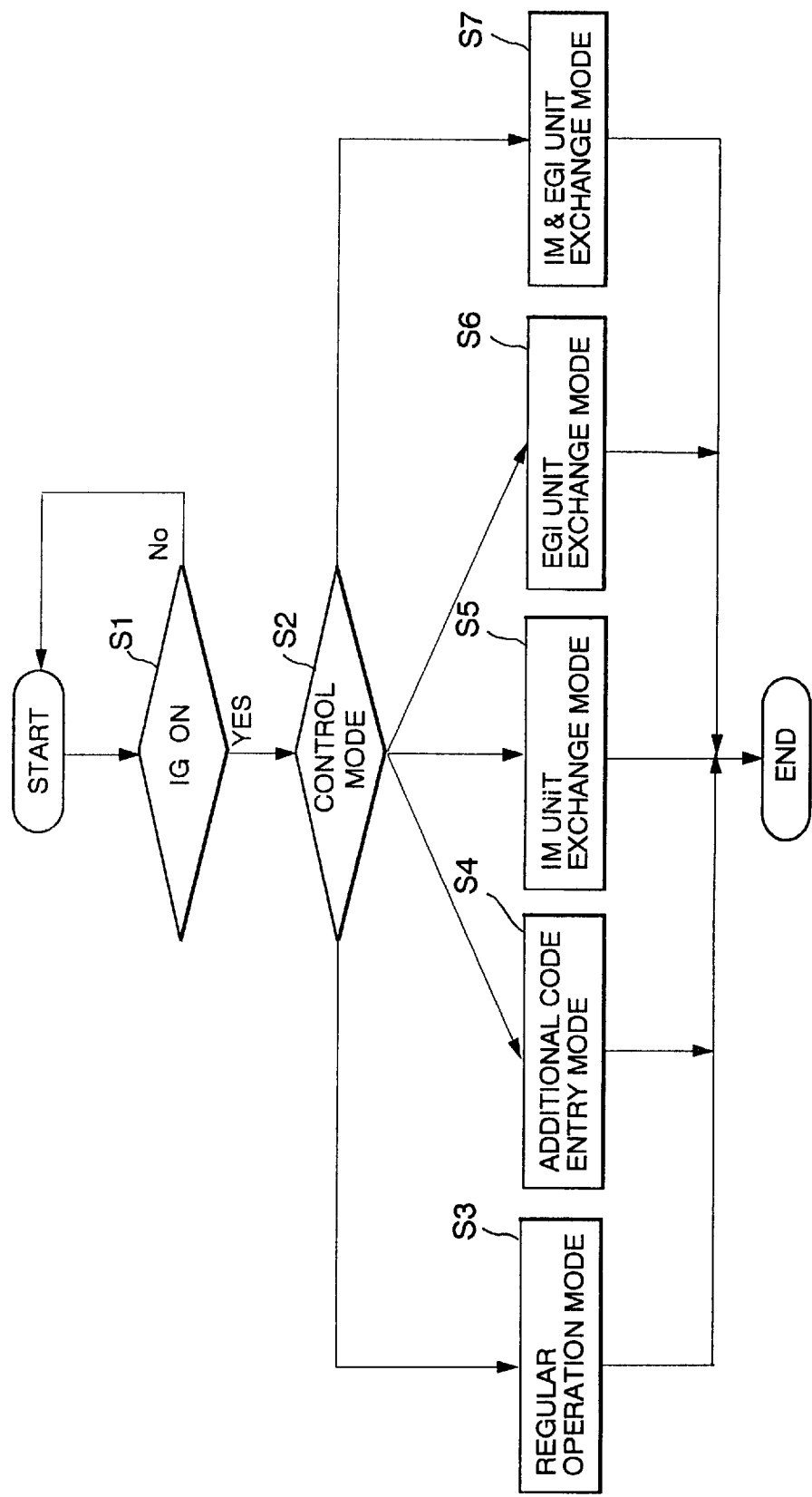
FIG. 4 is a flow chart illustrating a general sequence routine of the vehicle antitheft control.

FIG. 4 is a flow chart illustrating a sequence routine of general operation of the vehicle antitheft system shown in FIGS. 1 through 3. The vehicle antitheft system starts operation in various operation modes whenever the ignition key 1A is operated by a person to turn on the ignition switch (IG) 15. Specifically, when it is determined that the ignition switch (IG) 15 is turned on at step S1, the vehicle antitheft system executes one of the operation modes at step S3, S4, S5, S6 or S7, which will be described in detail later, determined at step S2.

Figure 5:
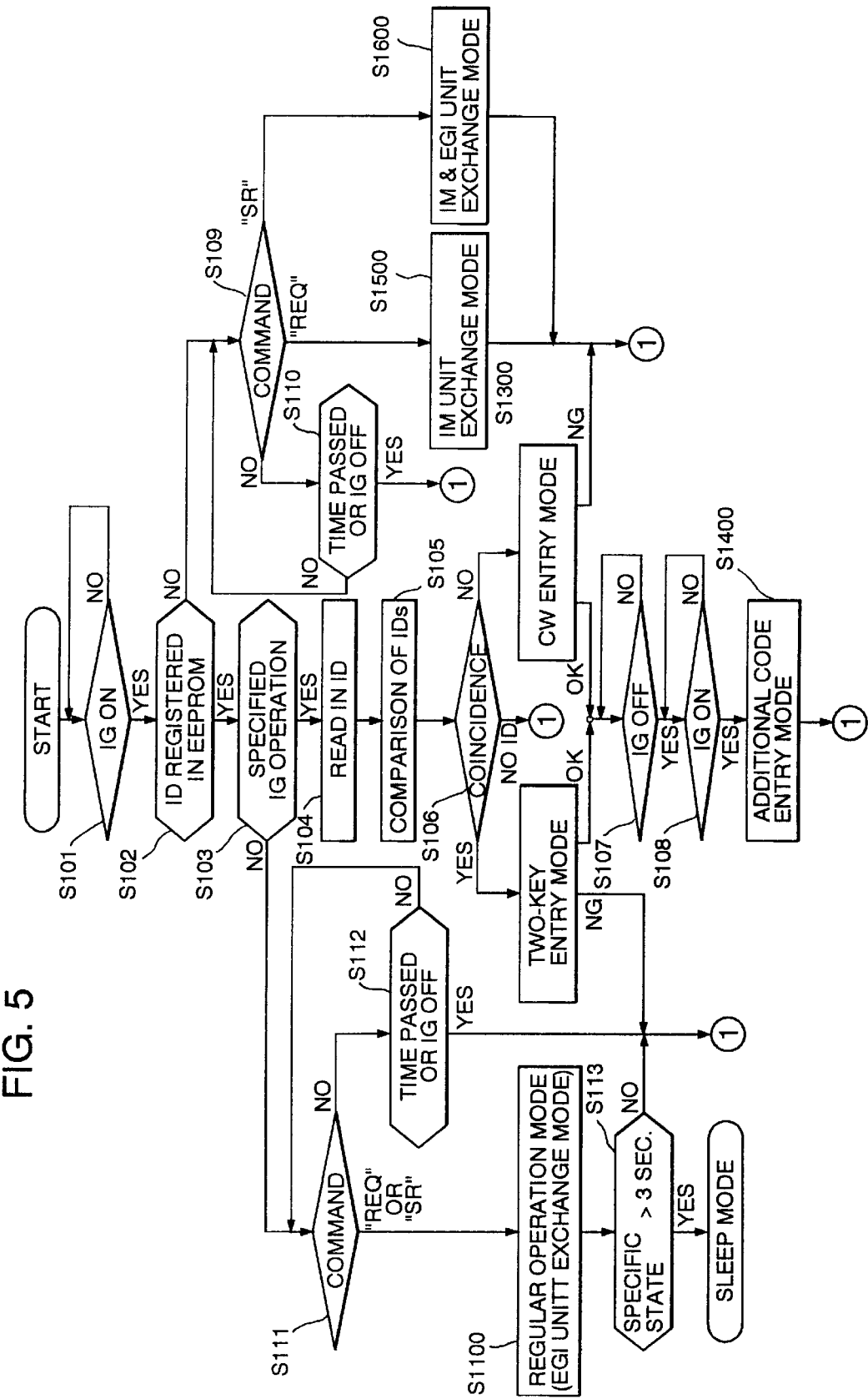
FIG. 5 is a flow chart illustrating a general sequence routine of operation of the immobilizer unit common to various operation modes.
Figure 7:
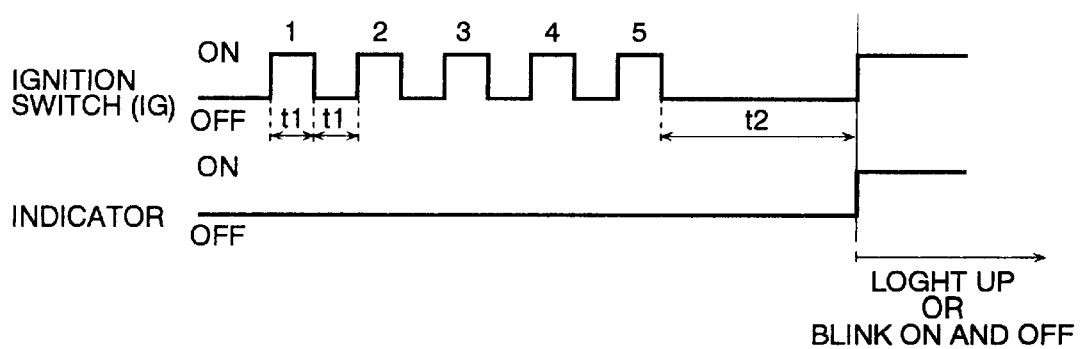
FIG. 7 is a time chart showing operation of the indicator.

FIG. 5 is a flow chart illustrating a sequence routine of general operation of the immobilizer unit (IM) 4 of the vehicle antitheft system to select the operation modes executed at steps S6–S7. When the ignition key 1A is operated to turn on the ignition switch (IG) 15 at step S101, a determination is made at step S102 as to whether ID codes (IDs) are registered in EEPROM 5 of the immobilizer unit (IM) 4. When the answer to the decision is "Yes," this indicates that at least one ID code (ID) is registered in EEPROM 5, then, a determination is made at step S103 as to whether the ignition key 1A is operated to turn on the ignition switch (IG) 15 at intervals t1 consecutively five times. In this instance, as shown in FIG. 7, the interval t1 for which the ignition switch (IG) 15 remains turned on or turned off is set between approximately 300 to 2000 msec. This determination is made to place the engine controlling unit (EGI) 9 in a regular operation mode, a two-key entry mode or an encoded word (CW) entry mode. The indicator 16 does not light up for this five times of consecutive operation of the ignition switch (IG) 15 and, however, lights up or blinks on and off after passage of a time t2, for example 30 sec, from the five times of consecutive operation of the ignition switch (IG) 15 to indicate that the engine controlling unit (EGI) 9 is in the two-key entry mode or the encoded word entry mode, respectively.

When the answer to the decision made at step S103 is "YES," this indicates that the ignition switch (IG) 15 has been repeatedly turned on and off at intervals t1 consecutively five times, then, the immobilizer unit (IM) 4 reads in an ID code (ID) of the ignition key 1A now put in the key cylinder 2A and operated to turn on the ignition key 15 at step S104. Subsequently to comparing the ID code (ID) of the ignition key 1A with ID codes (IDs) registered in EEPROM 5 at step S105, a determination is made at step S106 as to whether there is a presence of coincidence between the ID code (ID) of the ignition key 1A with ID codes (IDs) registered in EEPROM 5. This comparison is allowed at most three times until there occurs coincidence between the ID code (ID) of the ignition key 1A and any one of the ID codes (IDs) registered in EEPROM 5 which verifies that the ignition key 1A now put in the key cylinder 2A is one of ignition keys approved for the engine. If there is an absence of coincidence between the ID codes (IDs) within three times of comparison, the ignition key 1A is rejected as being not approved. When there is a presence of coincidence between the ID codes (IDs), the immobilizer unit (IM) 4 operates in the two-key entry mode which will be described in detail later at step S1200. As a result of the comparison, when there is an absence of coincidence, the immobilizer unit (IM) 4 operates in the encoded word (CW) entry mode which will be described in detail later at step S1300. On the other hand, if no ID code (ID) is read in through the transponder 1, the flow chart logic orders return to the sequence routine for another execution from step S101. Thereafter, when the ignition switch (IG) 15 is turned on again at step S108 after it is turned off at step S107, the immobilizer unit (IM) 4 operate in the additional code-entry mode which will be described in detail later at step S1400.

When the answer to the decision concerning ID codes (IDs) registered in EEPROM 5 of the immobilizer unit (IM) 4 made at step S102 is "NO," this indicates that no ID code (ID) is registered in EEPROM 5, then, a determination is made at step S109 as to whether the immobilizer unit (IM) 4 receives a control command, such as the regular request command REQ for requesting the immobilizer unit (IM) 4 to transmit an ID code (ID) and an encoded word (CW) or the special request command SR for requesting the immobilizer unit (IM) 4 to transfer control commands and an ID code (ID) and an encoded word (CW) and for placing the immobilizer unit (IM) 4 in a condition to replace the immobilizer unit (IM) 4 and the engine controlling unit (EGI) 9 when the engine controlling unit (EGI) 9 has no ID code (ID), from the engine controlling unit (EGI) 9. The immobilizer unit (IM) 4 operates in the IM unit exchange mode which will be described in detail later at step S1500 if there is the regular request command REQ or the IM and EGI units exchange mode which will be described in detail later at step S1600 if there is the special request command SR. This determination is repeated until the immobilizer unit (IM) 4 receives any one of these request commands REQ and SR in a specified period of time or unit the ignition switch (IG) 15 is turned off, which is determined at step S110. If the immobilizer unit (IM) 4 does not receive any request command REQ or SR in the specified period of time or if the ignition switch (IG) 15 is turned off, the flow chart logic orders return to the sequence routine for another execution from step S101.

When the answer to the determination concerning operation of the ignition key 1A made at step S103 is "NO," a determination is made at step S111 as to whether the immobilizer unit (IM) 4 receives the regular request command REQ or the special request command SR. The immobilizer unit (IM) 4 operates in the regular operation mode which will be described in detail later at step S1100 if there is any one of the regular request command REQ and the special request command SR. This determination is repeated until the immobilizer unit (IM) 4 receives any one of these request commands REQ and SR in a specified period of time or unit the ignition switch (IG) 15 is turned off, which is determined at step S112. When the immobilizer unit (IM) 4 does not receive the regular request command REQ nor the special request command SR for the specified period of time or when the ignition switch (IG) 15 is turned off within the specified period of time, the flow chart logic orders return to the sequence routine for another execution from step S101.

When the immobilizer unit (IM) 4 terminates operation in the selected mode at step S1200, S1300, S1400, S1500 or S1600, the flow chart logic orders return to the sequence routine for another execution from step S101. When the immobilizer unit (IM) 4 operates in the regular operation mode at step S1100, the flow chart logic orders return to the sequence routine for another execution from step S101 only when a specific state continues more than three sec after termination of the operation of the immobilizer unit (IM) 4 in the regular operation mode. However, if the specific state does not continue more than three sec after termination of the operation of the immobilizer unit (IM) 4 in the regular operation mode at step S113, the immobilizer unit (IM) 4 takes a sleep mode which will be described in detail later. The "specific state" refers to the state that the ignition switch (IG) 15 is off or open and the communication line is low or open (broken down).

Figure 6A:
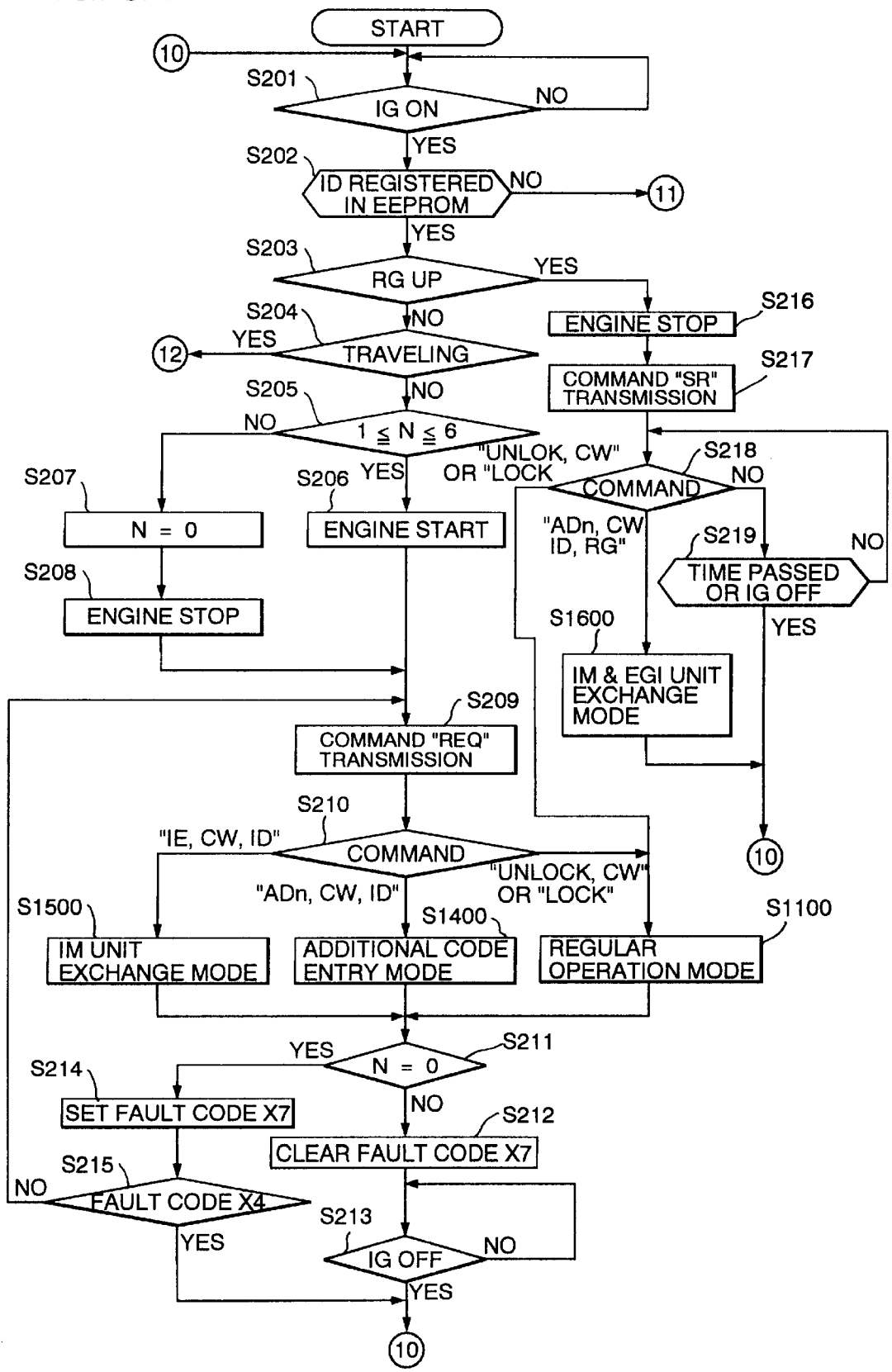
FIGS. 6A–6C are a flow chart illustrating a general sequence routine of operation of the engine controlling unit common to various operation modes.
Figure 6B:
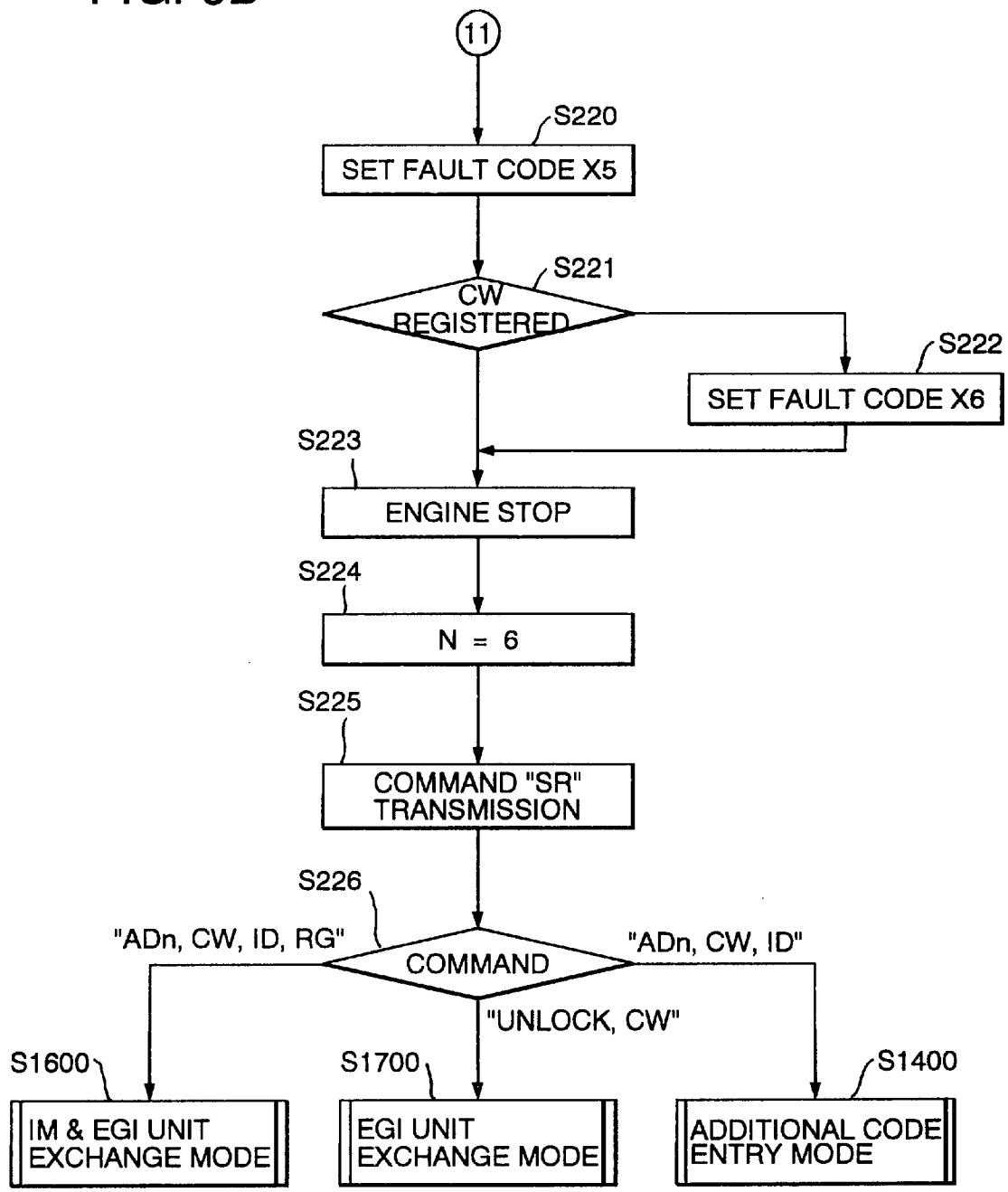
Figure 6C:
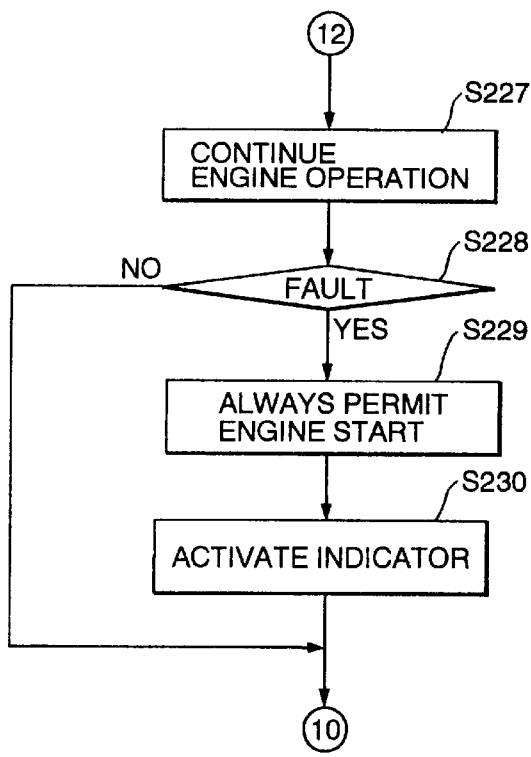

FIGS. 6A through 6C is a flow chart illustrating a sequence routine of general operation of the engine controlling unit (EGI) 9 of the vehicle antitheft system. The engine controlling unit (EGI) 9 takes the operation modes, i.e. the regular operation mode, the two-key entry mode, the additional code entry mode, the IM unit exchange mode or the IM and EGI units exchange mode, according to various conditions. When the ignition key 1A is operated to turn on the ignition switch (IG) 15 at step S201, a determination is made at step S202 as to whether ID codes (IDs) are registered in EEPROM 10 of the engine controlling unit (EGI) 9. When the answer to the decision is "Yes," this indicates that at least one ID code (ID) is registered in EEPROM 10, then, in order to select the operation modes including the IM unit exchange mode, the additional code entry mode, the IM and EGI units exchange mode and the regular operation mode, a determination is made at step S203 as to whether an exchange mode flag RG is set up. This exchange mode flag RG remains set down while the engine controlling unit (EGI) 9 is brand-new and before installation into the vehicle antitheft system and is enabled to be set up after the installation. The exchange mode flag RG set up indicates that the engine controlling unit (EGI) 9 is brought into the IM and EGI units exchange mode. When the exchange mode flag RG is down, a determination is made at step S204 as to whether the vehicle is traveling. When the answer is "NO," another determination is made at step S205 as to whether a communication counter has a count N between one and six. The communication counter counts the number of transmission of the request command REQ or SR to the immobilizer unit (IM) 4 since turning on the ignition switch (IG) 15. When the communication counter has a count N between one and six, the regular request command REQ is transmitted to the immobilizer unit (IM) 4 at step S209 after activation of the engine at step S206. On the other hand, when the communication counter has a count N greater than six, the regular request command REQ is transmitted to the immobilizer unit (IM) 4 at step S209 after resetting the communication counter to 0 (zero) at step S207 and stopping the engine at step S208. Subsequently, transmission of a control command is waited at step S210. The engine controlling unit (EGI) 9 operates in the regular operation mode at step S1100 when receiving both unlock command UNLOCK and encoded word (CW) or the lock command LOCK, in the additional code entry mode at step S1400 when receiving an additional code entry command ADn, an ID code (ID) and an encoded word (CW), or in the IM unit exchange mode at step S1500 when receiving the exchange command IE, an ID code (ID) and a coed word (CW). When the exchange mode flag RG is up at step S203, after stopping the engine at step S216 and transmitting the special request command SR to the immobilizer unit (IM) 4 at step S217, transmission of a control command is subsequently waited at step S218. The engine controlling unit (EGI) 9 operates in the regular operation mode at step S2100 when receiving both unlock command UNLOCK and encoded word (CW) or the lock command LOCK or in the IM and EGI units exchange mode at step S1600 when receiving an additional code entry command ADn, an ID code (ID), an encoded word (CW) and an exchange command RG. This determination is repeated until the engine controlling unit (EGI) 9 receives any one of these control commands in a specified period of time or until the ignition switch (IG) 15 is turned off at step S219. In this instance, the exchange command RG brings the engine controlling unit (EGI) 9 into the IM and EGI units exchange mode.

After the operation of the engine controlling unit (EGI) 9 in the regular operation mode at step S2100 or in the additional code entry mode at step S1400, a determination is made at step S211 as to the count N of the communication counter. When the communication counter has a count N greater than 0 (zero), after clearing a fault code X7 at step S212, the flow chart logic waits until the ignition switch (IG) 15 is turned off at step S213, and orders return to the sequence routine for another execution from step S201. On the other hand, if the communication counter has a count N of 0 (zero), after writing in the fault code X7 at step S214, a determination is made at step S215 as to whether a fault code X4 is written in. The flow chart logic orders return to the sequence routing for another execution from step S201 when the fault code X4 has been written in or orders return to a function to transmit the regular request command REQ to the immobilizer unit (IM) 4 at step S209 when the fault code X4 has not yet been written in. In this instance, the fault code X7 indicates that the communication counter is out of order, and the fault code X4 indicates that writing or reading the ID code (ID) and/or the encoded word (CW) is ended in fault. After the operation of the engine controlling unit (EGI) 9 in the IM unit exchange mode at step S1500, the flow chart logic orders return to a function to transmit the regular request command REQ to the immobilizer unit (IM) 4 at step S209. Further, after the operation of the engine controlling unit (EGI) 9 in the IM and EGI units exchange mode at step S1600 or when the engine controlling unit (EGI) 9 receives no control commands within the specified period of time or when the ignition switch (IG) 15 is turned off at step S219, the flow chart logic orders return to the sequence routine for another execution from step S201.

When the answer to the determination concerning registration of ID codes (IDs) in EEPROM 10 of the engine controlling unit (EGI) 9 made at step S202 is "NO," then, after setting a fault code X5 indicating that there is no ID code (ID) registered in EEPROM 10 of the engine controlling unit (EGI) 9 at step S220 (see FIG. 6B), a determination is made at step S221 as to whether the encoded word (CW) is registered in EEPROM 10 of the engine controlling unit (EGI) 9. When the encoded word (CW) is registered in EEPROM 10 or after setting a fault code X6 indicating that there is no encoded word (CW) registered in EEPROM 10 of the engine controlling unit (EGI) 9 at step S222 when no encoded word (CW) is registered in EEPROM 10, the engine is stopped at step S223. After setting the communication counter to a count N of six at step S224, the special request command SR is transmitted to the immobilizer unit (IM) 4 at step S225. Subsequently, transmission of control commands is waited at step S226. The engine controlling unit (EGI) 9 operates in the IM and EGI units exchange mode at step S1600 when receiving all of the additional code entry command ADn, the encoded word CW, the ID code (ID) and the exchange command RG, in the EGI unit exchange mode at step S1700 when receiving both unlock command UNLOCK, an ID code (ID) and encoded word (CW), or in the additional code entry mode at step S1400 when receiving an additional code entry command ADn, an encoded word (CW) and an ID code (ID). If there is no transmission of control commands from the immobilizer unit (IM) 4 for a specified period of time or if the ignition switch (IG) 15 is turned off, the flow chart logic orders return to the sequence routine for another execution of from step S201.

When, as a result of the determination made at step S204, it is verified that the vehicle is traveling, the engine remains operated at step S227 (see FIG. 6C) whenever the ignition switch (IG) 15 is turned on. At step S228, a determination is made as to whether the engine controlling unit (EGI) 9 encounters faults to restart the engine. If there is such a fault, then, a start flag F is set up at step S229. The start flag F set up indicates that the engine controlling unit (EGI) 9 is always permitted to restart the engine. While the start flag F is up, the engine controlling unit (EGI) 9 cancels comparison of its own encoded word (CW) with the encoded word (CW) transmitted from the immobilizer unit (IM) 4 when the ignition switch (IG) 15 is turned on again. Subsequently, the engine controlling unit (EGI) 9 causes the immobilizer unit (IM) 4 to cause the indicator 16 to light up or blink on and off at step S230, letting the driver know of the fault. When there is no fault at step S228 or after causing the indicator 16 to light up or blink on and off at step S230, the flow chart logic orders return to the sequence routing for another execution from step S201.

Figure 8:
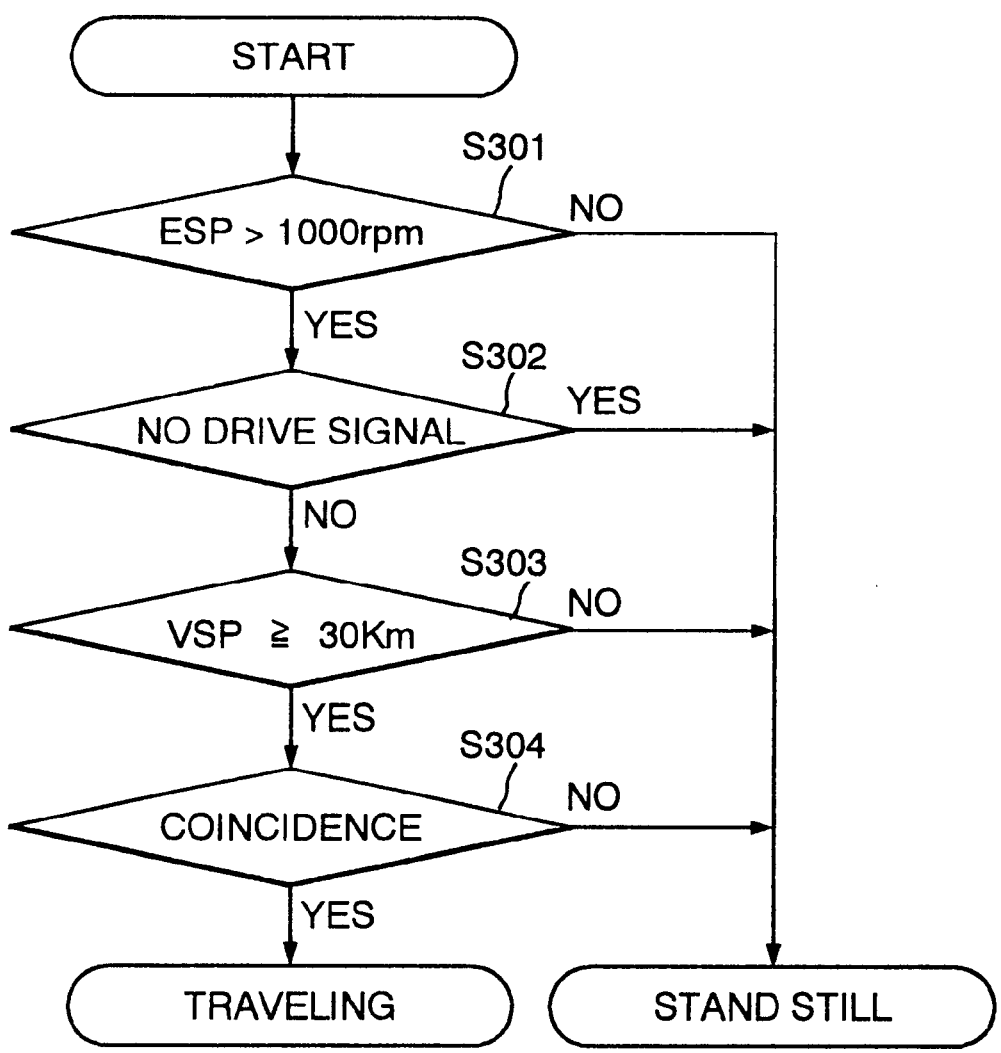
FIG. 8 is a flow chart illustrating a sequence routine of a determination that the vehicle is traveling.

Determination as to whether the vehicle is traveling is made following a sequence routine shown in FIG. 8. As shown, the vehicle is determined as traveling when it is found that the engine speed of rotation ESP is higher than, for example, 1000 rpm at step S301, that there is no drive signal for a starter motor (not shown) at step S302, that the vehicle speed VSP is higher than 30 km/h at step S303, and that there is a presence of coincidence between the encoded words (CWs) in the previous execution of the sequence routine at step S304. Otherwise, the vehicle is determined as standing still.

FIG. 9A shows codes of faults of the engine controlling unit (EGI) 9. Faults to transfer commands between the immobilizer unit (IM) 4 and the engine controlling unit (EGI) 9 are encoded as a fault code Xl. This type of faults include a fault that there is no control command from the immobilizer unit (IM) 4 in reply to a request command in a specified period of time due, for example, to breaking down of a communication line, a fault that there is an absence of coincidence between the ID code (ID) and encoded word (CW) transmitted from the immobilizer unit (IM) 4 with those in the engine controlling unit (EGI) 9, and a fault that transmission of the request command REQ or SR to the immobilizer unit (IM) 4 is over the permitted number. That is, it is determined that the engine controlling unit (EGI) 9 encounters a fault when there is no reply from the immobilizer unit (IM) 4 after transmission of the regular request command REQ to the immobilizer unit (IM) 4, or when the communication counter has counted down its count from six to 0 (zero) changing by a decrement of 1 (one) after transmission of a lock command LOCK from the immobilizer unit (IM) 4 in reply to the regular request command REQ. A fault encoded as a fault code X2 is an absence of consistency between the encoded word (CW) registered in the engine controlling unit (EGI) 9 with an encoded word (CW) transmitted from the immobilizer unit (IM) 4 due to noises. A fault encoded as a fault code X3 is an absence of coincidence between the ID codes (IDs) registered in the engine controlling unit (EGI) 9 with an ID code (ID) transmitted from the immobilizer unit (IM) 4 due to communication errors between these two units 4 and 9 or a trouble of EEPROM 10 of the engine controlling unit (EGI) 9. A fault encoded as a fault code X4 is unsuccessful registration of ID codes (IDs) and/or an encoded word (CW) due to circuit troubles even after trying to write/read an encoded word (CW) and/or an ID code (ID) in EEPROM 10 of the engine controlling unit (EGI) 9 three times. A fault encoded as a fault code X5 is accidental disappearance of an ID code (ID) in EEPROM 10 of the engine controlling unit (EGI) 9 for some reason. A fault encoded as a fault code X6 is accidental disappearance of an encoded word (CW) in EEPROM 10 of the engine controlling unit (EGI) 9 for some reason. A fault encoded as a fault code X7 is no reply from the immobilizer unit (IM) 4 after transmission of the regular request command REQ to the immobilizer unit (IM) 4, or an occurrence of a count N of zero of the communication counter as a result of changing the count by a decrement of 1 (one) after transmission of the lock command LOCK from the immobilizer unit (IM) 4 in reply to the regular request command REQ.

FIG. 9B shows various types of faults of the immobilizer unit (IM) 4. As shown, Faults possibly encountered by the transponder 1 include improper entry of an ID code (ID), destruction, etc. Faults possibly encountered by the coil antenna include damage of itself, the breaking down of a harness between the coil antenna 2 and the immobilizer unit (IM) 4, etc. Faults possibly encountered by the immobilizer unit (IM) 4 include functional disorder of EEPROM 5, the breaking down of a communication line between the immobilizer unit (IM) 4 and the power source battery 14 through the ignition switch (IG) 15 or between the immobilizer unit (IM) 4 and the engine controlling unit (EGI) 9, etc.

Figure 10:
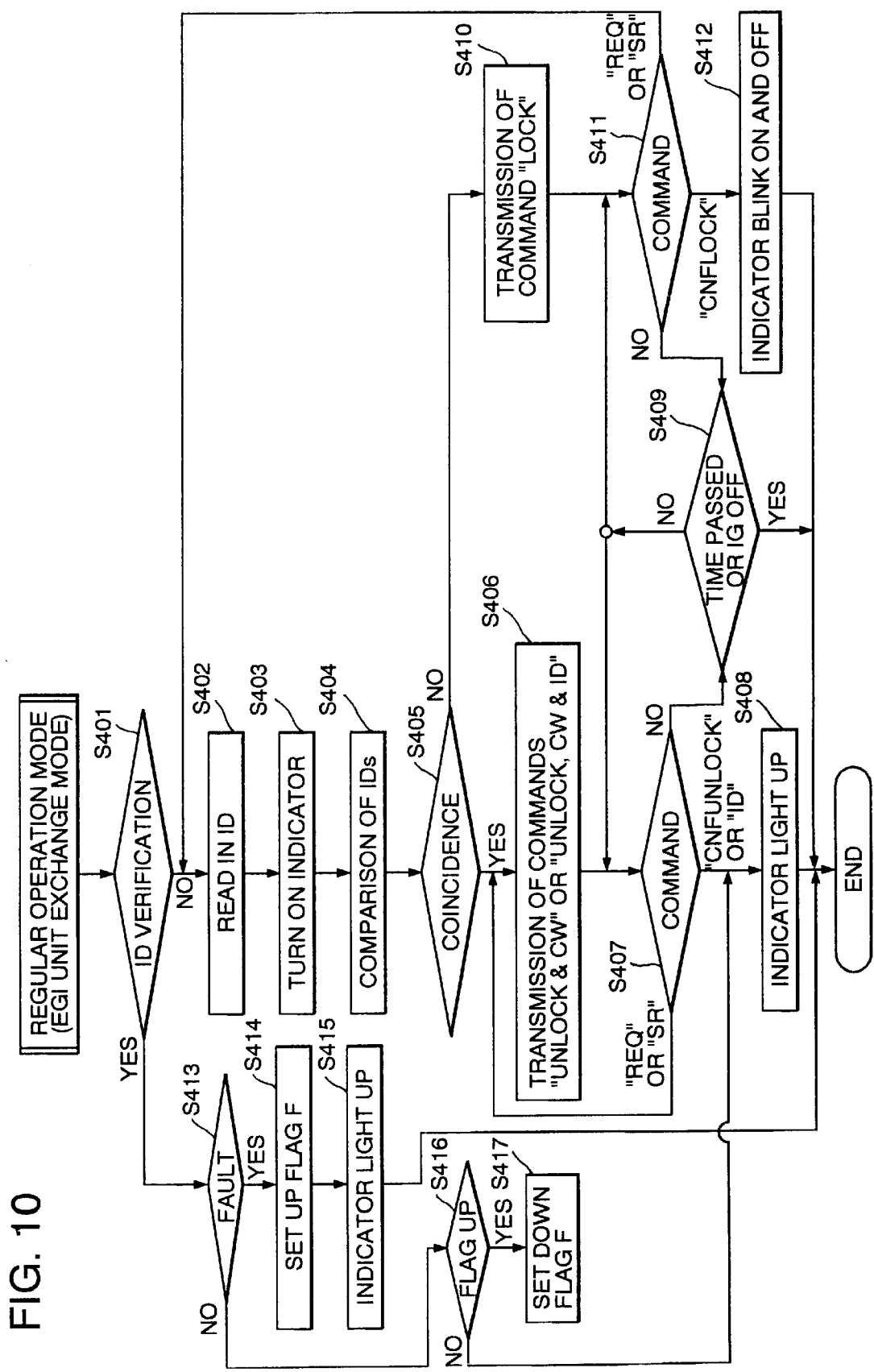
FIG. 10 is a flow chart illustrating a sequence routine of operation of the immobilizer unit in a regular mode which is common to an engine controlling unit exchange mode.

FIG. 10 is a flow chart illustrating a sequence routine of operation of the immobilizer unit (IM) 4 in the regular operation mode. In the regular operation mode, the immobilizer unit (IM) 4 compares an ID code (ID) read in from the transponder 1 of the ignition key 1A put in the key cylinder 2A with the ID code (ID) in EEPROM 5. When it is verified that there is a presence of coincidence between these ID codes (IDs), the immobilizer unit (IM) 4 transmits the unlock command UNLOCK and the encoded word (CW) to the engine controlling unit (EGI) 9. On the other hand, if it is verified that there is an absence of coincidence between these ID codes (IDs), the immobilizer unit (IM) 4 transmits the lock command LOCK to the engine controlling unit (EGI) 9. While the engine controlling unit (EGI) 9 manages operation of the engine according to the lock and unlock commands, it permits the engine to operate continuously when it is verified that there is a presence coincidence between the encoded words (CWs) or stops the engine when it is verified that there is an absence of coincidence between the encoded words (CWs).

When the flow chart logic commences and control passes directly to a function block at step S401 where a determination is made as to whether it has been verified that the ID code (ID) read in after the ignition switch (IG) 15 is turned on is a proper ID code (ID). When the ID code (ID) has not yet been verified to be proper, after reading in the ID code (ID) from the transponder 1 of the ignition key 1A in the key cylinder 2A at step S402, the indicator 16 is caused to light up, providing a visible indication that the immobilizer unit (IM) 4 is executing the verification of coincidence between the ID codes (IDs) at step S403. After comparison of the ID of the ignition key 1A 2A with the ID code (ID) registered in EEPROM 5 of the immobilizer unit (IM) 4 at step S404, a determination is made at step S405 as to whether there is a presence of coincidence between these ID codes (IDs). The immobilizer unit (IM) 4 transmits the unlock command UNLOCK and the encoded word (CW) to the engine controlling unit (EGI) 9 at step S406 when it is verified that there is a presence of coincidence between the ID codes (IDs). In this instance, the immobilizer unit (IM) 4 transmits the unlock command UNLOCK and the encoded word (CW) when receiving the regular request command REQ or transmits the unlock command UNLOCK, the encoded word (CW) and all of the ID codes (IDs) when receiving the special request command SR. Thereafter, at step S407, transmission of control commands from the engine controlling unit (EGI) 9 is waited. The flow chart logic returns to step S406 to transmit the unlock command UNLOCK and the encoded word (CW) to the engine controlling unit (EGI) 9 when the immobilizer unit (IM) 4 receives either a regular request command REQ or a special request command SR, from the engine controlling unit (EGI) 9, or terminates the sequence routine after causing the indicator 16 to go off at step S408. This determination is repeated until the immobilizer unit (IM) 4 receives any one of these control commands in a specified period of time or until the ignition switch (IG) 15 is turned off at step S409. If there is no control command transmitted from the engine controlling unit (EGI) 9 for the specified period of time or if the ignition switch (IG) 15 is turned off though no control command is transmitted from the engine controlling unit (EGI) 9, the flow chart logic terminates the sequence routine. Upon the termination of the sequence routine of the regular operation mode, the flow chart logic orders return to the general sequence routine of operation of the immobilizer unit (IM) 4 shown in FIG. 5 for another execution.

When it is verified that there is an absence of coincidence between the ID codes (IDs) at step S405, the immobilizer unit (IM) 4 transmits the lock command LOCK to the engine controlling unit (EGI) 9 at step S410. Thereafter, at step S411, transmission of control commands from the engine controlling unit (EGI) 9 is waited. The flow chart logic returns to step S402 to read in the ID code (ID) from the transponder 1 of the ignition key 1A for another execution of the verification of coincidence between the ID codes (IDs) when the immobilizer unit (IM) 4 receives a request command, i.e. the regular request command REQ or the special request command SR, from the engine controlling unit (EGI) 9, or terminates the sequence routine after causing the indicator 16 to blink on and off at step S412, providing a visual indication of an absence of coincidence between the ID codes (IDs). This determination is repeated until the immobilizer unit (IM) 4 receives any one of these control commands in a specified period of time or until the ignition switch (IG) 15 is turned off at step S409. If there is no control command transmitted from the engine controlling unit (EGI) 9 for the specified period of time or if the ignition switch (IG) 15 is turned off though no control command is transmitted from the engine controlling unit (EGI) 9, the flow chart logic terminates the sequence routine. Upon the termination of the sequence routine of the regular operation mode, the flow chart logic orders return to the general sequence routine of operation of the immobilizer unit (IM) 4 shown in FIG. 5 for another execution. Blinking on and off of the indicator 16 warns a person that the ignition key 1A put in the key cylinder 2A is not approved. If the indicator 16 may accompany its blinking on and off indication with an alarm sound with an effect of the prevention of theft.

On the other hand, when it is verified that the ID code (ID) read in after the ignition switch (IG) 15 is turned on is proper, a determination is subsequently made at step S413 as to whether there is any fault occurred in the vehicle antitheft system. When any fault or faults are found, after setting up the start flag F at step S414, which indicates that the engine controlling unit (EGI) 9 is always permitted to restart the engine, and causing the indicator 16 to light up so as to provide an indication of the fault at step S415, the flow chart logic terminates the sequence routine. By means of setting up the start flag F, the verification process of coincidence between the ID codes (IDs) is cancelled when the ignition switch (IG) 15 is turned on again. The indicator 16 may be adapted to light up or blink on and off on and off in different patterns according to types of faults as described above. When there is no fault, another determination is made at step S416 as to whether the start flag F is set up. The flow chart logic terminates the sequence routine directly when the start flag F is down or after setting down the start flag F at step S417 when it is up. As a preparation for replacement of the immobilizer unit (IM) 4, when receieving a special request command SR, the immobilizer unit (IM) 4 in the EGI exchange mode transmits all ID codes registered in EEPROM 5 to the engine control unit (EGI) 9 together with the unlock command UNLOCK and the encodd word (CW) at step S406.

Indicator 16 blinking on and off provides an indication that there is an absence of coincidence between the ID codes in the immobilizer unit 4. Further, it serves as a burglar alarm.

Figure 11:
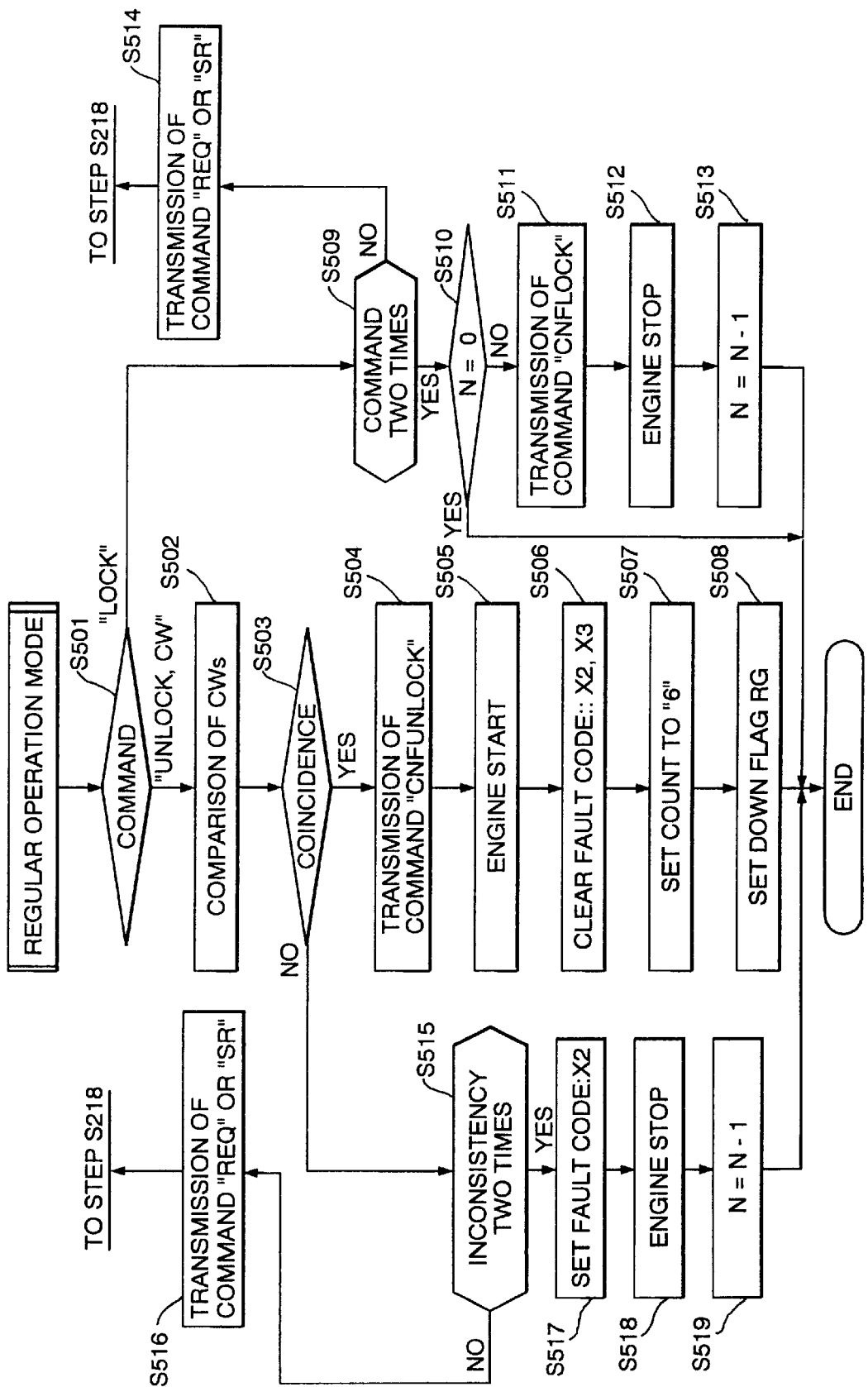
FIG. 11 is a flow chart illustrating a sequence routine of operation of the engine controlling unit in a regular mode.

FIG. 11 is a flow chart illustrating a sequence routine of operation of the engine controlling unit (EGI) 9 in the regular operation mode. In the regular operation mode, the engine controlling unit (EGI) 9 compares an encoded word (CW) read in from the immobilizer unit (IM) 4 with the encoded word (CW) in EEPROM 10 of the engine controlling unit (EGI) 9. When it is verified that there is a presence of coincidence between these encoded words (CWs), the engine controlling unit (EGI) 9 is permitted to start the engine. On the other hand, if it is verified that there is an absence of coincidence between these encoded words (CWs), the engine controlling unit (EGI) 9 stops the engine. When the flow chart logic commences and control passes directly to a function block at step S501 where a determination is made as to what types of control commands the engine controlling unit (EGI) 9 receives from the immobilizer unit (IM) 4. When the engine controlling unit (EGI) 9 receives the unlock command UNLOCK and an encoded word (CW), comparison is made between the encoded word (CW) received and the encoded word (CW) registered in EEPROM 10 of the engine controlling unit (EGI) 9 at step S502. When it is verified that there is a presence of coincidence between the encoded words (CWs) at step S503, after transmitting a lock confirmation command CNFUNLOCK to the immobilizer unit (IM) 4 at step S504, the engine controlling unit (EGI) 9 starts the engine at step S505. Subsequently, after clearing the fault codes X2 and X3 at step S506, setting the communication counter to a count N of six at step S507, and reset down the exchange mode flag RG at step S508 in this order, the flow chart logic terminates the sequence routine of operation of the engine controlling unit (EGI) 9 in the regular operation mode and orders return to the general sequence routine of operation of the engine controlling unit (EGI) 9 shown in FIGS. 6A–6C for another execution. On the other hand, when the engine controlling unit (EGI) 9 receives the lock command LOCK at step S501, a determination is subsequently made at step S509 as to whether the reception of lock command LOCK is for the second time. When it is not the second reception of lock command LOCK, another determination is made at step S510 as to whether the communication counter has a count N of 0 (zero). When the communication counter has a count N between one and six, the engine controlling unit (EGI) 9 transmits the lock confirmation command CNFLOCK at step S511, and subsequently stops the engine at step S512. After changing the count N of the communication counter by a decrement of one at step S513 or when the communication counter has a count N of 0 (zero), the flow chart logic terminates the sequence routine of operation of the engine controlling unit (EGI) 9 in the regular operation mode and orders return to the general sequence routine of operation of the engine controlling unit (EGI) 9 shown in FIGS. 6A–6C for another execution.

When the engine controlling unit (EGI) 9 does not receives two consecutive lock commands LOCK, after transmitting another request command, i.e. the regular request command REQ or the special reguest command SR, to the immobilizer unit (IM) 4 at step S5, the flow chart logic orders return to the determination at step S218 in the general sequence routine of operation of the engine controlling unit (EGI) 9 in the regular operation mode shown in FIGS. 6A–6C.

When it is verified that there is an absence of coincidence between the encoded words (CWs) at step S503, another determination is subsequently made at step S515 as to whether the absence of coincidence is for the second time. When it is not the second absence of coincidence, after transmitting another request command, i.e. the regular request command REQ or the special reguest command SR, to the immobilizer unit (IM) 4 at step S516, the flow chart logic orders return to the determination at step S218 in the general sequence routine of operation of the engine controlling unit (EGI) 9 in the regular operation mode shown in FIGS. 6A–6C. On the other hand, when it is the second absence of coincidence, after setting the fault code X2 at step S517, stopping the engine at step S518 and changing the count N of the communication counter by a decrement of one at step S519 in order, the flow chart logic terminates the sequence routine of operation of the engine controlling unit (EGI) 9 in the regular operation mode and orders return to the general sequence routine of operation of the engine controlling unit (EGI) 9 shown in FIGS. 6A–6C for another execution.

Figure 12:
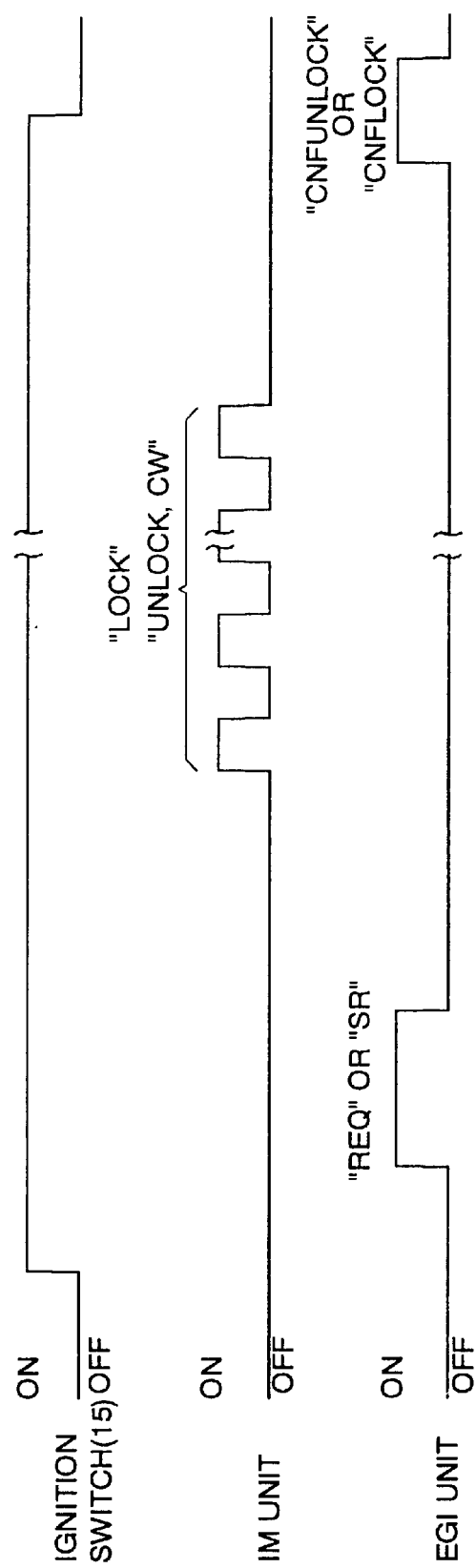
FIG. 12 is a time chart showing operation of the immobilizer unit and the engine controlling unit with respect to operation of the ignition switch.

FIG. 12 is a time chart of operation of the ignition switch (IG) 15, the immobilizer unit (IM) 4 and the engine controlling unit (EGI) 9 in the regular operation mode. As shown, while the ignition switch (IG) 15 remains turned on, the immobilizer unit (IM) 4 reads in an ID code (ID) from the transponder 1 to compare it with its own ID code (ID) in response to transmission of the regular request command REQ or the special request command SR from the engine controlling unit (EGI) 9 and transmits various commands to the engine controlling unit (EGI) 9. Specifically, when there is a presence of coincidence between the ID codes (IDs), the immobilizer unit (IM) 4 transmits the unlock command UNLOCK and the encoded word (CW) when receiving the regular request command REQ or transmits the unlock command UNLOCK, the encoded word (CW) and all of the ID codes (IDs) when receiving the special request command SR. On the other hand, when there is an absence of coincidence between the ID codes (IDs), the immobilizer unit (IM) 4 transmits the lock command LOCK only in spite of the type of request command. The engine controlling unit (EGI) 9 transmits a confirmation command to the immobilizer unit (IM) 4, namely the unlock confirmation command CNFUNLOCK in response to reception of the unlock command UNLOCK from the immobilizer unit (IM) 4 or the lock confirmation command CNFLOCK in response to reception of the lock command LOCK from the immobilizer unit (IM) 4.

Vehicle antitheft system has a fault detection mode in which the immobilizer unit (IM) 4 keeps the engine remain operated even when the ignition switch (IG) 15 is turned off or is enabled by cancelling the result of comparison between the ID codes (IDs) to restart the engine in the event where a fault making it impossible to restart the engine for some reason is found after the verification of a proper ID code (ID) at step S401 in the sequence routine of operation of the immobilizer unit (IM) 4 in the regular operation mode shown in FIG. 10 during operation of the engine. Further, the immobilizer unit (IM) 4 periodically detects faults at regular intervals of approximately one min after transmission of the unlock command UNLOCK to the engine controlling unit (EGI) 9 and causes the indicator 16 to blink on and off so as to provide a visual indication of the fault when the same type of fault is found consecutively, for example, six times. If not transmitting the unlock command UNLOCK to the engine controlling unit (EGI) 9, the immobilizer unit (IM) 4 causes the indicator 16 to blink on and off so as to provide a visual indication of a fault when the same type of fault is found consecutively, for example, five times. This periodic detection of faults is enables to let a person notice promptly that the antitheft system encounters a fault upon an occurrence of the fault before stopping the engine, so as to make it possible to take the vehicle to a service shop for having the antitheft system repaired. Detecting the same type of fault a specified number of times prevents unsuccessful detection due to radio interruption in extremely coarse circumstances. In addition, the immobilizer unit (IM) 4 is adapted and designed so as to keep the engine remain activated even when the ignition switch (IG) 15 is turned off only when a fault is found or is enabled by cancelling the result of comparison between the ID codes (IDs) to restart the engine, on condition that the engine is operating after the verification of a proper ID code (ID) at step S401 in the sequence routine of operation of the immobilizer unit (IM) 4 in the regular operation mode shown in FIG. 10. This is because, if fault detection is executed while the engine stops, it can be easily made possible by, for example, damaging the transponder 1 and/or the antenna 2 to which any parson can get easy access to start the engine. In the case where the engine is kept to remain operated even when the ignition switch (IG) 15 is turned off, a special command is transmitted to the engine controlling unit (EGI) 9 to keep the engine remain operated.

As described above, because the immobilizer unit (IM) 4 keeps the engine remain operated even when the ignition switch (IG) 15 is turned off only when a fault is found or is enabled by cancelling the comparison between the ID codes (IDs) to restart the engine, on condition that the engine is operating after the verification of a proper ID code (ID) in the sequence routine of operation of the immobilizer unit (IM) 4 in the regular operation mode, in the event where it is found that the immobilizer unit encounters a fault that the immobilizer unit (IM) 4 is made impossible to restart the engine, the engine can be still restarted even when the ignition switch (IG) 15 is turned off, enabling the vehicle to be brought to a service shop.

As understood from the description made regarding the general sequence routine of operation of the engine controlling unit (EGI) 9 shown in FIGS. 6A–6C, the engine controlling unit (EGI) 9 is adapted and designed so as to keep the engine operated even when the ignition switch (IG) 15 is turned off, or to be enabled by cancelling the comparison between the ID codes (IDs) to restart the engine, in the event where, while the vehicle stands still, it is found that the engine controlling unit (EGI) 9 encounters a fault that the engine controlling unit (EGI) 9 is made impossible to restart the engine, the engine can be restarted even when the ignition switch (IG) 15 is turned off. Further, the indicator 16 lights up to provide an indication that there is a fault in the engine controlling unit (EGI) 9. However, in the event where the breaking down of a communication line between the immobilizer unit (IM) 4 and the engine controlling unit (EGI) 9, because the vehicle antitheft system has no way of transferring information on an occurrence of a fault in the engine controlling unit (EGI) 9 to the immobilizer unit (IM) 4, and hence the indicator 16 is not available, the fault information is stored in EEPROM 10 of the engine controlling unit (EGI) 9 for fault diagnosis at a service shop.

As described above, because the engine controlling unit (EGI) 9 keeps the engine remain operated even when the ignition switch (IG) 15 is turned off only in the event where a fault is found or is enabled by cancelling the comparison between the encoded words (CWs) to restart the engine, on condition that the engine is operating, i.e. the vehicle is traveling, in the event where it is found that the engine controlling unit (EGI) 9 encounters a fault that the engine controlling unit (EGI) 9 is made impossible to restart the engine, the engine can be still restarted even when the ignition switch (IG) 15 is turned off, so as to enable the vehicle to be brought to a service shop.

Figure 13:
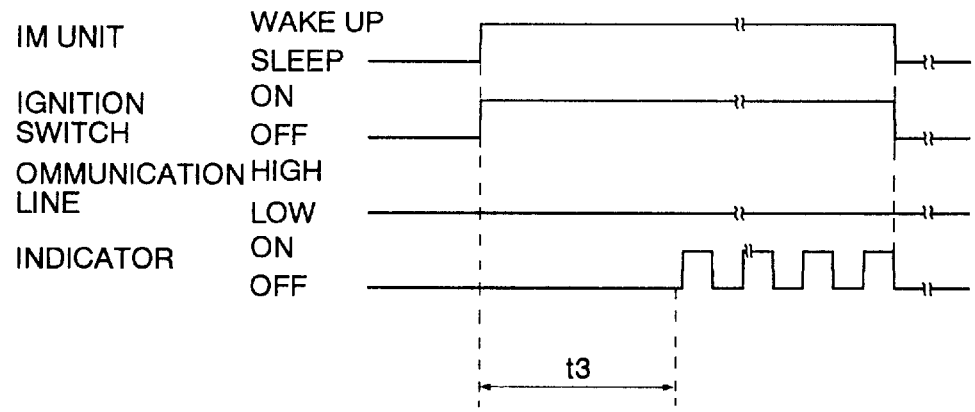
FIG. 13 is a time chart showing operational states of the immobilizer unit and its related elements with respect to operation of the ignition switch as a first step for a fault of the immobilizer unit in a sleep mode.
Figure 14:
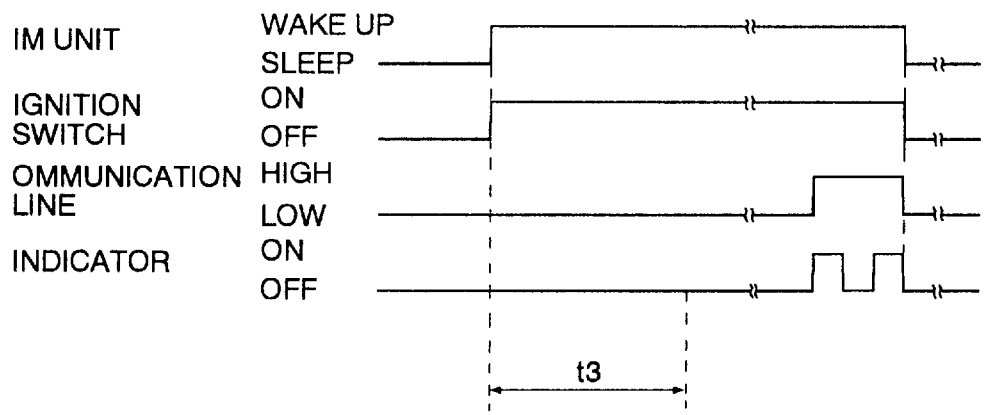
FIG. 14 is a time chart showing operational states of the immobilizer unit and its related elements with respect to operation of the ignition switch as a second step for a fault of the immobilizer unit in the sleep mode.
Figure 15:
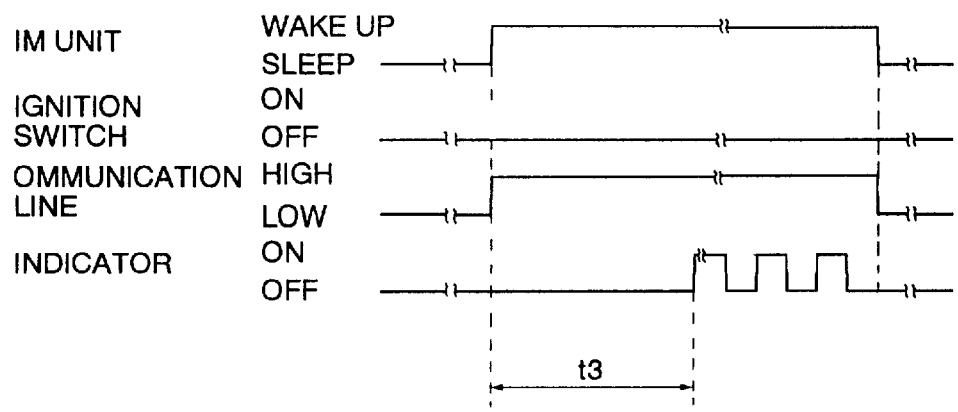
FIG. 15 is a time chart showing operational states of the immobilizer unit and its related elements with respect to operation of the ignition switch as a third step for a fault of the immobilizer unit in the sleep mode.

FIGS. 13–15 are time charts showing operation of the immobilizer unit (IM) 4, the engine controlling unit (EGI) 9, the indicator 16 for first to third steps or measures to meet faults of the immobilizer unit (IM) 4 in the sleep mode. The immobilizer unit (IM) 4 takes the sleep mode in the event where the immobilizer unit (IM) 4 remains in the specified state more than three sec after termination of the operation in the regular operation mode at step S1 13 in the general sequence routine of operation of the engine controlling unit (EGI) 9 shown in FIGS. 6A–6C. As was previously stated, the specific state of the immobilizer unit 9 refers to the state that the ignition switch (IG) 15 is off or open and the communication line between the immobilizer unit (IM) 4 and the engine controlling unit (EGI) 9 is in a low state or open (broken down). When the immobilizer unit (IM) 4 shifts to a state where the ignition switch (IG) 15 is on or the communication line between the immobilizer unit (IM) 4 and the engine controlling unit (EGI) 9 is changes to a high state from the sleep mode, the flow chart logic orders return to the general sequence routine of operation of the immobilizer unit (IM) 4 for another execution. Because the sleep mode is always taken after termination of operation of the regular operation mode, it is a condition for the immobilizer unit (IM) 4 to take the sleep mode that the immobilizer unit (IM) 4 has an ID code (ID) registered therein.

There are faults met by the steps of various types, such as a first type that the ignition switch (IG) 15 is turned on with the result of transmitting no regular request command REQ due to faults of the communication line and/or the engine controlling unit (EGI) 9, a second type that the immobilizer unit (IM) 4 at a connection point to which the power source battery 14 is ordinarily connected through the ignition switch (IG) 15 for some reason or the ignition switch (IG) 15 shorts-circuit, and a third type that the immobilizer unit (IM) 4 is not woken up and disabled to make communication with the engine controlling unit (EGI) 9 although the communication line between the immobilizer unit (IM) 4 and the engine controlling unit (EGI) 9 remains in the high state due to disconnection or improper connection of a connector of the immobilizer unit (IM) 4 with the power source battery 14 through the ignition switch (IG) 15 which does not wake up the immobilizer unit (IM) 4 even when the ignition switch (IG) 15 is turned on.

As the first step to meet the first and second types of faults, as shown in FIG. 13, in the event where the communication line between the immobilizer unit (IM) 4 and the engine controlling unit (EGI) 9 remains still low even after passage of a specified time t3, for example two seconds, since the ignition switch (IG) 15 is turned on with an effect of waking up the immobilizer unit (IM) 4, the indicator 16 is caused to blink on and off so as to provide an indication of an occurrence of a fault. The indicator 16 goes off in response to turning off the ignition switch (IG) 15. Further, as the second step to meet the first and second types of faults, as shown in FIG. 14, in the event where the communication line between the immobilizer unit (IM) 4 and the engine controlling unit (EGI) 9 remains still low even after passage of the specified time t3, for example two seconds, since the ignition switch (IG) 15 is turned on with an effect of waking up the immobilizer unit (IM) 4, the indicator 16 is caused to blink on and off in response to turning on the ignition switch (IG) 15 with an effect of changing the communication line between the immobilizer unit (IM) 4 and the engine controlling unit (EGI) 9 from the low state to the high state for the first time after waking up of the immobilizer unit (IM) 4 so as to provide an indication of an occurrence of a fault. In the second step, the indicator 16 also goes off in response to turning off the ignition switch (IG) 15. The first step has a drawback that the indicator 16 blinking on and off is not noticed by a person unless he or she gets on the vehicle. The second step is, however, characterized in that the indicator 16 blinks on and off as soon as after the ignition switch (IG) 15 is turned on by a person who is in the vehicle, so that the indicator 16 consumes less electric power to blink on and off and provides an efficient indication of an occurrence of faults for the person in the vehicle. As the third step to meet the third type of faults, as shown in FIG. 15, in order to avoid a state in which it is made impossible to start the engine, even while the ignition switch (IG) 15 remains turned off, the immobilizer unit (IM) 4 is woken up when the communication line between the immobilizer unit (IM) 4 and the engine controlling unit (EGI) 9 is changed to the high state. Subsequently, in the event where the ignition switch (IG) 15 remains turned off for the specified time t3, for example two seconds, since the immobilizer unit (IM) 4 is woken up, the indicator 16 is caused to blink on and off.

As described above, even when the immobilizer unit (IM) 4 is disconnected from the power source battery 14 through the ignition switch (IG) 15, because the immobilizer unit (IM) 4 is woken up by way of changing the communication line between the immobilizer unit (IM) 4 and the engine controlling unit (EGI) 9 to the high state, the immobilizer unit (IM) 4 is enabled to start the engine as a result of verification of coincidence between the ID codes (IDs) as long as one of properly approved ignition keys. In cases where it is set forth as the condition of waking up the immobilizer unit (IM) 4 that the ignition switch (IG) 15 is on or the communication line between the immobilizer unit (IM) 4 and the engine controlling unit (EGI) 9 is in the high state, because the ignition switch (IG) 15 is ordinarily turned on at an early timing than the communication line between the immobilizer unit (IM) 4 and the engine controlling unit (EGI) 9 is changed to the high state, the verification of coincidence between the ID codes (IDs) is made earlier when the immobilizer unit (IM) 4 is woken up in response to the turning on of the ignition switch (IG) 15 than when it is woken in response to the change to the high state of the communication line between the immobilizer unit (IM) 4 and the engine controlling unit (EGI) 9. Consequently, in the event where there is an occurrence of a fault, the fault is coped with by way of waking up the immobilizer unit (IM) 4 through the change to the high state of the communication line between the immobilizer unit (IM) 4 and the engine controlling unit (EGI) 9. The immobilizer unit (IM) 4 is able to detect faults of the ignition switch (IG) power line even after the immobilizer unit (IM) 4 has shifted to the sleep mode by way of detecting the communication line remaining in the low state for a certain period of time even while the ignition switch (IG) 15 is on or detecting the communication line remaining in the high state for a certain period of time even while the ignition switch (IG) 15 is off.

Figure 16A:
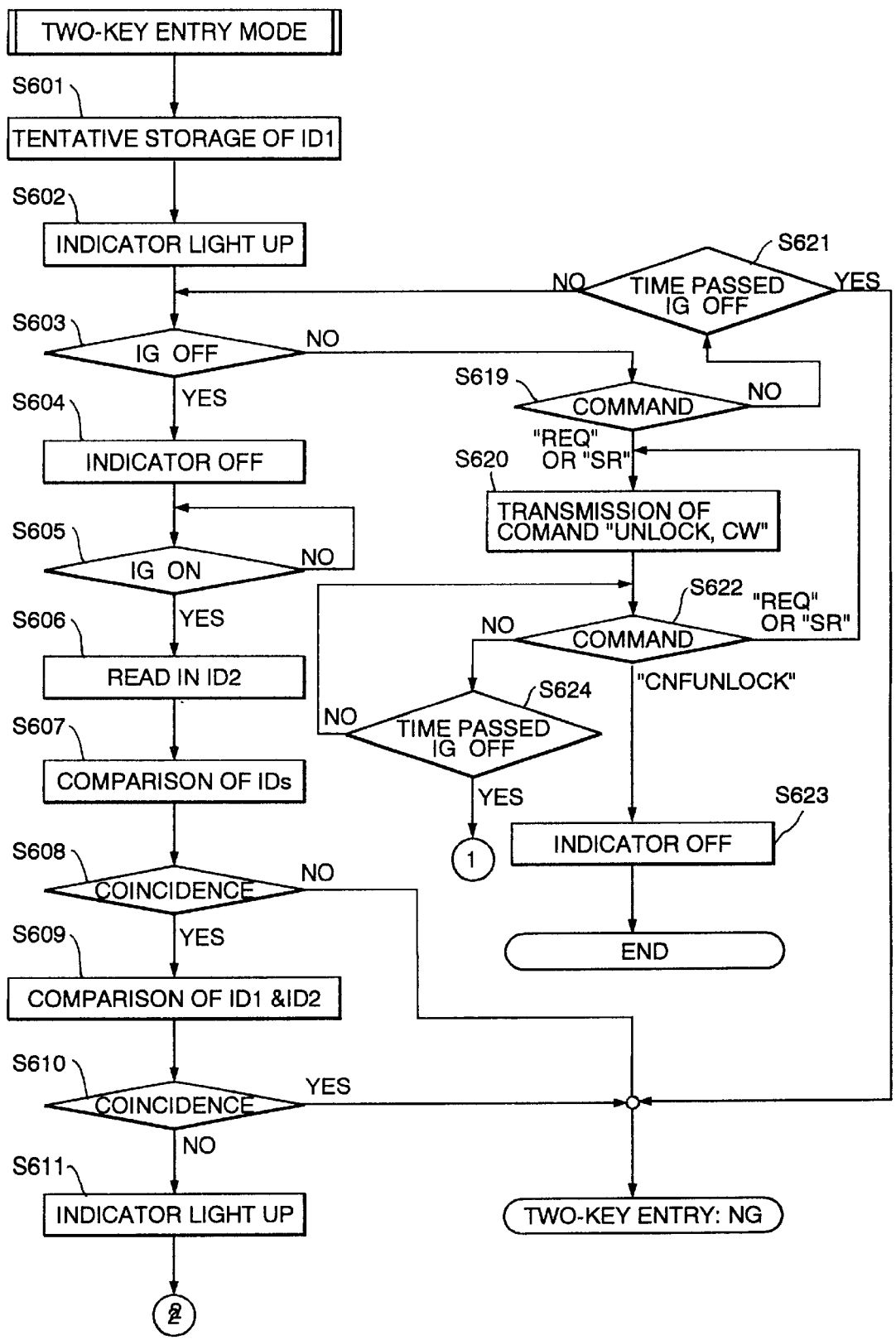
FIGS. 16A and 16B are a flow chart illustrating a sequence routine of operation of the immobilizer unit in a two-key entry mode.
Figure 16B:
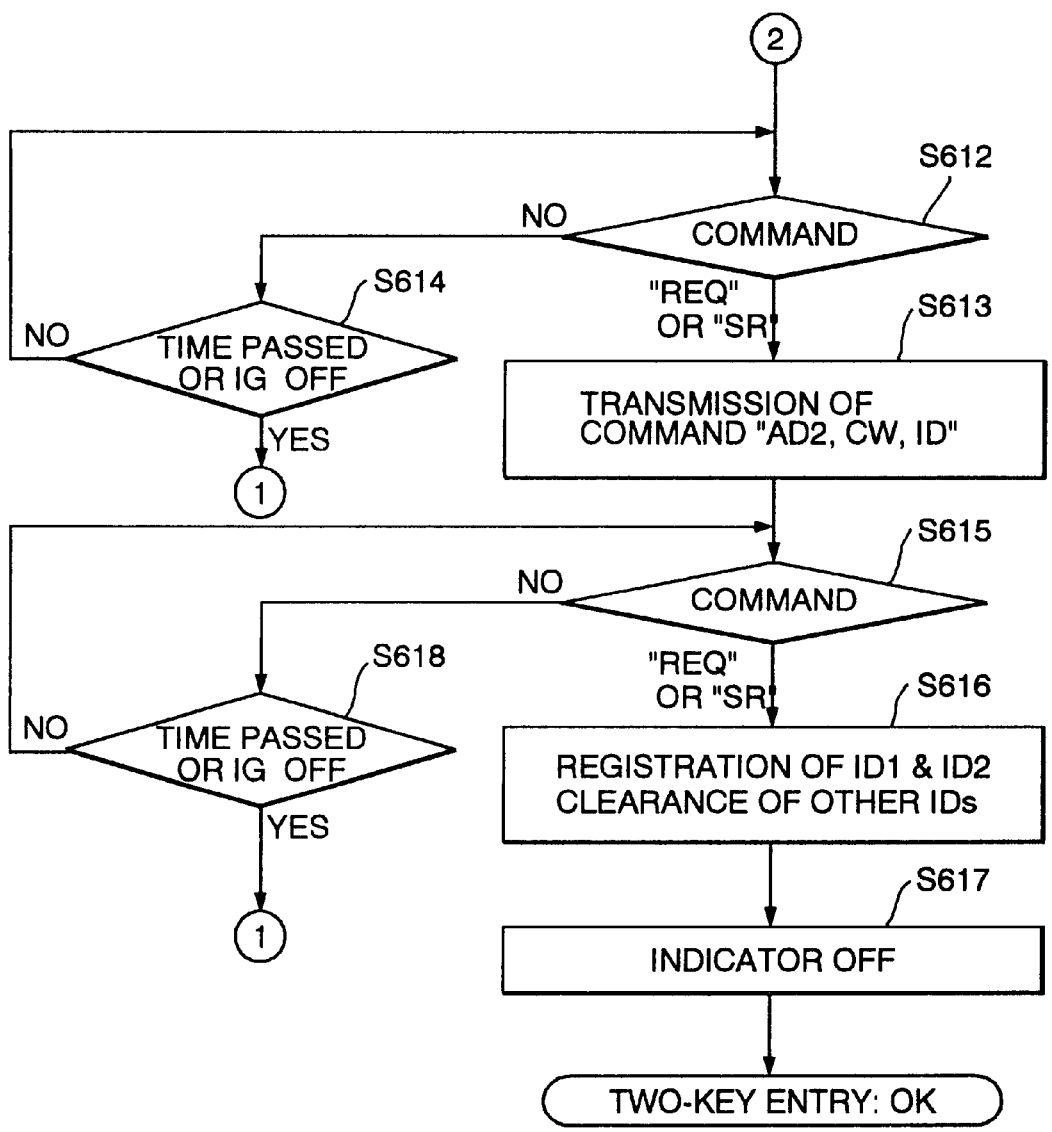

FIGS. 16A and 16B are a flow chart illustrating the sequence routine of operation of the immobilizer unit (IM) 4 in the two-key entry mode. The two-key entry mode is called for as a preparatory mode taken prior to the additional code entry mode for entry of an additional ID code (ID) into the immobilizer unit (IM) 4 or the engine controlling unit (EGI) 9. The entry of an additional ID code (ID) is performed by use of two approved ignition keys having different ID codes (IDs) for the reason of preventing intentional entry of a wrong ID code (ID) by outsiders. That is, in the cases where the vehicle is left in a car park and an ignition key approved for the vehicle is entrusted to a person who takes care of the car park, it must be prevented to make it possible that an person unrelated to the vehicle can enter an ID code (ID) of his or her own ignition key, which is not approved for the vehicle, at his or her discretion after changing the vehicle antitheft system to the additional code entry mode by use of the approved ignition key entrusted to the caretaker.

As was previously described with regard to the general sequence routine of operation of the immobilizer unit (IM) 4 shown in FIG. 5, in the twokey entry mode, after executing the determination as to whether a first approved ignition key $1A_1$ is repeatedly operated to turn on and off the ignition switch (IG) 15 five times at step S103, the immobilizer unit (IM) 4 executes the determination as to whether the ID code (ID) of the ignition key $1A_1$ is one of properly registered ID codes (IDs) at step S106. It is of course that the ID code (ID) is one of the properly registered ID codes (IDs) because the ignition key $1A_1$ is one of properly approved ignition keys. As a result, the immobilizer unit (IM) 4 takes the two-key entry mode. Thereafter, another approved ignition key $1A_2$ is operated to turn on the ignition key 15. When it is verified that an ID code (ID) of the second ignition key $1A_2$ is one of the ID codes (IDs) registered in the immobilizer unit (IM) 4 and there is, however, an absence of coincidence between the ID codes (IDs) of the first and second ignition keys $1A_1$ and $1A_2$, the immobilizer unit (IM) 4 is permitted to take the additional code entry mode. In this condition, the immobilizer unit (IM) 4 and the engine controlling unit (EGI) 9 clear ID codes (IDs) previously registered in their EEPROM 5 and 10 and register the ID codes (IDs) of the first and second ignition keys $1A_1$ and $1A_2$ in their EEPROM 5 and 10. After this, the immobilizer unit (IM) 4 and the engine controlling unit (EGI) 9 in the additional code entry mode permit registration of ID codes (IDs) of ignition keys for approval one after another.

As shown in FIGS. 16A and 16B, when the first ignition key $1A_1$ is verified that an ID code $ID_1$ of the ignition key $1A_1$ consists with one of the ID codes (IDs) registered in the immobilizer unit (IM) 4 at step S106 in the general sequence routine of operation of the immobilizer unit (IM) 4 shown in FIG. 5, the sequence routine of operation of the immobilizer unit (IM) 4 in the two-key entry mode is called for. When the flow chart logic commences and control passes directly to a function block at step S601 where the ID code $ID_1$ is tentatively stored in the RAM 6 of the immobilizer unit (IM) 4. Subsequently, the indicator 16 is caused to light up at step S602. At step S603, it is waited that the ignition key $1A_1$ is operated to turn off the ignition switch (IG) 15. When the ignition switch (IG) 15 is turned off, the indicator 16 goes off at step S604. Subsequently, it is waited that a second ignition key $1A_2$ having an ID code $ID_2$ is operated to turn on the ignition switch (IG) 15 at step S605. When the ignition key 15 is turned on, after reading in the ID code $ID_2$ of the ignition key $1A_2$ at step S606, comparison is executed between the ID code $ID_2$ and ID codes (IDs) previously registered in the immobilizer unit (IM) 4 to determine whether there is a presence of coincidence between them at step S607. When it is verified that these ID codes (IDs) are coincident with each other at step S608, comparison is executed between the ID codes (IDs) $ID_1$ and $ID_2$ to determine whether there is coincidence between them at step S609. When it is verified that these ID codes (IDs) $ID_1$ and $ID_2$ are coincident with each other at step S610, the indicator 16 is caused to light up at step S611.

When there is an absence of coincidence between the ID code $ID_2$ of the ignition key $1A_2$ and the ID codes (IDs) previously registered in the immobilizer unit (IM) 4 at step S608 or when there is a presence of coincidence between the ID codes (IDs) $ID_1$ and $ID_2$ of the ignition keys $1A_1$ and $1A_2$, this indicates that these ignition keys $1A_1$ and $1A_2$ are one and the same, at step S610, the flow chart logic refuses the two-key entry and orders return to the general sequence routine of operation of the immobilizer unit (IM) 4 for another execution. In that event, the person can execute the two-key entry by repeating the general sequence routine of operation of the immobilizer unit (IM) 4. Thereafter, the immobilizer unit (IM) 4 waits transmission of a control command, i.e. the regular request command REQ or the special request command SR, from the engine controlling unit (EGI) 9 at step S612. When any one of the control commands is transmitted from the engine controlling unit (EGI) 9, then, the immobilizer unit (IM) 4 transmits an additional code entry command $AD_2$, the encoded word (CW) and the ID codes (IDs) $ID_1$ and $ID_2$ to the engine controlling unit (EGI) 9 at step S613. On the other hand, when no control command is transmitted for a specified period of time at step S614 or when the ignition switch (IG) 15 is turned off in the specified period of time at step S614, the flow chart logic orders return to the general sequence routine of operation of the (IM) unit 4 for another execution. At step S615, the immobilizer unit (IM) 4 waits again transmission of a control command from the engine controlling unit (EGI) 9. The flow chart logic orders return to step S613 to cause the immobilizer unit (IM) 4 to transmit an additional code entry command $AD_2$, the encoded word (CW) and the ID codes (IDs) $ID_1$ and $ID_2$ to the engine controlling unit (EGI) 9 once again when any one of the regular request command REQ and the special request command SR is transmitted from the engine controlling unit (EGI) 9 or passes to a function block at step S616 where the ID codes (IDs) $ID_1$ and $ID_2$ are registered in both immobilizer unit (IM) 4 and engine controlling unit (EGI) 9 and ID codes (IDs) other than the ID codes (IDs) $ID_1$ and $ID_2$ are cleared if they are previously registered when the ID code entry confirmation command CNFID which confirms the fact that an ID code (ID) and an encoded word (CW) are entered or overwritten in response to the additional code entry commands and is transmitted from the engine controlling unit (EGI) 9. Subsequently, after causing the indicator 16 to go off, this indicates that the two-key code entry is successfully concluded, at step S617, the flow chart logic calls for the sequence routine of operation of the immobilizer unit (IM) 4 in the additional code entry mode. On the other hand, when no control command is transmitted from the engine controlling unit (EGI) 9 for a specified period of time at step S618 or when the ignition switch (IG) 15 is turned off within the specified period of time at step S618, the flow chart logic orders return to the general sequence routine of operation of the (IM) unit 4 for another execution.

When it is determined at step S603 that the ignition switch (IG) 15 remains turned on, the immobilizer unit (IM) 4 waits transmission of a control command, i.e. the regular request command REQ or the special request command SR, from the engine controlling unit (EGI) 9 at step S619. When any one of the control commands is transmitted from the engine controlling unit (EGI) 9, then, the immobilizer unit (IM) 4 transmits the unlock command UNLOCK, the encoded word (CW) to the engine controlling unit (EGI) 9 at step S620. On the other hand, when no control command is transmitted before passage of a specified time at step S621, the flow chart logic orders return to the determination concerning the ignition switch (IG) 15 at step S603. However, when no control command is transmitted for the specified period of time at step S621, the flow chart logic orders return to the general sequence routine of operation of the (IM) unit 4 for another execution. At step S622, the immobilizer unit (IM) 4 waits again transmission of a control command from the engine controlling unit (EGI) 9. The flow chart logic orders return to step S620 to cause the immobilizer unit (IM) 4 to transmit an unlock command UNLOCK and the encoded word (CW) once again when any one of the regular request command REQ and the special request command SR is transmitted from the engine controlling unit (EGI) 9. After causing the indicator 16 to go off at step S623 when the unlock confirmation command CNFUNLOCK, the flow chart logic terminates the sequence routine. The determination is repeated until the immobilizer unit (IM) 4 receives a control command from the engine controlling unit (EGI) 9 within the specified period of time or when the ignition switch (IG) 15 remains turned on. However, when neither the regular request command nor the special request command SR is transmitted from the engine controlling unit (EGI) 9 for a specified period of time at step S624 or when the ignition switch (IG) 15 is turned off within the specified period of time at step S624, the flow chart logic orders return to the general sequence routine of operation of the (IM) unit 4 shown in FIG. 5 for another execution.

In the two-key entry mode described above, after passage of a specified time, for example approximately 60 seconds, for which the ignition switch (IG) 15 remains turned on, or after passage of a specified time, for example approximately 30 seconds, for which the ignition switch (IG) 15 remains turned off, the flow chart logic refuses the two-key entry and orders return to the general sequence routine of operation of the immobilizer unit (IM) 4 shown in FIG. 5 for another execution.

Figure 17A:
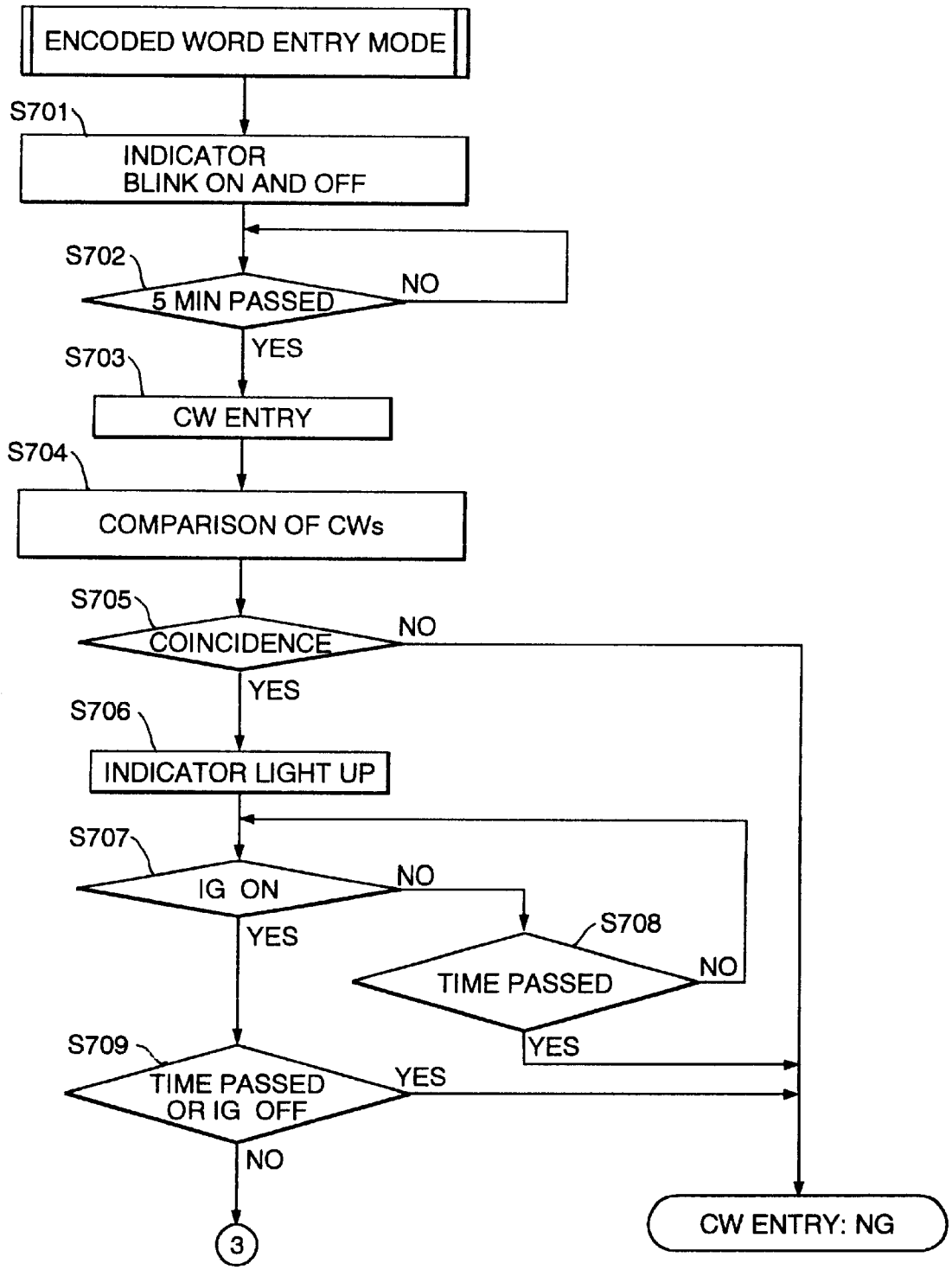
FIGS. 17A and 17B are a flow chart illustrating a sequence routine of operation of the immobilizer unit in an encoded word entry mode.
Figure 17B:
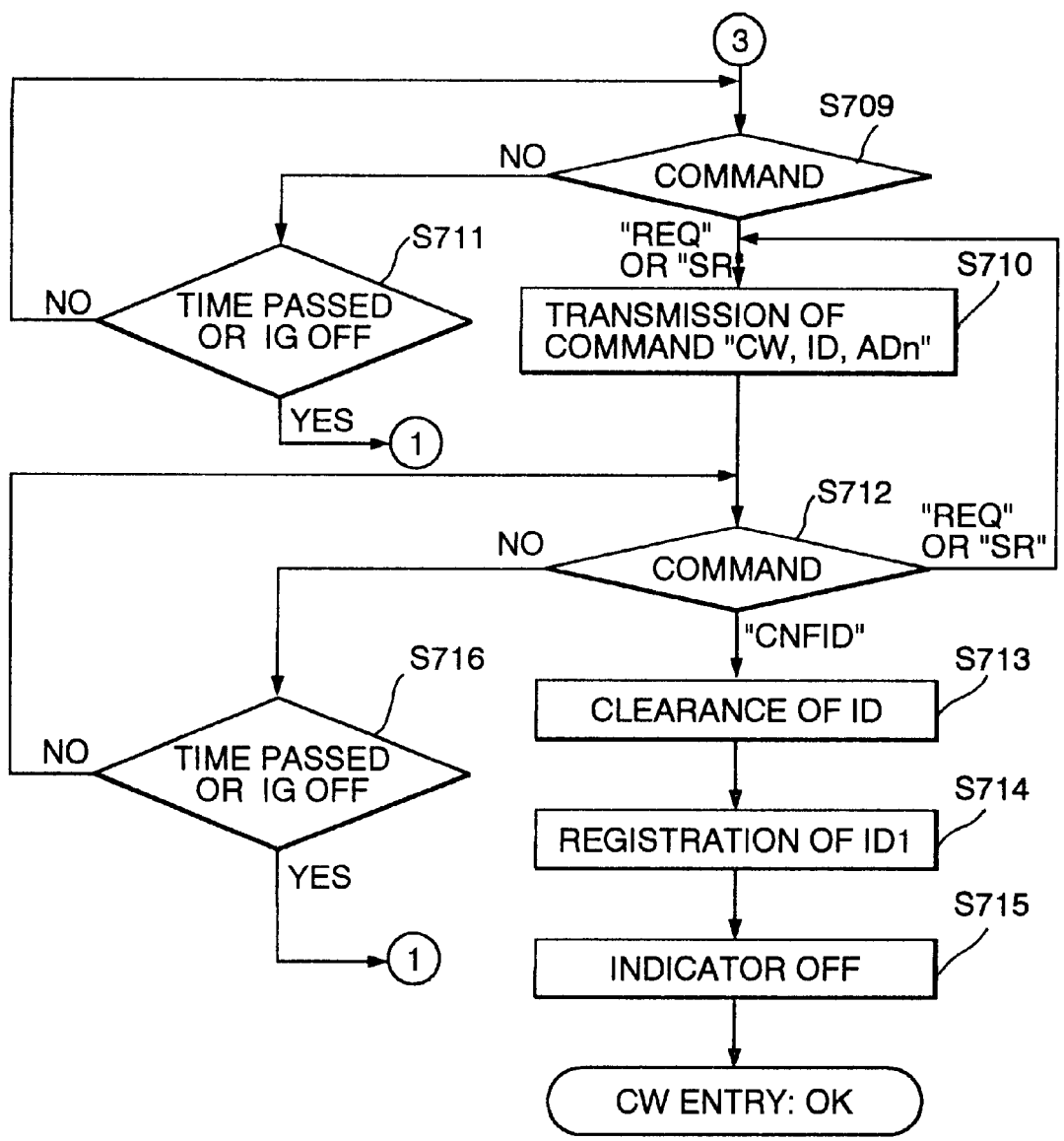

FIGS. 17A and 17B are a flow chart illustrating the sequence routine of operation of the immobilizer unit (IM) 4 in the encoded word entry mode which is called for as a preparatory mode taken prior to the additional code entry mode for entry of an additional ID code (ID) into the immobilizer unit (IM) 4 or the engine controlling unit (EGI) 9. In the event where all approved ignition keys or all approved ignition keys but one are lost, the entry of an encoded word (CW) is performed by use of an ignition key whose ID code (ID) is intended to be registered. In the encoded word entry mode, after executing the determination as to whether an ignition key 1A not yet approved is repeatedly operated to turn on and off the ignition switch (IG) 15 five times at step S103, the immobilizer unit (IM) 4 executes the determination as to whether the ID code (ID) of the ignition key 1A is one of properly registered ID codes (IDs) at step S106. It is of course that the ID code (ID) is not one of the properly registered ID codes (IDs) because the ignition key 1A is not properly approved. As a result, the encoded word entry mode is called for. Thereafter, while the indicator 16 is caused to blink on and off, the ignition key 1A is operated to turn the ignition switch (IG) on and off to enter an encoded word (CW) manually. In this way, the immobilizer unit (IM) 4 is placed in the additional code entry mode for entry of the ID code (ID) of the not-approved ignition key 1A into both EEPROM 5 of the immobilizer unit (IM) 4 and EEPROM 10 of the engine controlling unit (EGI) 9. Thereafter, the immobilizer unit (IM) 4 and the engine controlling unit (EGI) 9 in the additional code entry mode permit registration of ID codes (IDs) of ignition keys for approval one after another.

Figure 18:
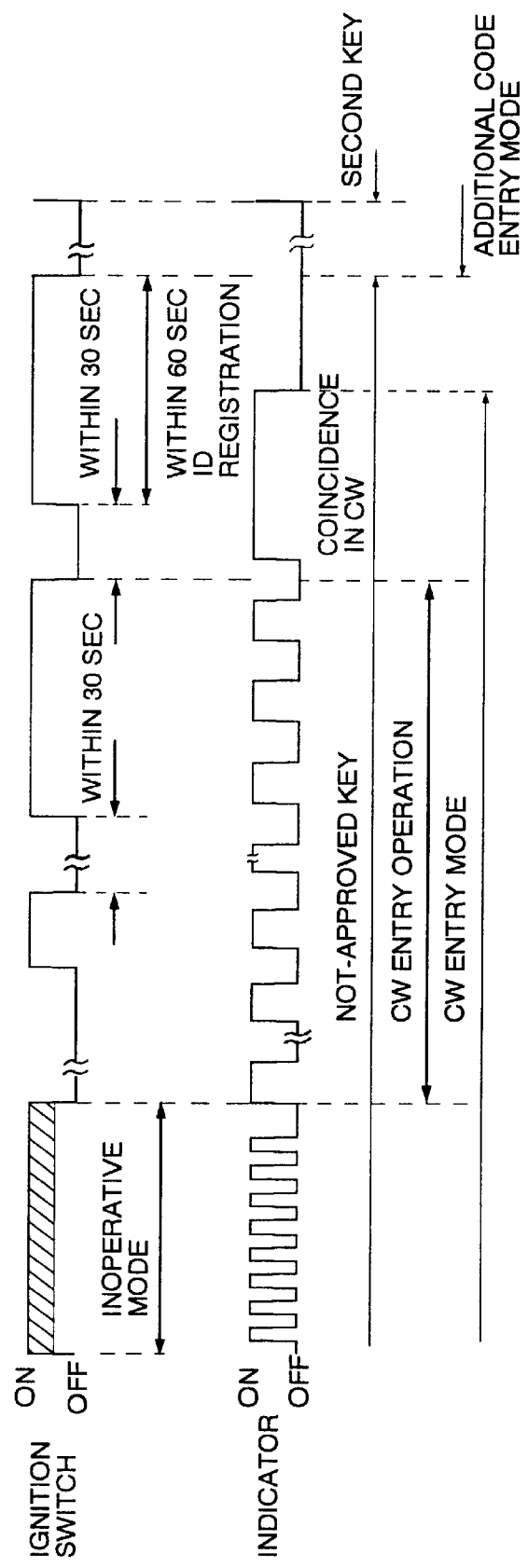
FIG. 18 is a time chart of operation of the indicator with respect to operation of the ignition switch during an encoded word entry.

As shown in FIGS. 17A and 17B, when the sequence routine of operation of the immobilizer unit (IM) 4 in the encoded word entry mode is called for, after causing the indicator 16 to blink on and off at step S701, passage of a specified time, for example five minutes, is waited at step S702. As shown in FIG. 18, for the specified time, the indicator 16 blinks on and off at regular intervals, for example 0.3 seconds, and the immobilizer unit (IM) 4 takes an inoperative mode in which the immobilizer unit (IM) 4 refuses any request command, i.e. the regular request command REQ or the special request command SR, transmitted from the engine controlling unit (EGI) 9. After passage of the specified time, encoded word entry is performed by means of specified operation of the ignition switch (IG) 15 through an not-approved ignition key 1A at step S703. Subsequently, comparison is made between the encoded word (CW) entered by use of the non-approved ignition key 1A and the encoded word (CW) having been registered in EEPROM 5 of the immobilizer unit (IM) 4 at step S704. When it is verified that there is a presence of coincidence between these encoded words (CWs) at step S705, after causing the indicator 16 to light up at step S706, it is waited that the non-approved ignition key 1A is operated to turn the ignition switch (IG) 15 on at step S707. The determination concerning the ignition switch (IG) 15 is repeated until a specified period of time passes at step S708. When the ignition switch (IG) 15 is not turned on for the specified period of time, the flow chart logic refuses the encoded word entry and orders return to the general sequence routine of operation of the immobilizer unit (IM) 4 shown in FIG. 5 for another execution. When the ignition switch (IG) 15 is turned on in the specified period of time, the immobilizer unit (IM) 4 waits transmission of a control command, i.e. the regular request command REQ or the special request command SR, from the engine controlling unit (EGI) 9 at step S709. When any one of the control commands is transmitted from the engine controlling unit (EGI) 9, then, the immobilizer unit (IM) 4 transmits an additional code entry command $AD_n$, the encoded word (CW) and the ID codes (IDs) to the engine controlling unit (EGI) 9 at step S710. On the other hand, when no control command is transmitted for a specified period of time at step S711 or when the ignition switch (IG) 15 is turned off within the specified period of time at step S711, the flow chart logic orders return to the general sequence routine of operation of the (IM) unit 4 for another execution. At step S712, the immobilizer unit (IM) 4 waits again transmission of a control command from the engine controlling unit (EGI) 9. The flow chart logic orders return to step S712 to cause the immobilizer unit (IM) 4 to transmit the additional code entry command $AD_n$, the encoded word (CW) and the ID codes (IDs) to the engine controlling unit (EGI) 9 once again when any one of the regular request command REQ and the special request command SR is transmitted from the engine controlling unit (EGI) 9 or passes to a function block at step S713 where the ID codes (IDs), if registered in EEPROM 5, are cleared when the ID code entry confirmation command CNFID is transmitted from the engine controlling unit (EGI) 9. Subsequently, the ID code (ID) is registered in EEPROM 5 of the immobilizer unit (IM) 4 at an address designated by the additional code entry command $AD_n$ at step S714. After causing the indicator 16 to go off at step S715, this indicates that the encoded word entry is successfully concluded, the flow chart logic calls for sequence routine of the immobilizer unit (IM) 4 in the additional code entry mode. On the other hand, when no control command is transmitted from the engine controlling unit (EGI) 9 for a specified period of time at step S716 or when the ignition switch (IG) 15 is turned off within the specified period of time at step S716, the flow chart logic orders return to the general sequence routine of operation of the (IM) unit 4 for another execution.

In the encoded word entry mode, when the ignition switch (IG) 15 remains turned on for a specified period of time, for example 60 seconds or when it remains turned off for a specified period of time, for example 30 seconds, the flow chart logic refuses encoded word entry and orders return to the general sequence routine of operation of the (IM) unit 4 for another execution.

Referring to FIG. 18 which is a time chart showing operation of the indicator 16 in the encoded word entry mode, intervals at which the indicator 16 blinks on and off are prolonged longer after termination of the inoperative mode, which is caused by turning off the ignition switch (IG) 15, than within the period of the inoperative mode. Termination of the inoperative mode permits manual entry of an encoded word (CW) through specified operation of an not-approved ignition key 1A. When there is a presence of coincidence between the encoded word (CW) manually entered and the encoded word (CW) registered in the immobilizer unit (IM) 4, the indicator 16 lights up. Then, the ID code (ID) of the not-approved ignition key 1A is registered in EEPROM 5 of the immobilizer unit 9 when the not-approved ignition key 1A is operated to turn on the ignition switch (IG) 15 within 30 seconds from the specified encoded word entry operation of the not-approved ignition key 1A. The flow chart logic calls for the sequence routine of operation of the immobilizer unit (IM) 4 in the additional code entry mode in response to tuning off the ignition key 1A within 60 seconds after turning on the ignition switch (IG) 15.

Figure 19:
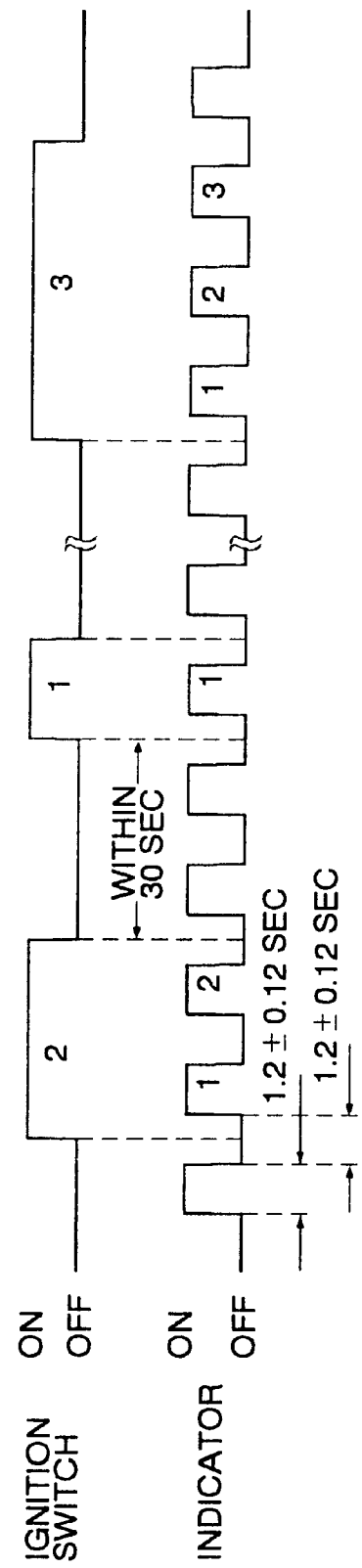
FIG. 19 is a time chart of operation of the indicator with respect to operation of the ignition switch for an encoded word entry.

FIG. 19 is a time chart of specific operation of the ignition switch (IG) 15 necessary to perform the encoded word entry by means of a not-approved ignition key 1A at step S703 in the sequence routine of operation of the immobilizer unit (IM) 4 in the encoded word (CW) entry mode. As shown in FIG. 19, in the encoded word entry mode, the indicator 16 is caused to blink on and off at regular intervals of, for example, approximately 1.2 seconds. In order to enter an encoded word (CW) of a not-approved ignition key 11A, the not-approved ignition key 1A is operated for the first time so that the ignition switch (IG) 15 remains turned on for a period of time within which the indicator 16 blinks on and off twice. Subsequently, it is operated for the second time within 30 seconds after the first operation of the not-approved key 1A so as to remain the ignition switch (IG) 15 turned on for a period of time within which the indicator 16 blinks on and off once. Finally, it is operated for the third time within 30 seconds after the second operation of the not-approved key 1A so as to remain the ignition switch (IG) 15 turned on for a period of time within which the indicator 16 blinks on and off three times. In the event where all of the approved ignition keys are lost, the immobilizer unit (IM) 4 is put in the additional code entry mode by means of these three times of operation of the not-approved ignition key 1A without using a special tool.

Additional code entry mode is used to alter the registered ID codes (IDs) in EEPROMs 5 and 10 of the immobilizer unit (IM) 4 and the engine controlling unit (EGI) 9 through a not-approved ignition key in order to prevent persons unrelated to the vehicle from using one of the approved ignition keys to start the engine for the purpose of theft, and is made available only when the two-key entry or the encoded word entry is successfully concluded. Each EEPROM 5, 10 has a capacity to store at most eight ID codes (IDs).

Figure 20:
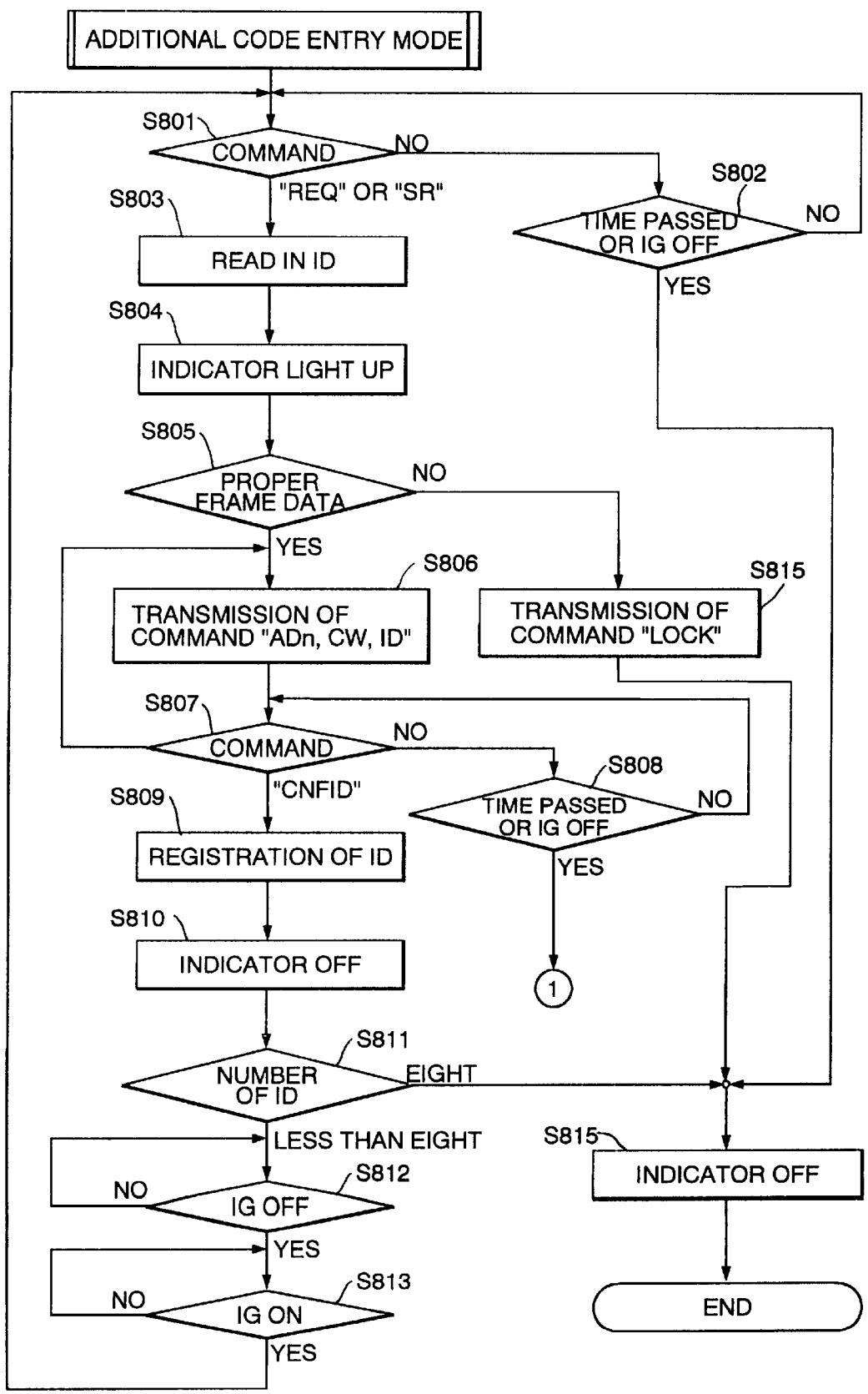
FIG. 20 is a flow chart illustrating a sequence routine of operation of the immobilizer unit in an additional code entry mode.

FIG. 20 is a flow chart illustrating the sequence routine of operation of the immobilizer unit (IM) 4 in the additional code entry mode which is called for when, the ignition switch (IG) 15 is turned on again at step S108 subsequently to being turned off at step S107 after a conclusion of two-key entry at step S1200 or encoded word entry at step S1300 in the general sequence routine shown in FIG. 5. When an ignition key 1A put in the key cylinder 2A is operated to turn on the ignition switch (IG) 15 at step S108, the sequence routine of operation the immobilizer unit (IM) 4 in the additional code entry mode is called for. The flow chart logic commences and control passes to a function block at step S801 where the immobilizer unit (IM) 4 waits transmission of a control command, i.e. the regular request command REQ or the special request command SR, from the engine controlling unit (EGI) 9. When neither the regular request command REQ nor the special request command SR is transmitted from the engine controlling unit (EGI) 9 for a specified period of time at step S802 or when the ignition switch (IG) 15 is turned off within the specified period of time at step S802, after causing the indicator 16 to go off at step S815, the flow chart logic terminates the sequence routine of operation of the (IM) unit 4 in the additional code entry mode. On the other hand, when any one of the regular request command REQ and the special request command SR is transmitted from the engine controlling unit (EGI) 9 within the specified period of time at step S801, after reading in an ID code (ID) of the ignition key 1A through the transponder 1 at step S803, the immobilizer unit (IM) 4 causes the indicator 16 to light up at step S804. Subsequently, a determination is made at step S805 as to whether the ID code (ID) read in has a proper data frame. In this instance, in order to make determination of proper data frame of an ID code (ID), the ID code (ID) is read in three times and is regarded as having a proper data frame when there is a presence of coincidence among all of the three ID codes (IDs). When the ID code (ID) has an improper data frame, after transmitting the lock command LOCK to the engine controlling unit (EGI) 9 at step S814 and subsequently causing the indicator 16 to go off at step S815, the flow chart logic terminates the sequence routine of operation of the (IM) unit 4 in the additional code entry mode.

When the ID code (ID) has a proper data frame, the immobilizer unit (IM) 4 transmits an additional code entry command $AD_n$, the encoded word (CW) and the ID code (ID) to the engine controlling unit (EGI) 9. Subsequently, the immobilizer unit (IM) 4 waits transmission of a control command, i.e. the regular request command REQ or the special request command SR, from the engine controlling unit (EGI) 9 again at step S807. When neither the regular request command REQ nor the special request command SR is transmitted from the engine controlling unit (EGI) 9 for a specified period of time at step S808 or when the ignition switch (IG) 15 is turned off within the specified period of time at step S808, the flow chart logic orders return to the general sequence routine of operation of the (IM) unit 4 for another execution. Otherwise, the immobilizer unit (IM) 4 transmits an additional code entry command $AD_n$, the encoded word (CW) and the ID code (ID) to the engine controlling unit (EGI) 9 again at step S806 when receiving any one of the regular request command REQ and the special request command SR, from the engine controlling unit (EGI) 9 at step S807 or stores the ID code (ID) read in at step S802 in EEPROM 5 thereof for registration at step S809 when receiving an ID code entry confirmation command CNFID. After causing the indicator to go off at step S810, a determination is made at step S811 as to what is the number of ID codes (IDs) stored and registered in EEPROM 5. When the number of ID codes (IDs) is eight, after causing the indicator 16 to go off at step S815, the flow chart logic terminates the sequence routine of operation of the (IM) unit 4 in the additional code entry mode. On the other hand, when the number of ID codes (IDs) is less than eight, it is waited that the ignition key 1A is operated to turn off the ignition switch (IG) 15 once at step S812 and subsequently to turn on the ignition switch (IG) 15 again at step S813 for another additional code entry. In the additional code entry mode, when the ignition switch (IG) 15 remains turned on for a specified period of time, for example 60 seconds, or when it remains turned off for a specified period of time, for example 30 seconds, the flow chart logic refuses two-key entry and orders return to the general sequence routine of operation of the (IM) unit 4 for another execution.

Figure 21A:
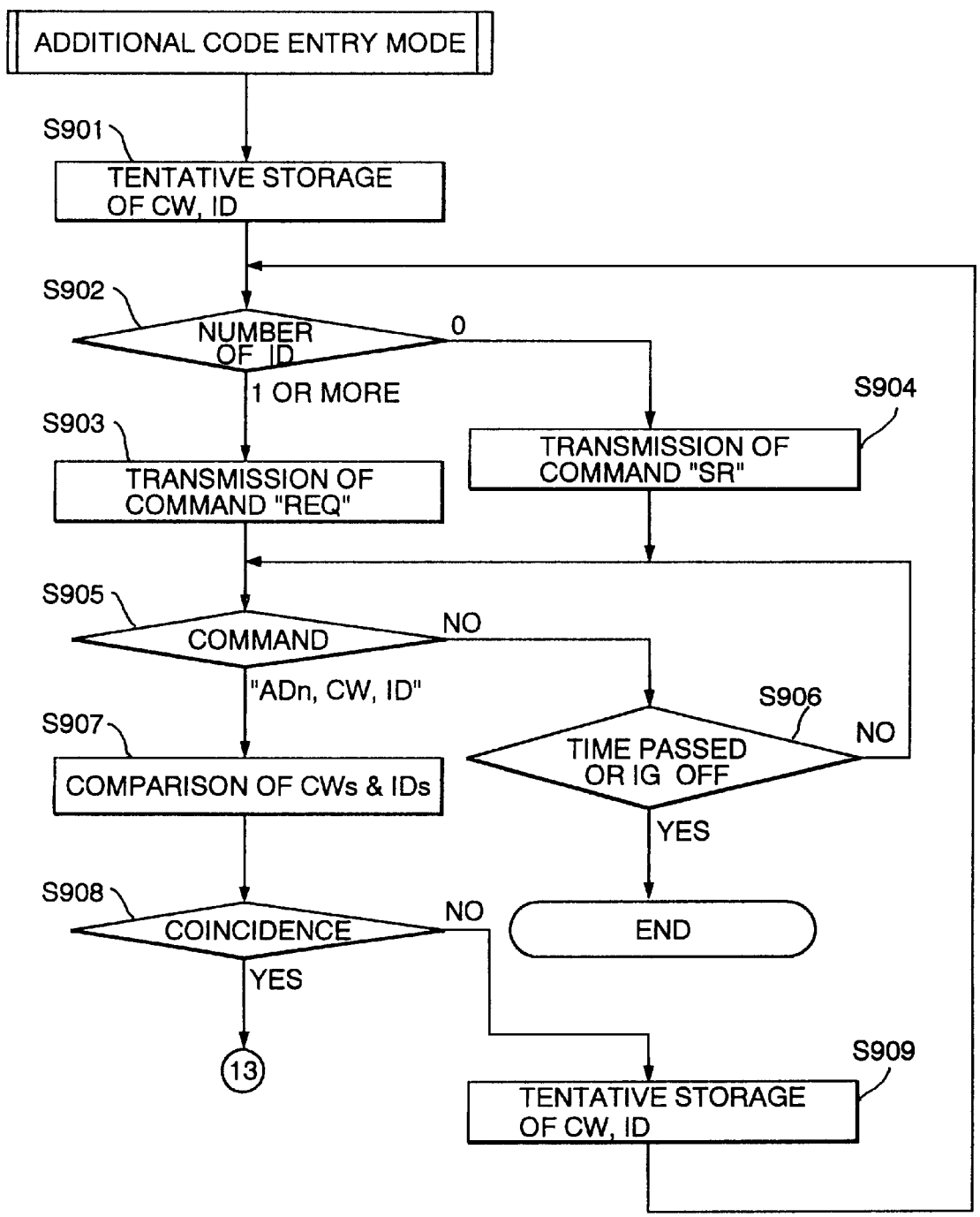
FIGS. 21A and 21B are a flow chart illustrating a sequence routine of operation of the engine controlling unit in the additional code entry mode.
Figure 21B:
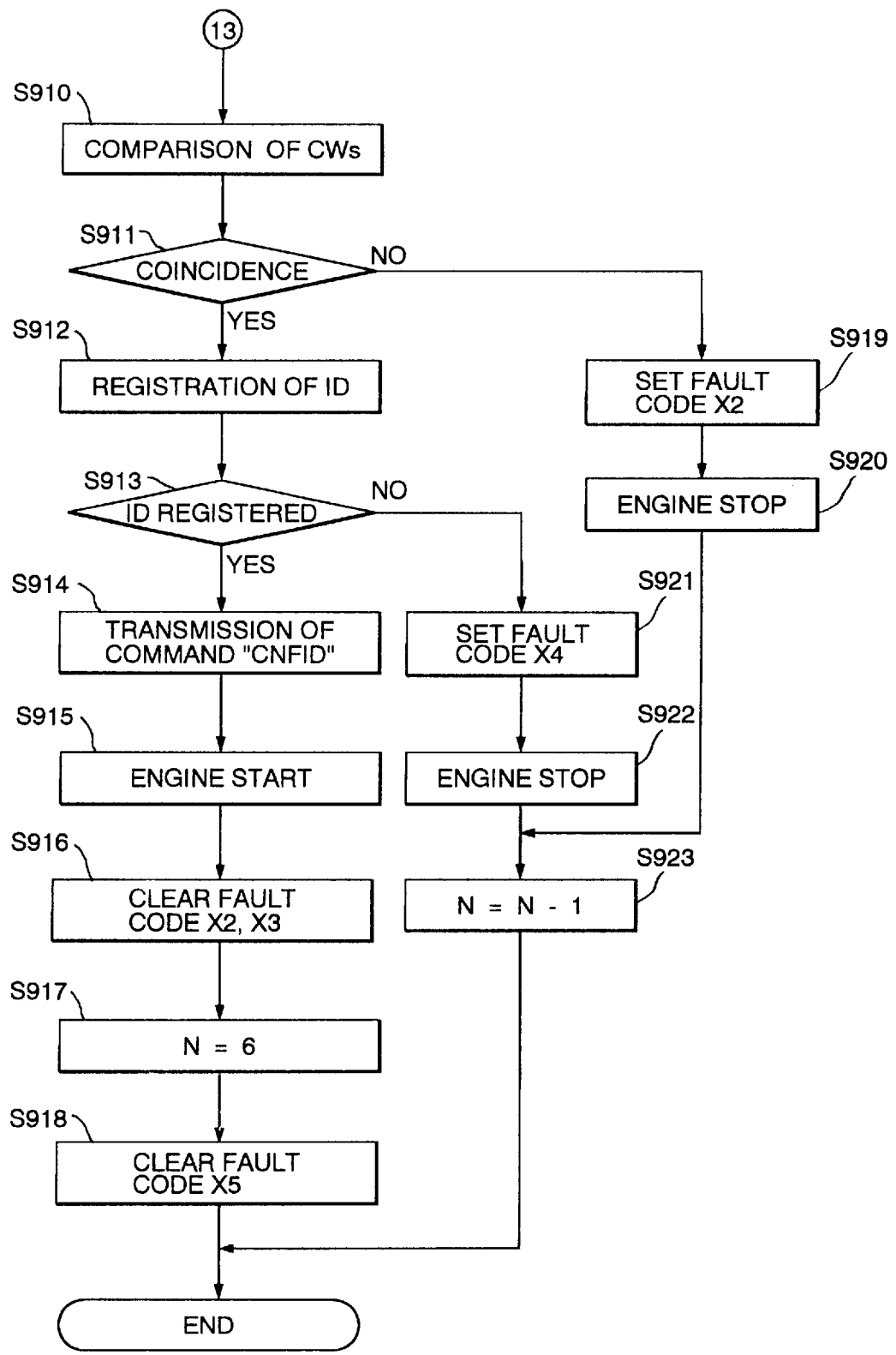

FIGS. 21A and 21B are a flow chart illustrating the sequence routine of operation of the engine controlling unit (EGI) 9 in the additional code entry mode which is called for when the engine controlling unit (EGI) 9 receives an additional code entry command $AD_n$ and the encoded word (CW) and the ID code (ID) from the immobilizer unit (IM) 4 after a conclusion of two-key entry or encoded word entry in the immobilizer unit (IM) 4.

Sequence routine of operation of the engine controlling unit (EGI) 9 in the additional code entry mode is called for when the engine controlling unit (EGI) 9 receives the additional code entry command $AD_n$, the encoded word (CW) and the ID code (ID) at step S210 or S226 in the general sequence routine of operation of the engine controlling unit (EGI) 9 shown in FIGS. 6A–6C. The flow chart logic commences and control passes directly to a function block at step S901 where the additional code entry command $AD_n$ and the encoded word (CW) and the ID code (ID) are tentatively stored in RAM 11 of the engine controlling unit (EGI) 9. Subsequently, a determination is made at step S902 as to how many ID codes (IDs) have been stored and registered in EEPROM 10 of the engine controlling unit (EGI) 9. The engine controlling unit (EGI) 9 transmits a regular request command REQ to the immobilizer unit (IM) 4 at step S903 when one or more ID codes (IDs) have been registered, or transmits a special request signal SR to the immobilizer unit (IM) 4 at step S904 when no ID code (ID) is registered. After transmitting a request signal REQ or SR, the engine controlling unit (EGI) 9 waits transmission of a control command from the immobilizer unit (IM) 4 for a specified period of time at step S905. When no control command is transmitted from the immobilizer unit (IM) 4 for a specified period of time at step S906 or when the ignition switch (IG) 15 is turned off within the specified period of time at step S906, the flow chart logic orders return to the general sequence routine of operation of the (EGI) unit 9 for another execution. On the other hand, when the engine controlling unit (EGI) 9 receives an additional code entry command $AD_n$, the encoded word (CW) and the ID code (ID) from the immobilizer unit (IM) 4, comparison is made between the encoded words (CWs) and the ID codes (IDs) tentatively stored in RAM 11 of the engine controlling unit (EGI) 9 and transmitted from the immobilizer unit (IM) 4 at step S907. When there is an absence of coincidence either between the encoded words (CWs) or between the ID codes (IDs) at step S908, after tentatively storing the encoded word (CW) and the ID code transmitted from the immobilizer unit (IM) 4 in RAM 11 of the engine controlling unit (EGI) 9 at step S909, the determination concerning the number of ID codes (IDs) stored and registered in EEPROM 10 again at step S902. On the other hand, when there is a presence of coincidence between the encoded words (CWs) and between the ID codes (IDs), comparison is made between the encoded word (CW) transmitted from the immobilizer unit (IM) 4 and the encoded word (CW) registered in EEPROM 10 of the engine controlling unit (EGI) 9 at step S910. Subsequently, a determination is made at step S911 as to whether there is a presence of coincidence between the encoded words (CWs). When there is a presence of coincidence between the encoded words (CWs), the ID code (ID) transmitted from the immobilizer unit (IM) 4 is stored and registered in EEPROM 10 of the engine controlling unit (EGI) 9 at an address designated by the additional code entry command $AD_n$ at step S912. When it is verified that the ID code (ID) is certainly registered in EEPROM 10 at step S913, an ID code entry confirmation command CNFID is transmitted to the immobilizer unit (IM) 4 at step S914. In this instance, the engine controlling unit (EGI) 9 is permitted to try registration of an ID code (ID) at most three times until the ID code (ID) is properly registered in EEPROM 10. If all of three times of registration of the ID code (ID) end in failure, it is determined that registration of the ID code (ID) is refused. At step S915, the engine controlling unit (EGI) 9 permits the engine to continue to operate. After clearing the fault codes X2 and X3 if having been set in the engine controlling unit (EGI) 9 at step S916, the count N of the communication counter is set to six at step S917. Subsequently, after clearing the fault code X5 if having been set in the engine controlling unit (EGI) 9 at step S918, the flow chart logic terminates the additional code entry sequence routine and orders return to the general sequence routine for another execution.

On the other hand, when there is an absence of coincidence between the CW codes at step S911, after setting the fault code X2 in the engine controlling unit (EGI) 9 at step S919, the engine controlling unit (EGI) 9 stops the engine at step S920. Subsequently, after changing the count N of the communication counter by a decrement of one at step S921, the flow chart logic terminates the additional code entry sequence routine and orders return to the general sequence routine for another execution. Further, if registration of the ID code (ID) ends in failure at step S913, after setting the fault code X4 in the engine controlling unit (EGI) 9 at step S921, and stopping the engine at step S922 in order, the count N of the communication counter is changed by a decrement of one at step S923. Finally, the flow chart logic terminates the additional code entry sequence routine and orders return to the general sequence routine for another execution.

Figure 22:
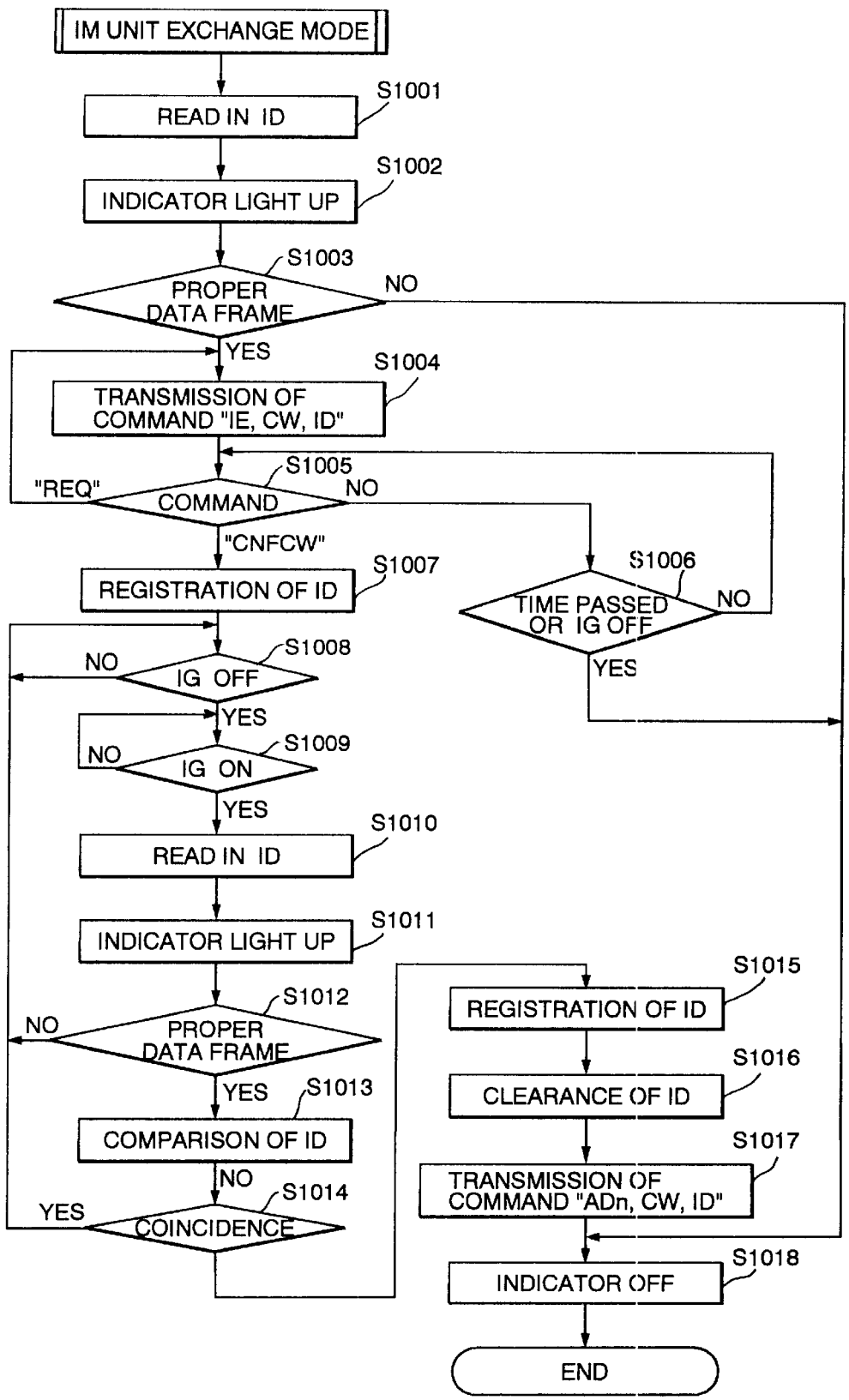
FIG. 22 is a flow chart illustrating a sequence routine of operation of the immobilizer unit in an IM unit exchange mode.

FIG. 22 is a flow chart illustrating the sequence routine of operation of the immobilizer unit (IM) 4 in the IM unit exchange mode. This exchange mode is effected in the event where a new immobilizer unit (IM) 4 is installed in the vehicle antitheft system in place of the old immobilizer unit (IM) 4 and called for only when the immobilizer unit (IM) 4 has no ID code (ID) registered in EEPROM 5 at all and receives a regular request command REQ at step S102 in the general sequence routine of operation the immobilizer unit shown in FIG. 5. Each new immobilizer unit has an encoded word (CW) registered in EEPROM at the manufacturer. In the IM unit exchange mode, an ID code (ID) is newly registered in the immobilizer unit (IM) 4.

As shown in FIG. 22, when an new immobilizer unit receives a general request command REQ from the engine controlling unit (EGI) 9 at step S109 in the general sequence routine of operation of the immobilizer unit shown in FIG. 5, the immobilizer unit (IM) 4 reads in an ID code (ID) of an ignition key 1A put in the key cylinder 2A through the transponder 1 at step S1001 and subsequently causes the indicator 16 to light up at step S1002. At step S1003, a determination is made as to whether the ID code (ID) read in has a proper data frame. In this instance, in order to make determination of proper data frame of an ID code (ID), the ID code (ID) is read in three times and the ID code (ID) is regarded as having a proper data frame when there is a presence of coincidence among all of the three ID codes (IDs). If the ID code (ID) has an improper data frame, after causing the indicator 16 to go off at step S1018, the flow chart logic terminates the IM unit exchange sequence routine and orders return to the general sequence routine of operation of the immobilizer unit (IM) 4 for another execution. On the other hand, when the ID code (ID) has a proper data frame, the immobilizer unit (IM) 4 transmits an exchange command and the ID code (ID) and encoded word (CW) to the engine controlling unit (EGI) 9 at step S1004. Thereafter, the immobilizer unit 9 waits transmission of control commands from the engine controlling unit (EGI) 9 for a specified period of time at step S1005. When a regular request command REQ is transmitted from the engine controlling unit (EGI) 9, the immobilizer unit (IM) 4 transmits an exchange command IE and the ID code (ID) and encoded word (CW) to the engine controlling unit (EGI) 9 once again at step S1004. When no control command is transmitted from the engine controlling unit (EGI) 9 for the specified period of time at step S1006 or when the ignition switch (IG) 15 is turned off within the specified period of time at step S1006, the flow chart logic terminates the IM unit exchange sequence routine and orders return to the general sequence routine of operation of the (IM) unit 4 for another execution. On the other hand, when an encoded word (CW) entry confirmation code CNFCW is transmitted from the engine controlling unit (EGI) 9, after storing and registering the ID code (ID) in RAM 6 of the immobilizer unit (IM) 4 at step S1007, it is waited that the ignition key 1A is operated to turn off the ignition switch (IG) 15 once at step S1008 and subsequently to turn on the ignition switch (IG) 15 again at step S1009. Thereafter, the immobilizer unit (IM) 4 reads in an ID code (ID) of an ignition key 1A put in the key cylinder 2A through the transponder 1 again at step S1010 and subsequently causes the indicator 16 to light up at step S1011. At step S1012, a determination is made as to whether the ID code (ID) read in has a proper data frame. If the ID code (ID) has an improper data frame, after causing the indicator 16 to go off at step S1018, the flow chart logic terminates the IM unit exchange sequence routine and orders return to the general sequence routine of operation of the immobilizer unit (IM) 4 for another execution. On the other hand, when there is a presence of coincidence, then, comparison is made between the ID code (ID) tentatively stored in RAM 6 of the immobilizer unit (IM) 4 and the ID code (ID) read in at step S1013. When it is verified that there is a presence of coincidence between the ID codes (IDs) at step S1014, it is waited that the ignition key 1A is operated to turn off the ignition switch (IG) 15 once at step S1008 and subsequently to turn on the ignition switch (IG) 15 again at step S1009. However, when it is verified that there is an absence of coincidence between the ID codes (IDs) at step S1014, after storing and registering these ID codes (IDs) in EEPROM 5 of the immobilizer unit (IM) 4 at step S1015 and subsequently clearing the ID code (ID) tentatively stored in RAM 6 of the immobilizer unit (IM) 4 at step S1016, the immobilizer unit (IM) 4 transmits an additional code entry command $AD_n$ and the ID command received from the transponder 1 to the engine controlling unit (EGI) 9 at step S1017. Finally, after causing the indicator 16 to go off at step S1018, the flow chart logic terminates the IM unit exchange sequence routine and orders return to the general sequence routine of operation of the immobilizer unit (IM) 4 for another execution.

Figure 23A:
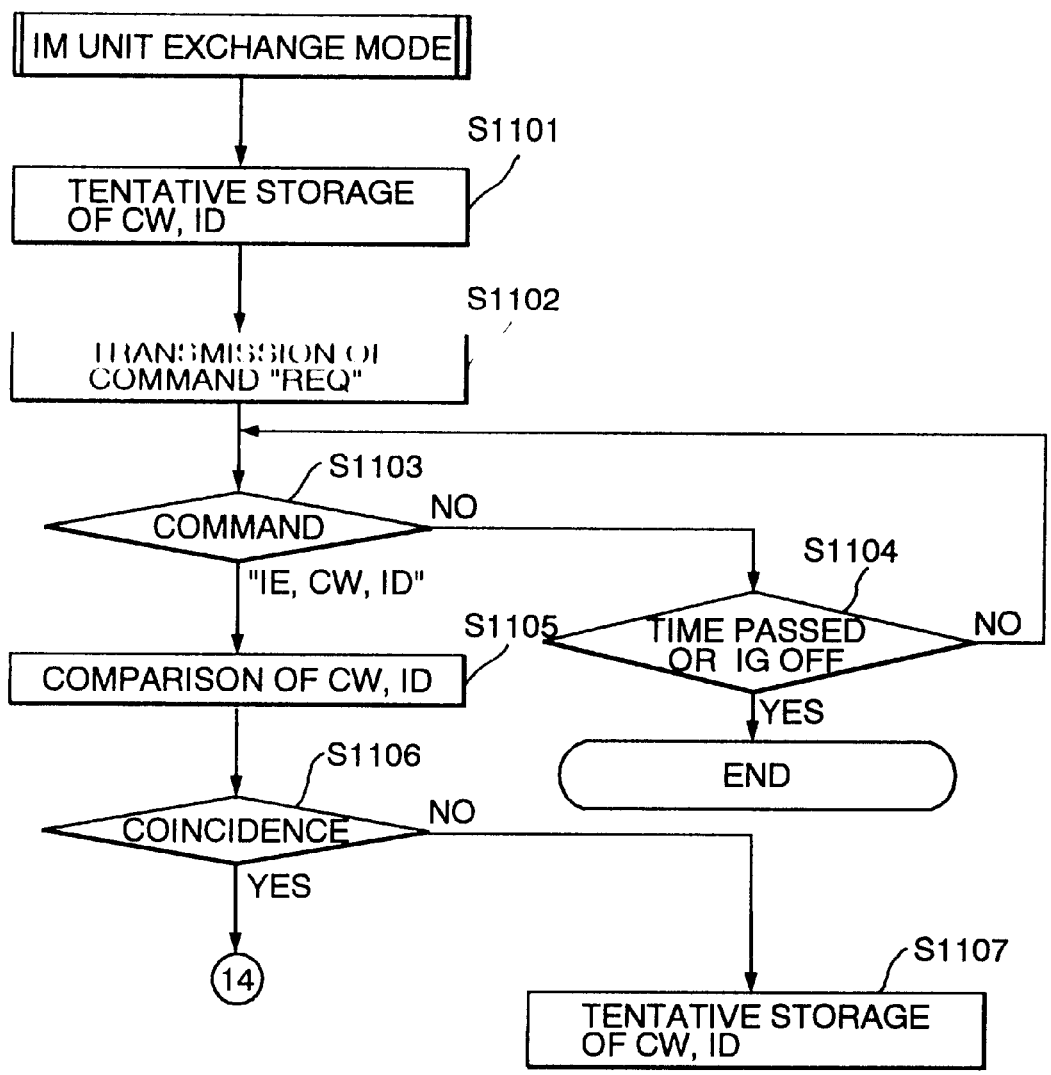
FIGS. 23A and 23B are a flow chart illustrating a sequence routine of operation of the engine controlling unit in the IM unit exchange mode.
Figure 23B:
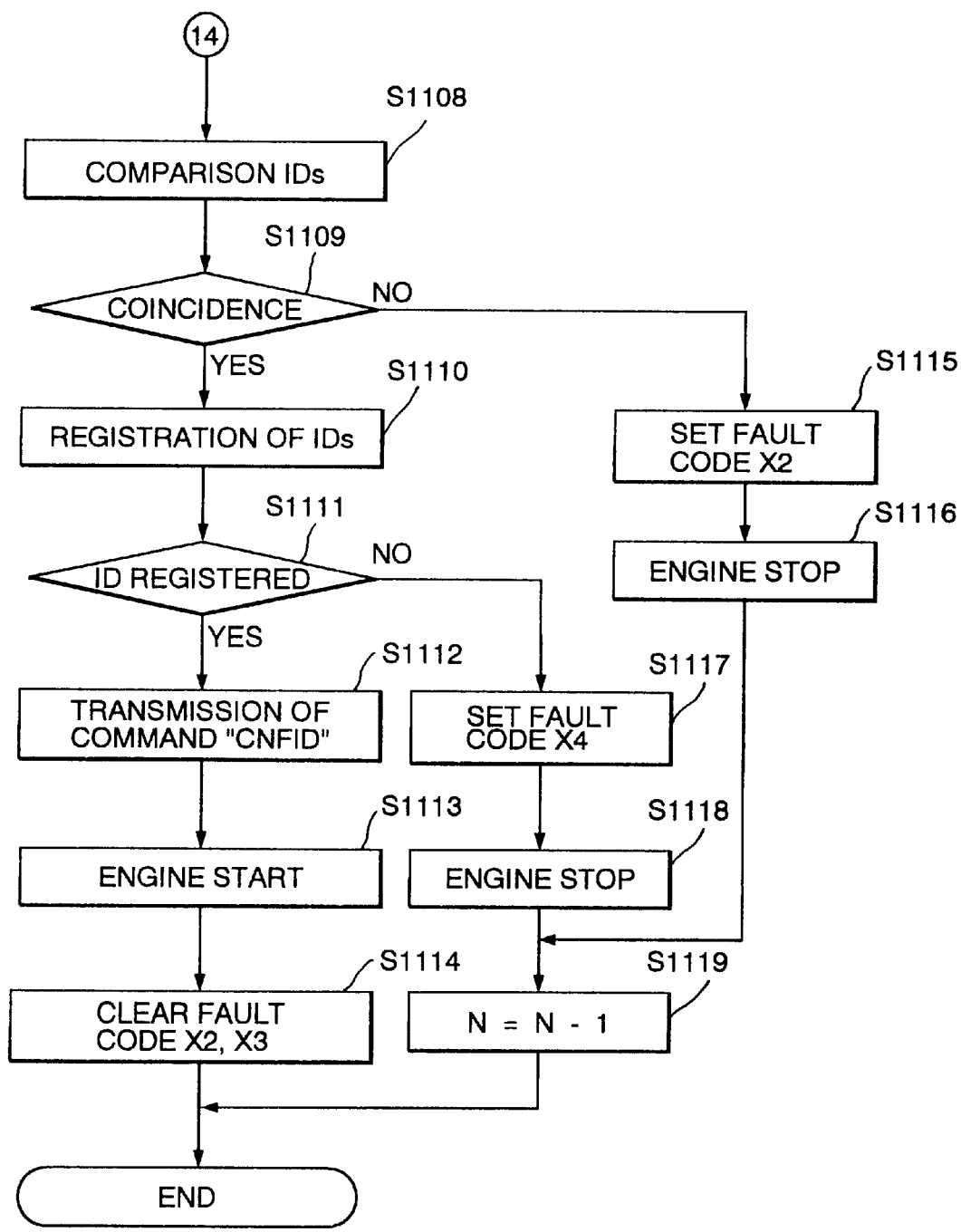

FIGS. 23A and 23B are a flow chart illustrating the sequence routine of operation of the engine controlling unit (EGI) 9 in the IM unit exchange mode. This exchange mode is effected to register an ID code (ID) and an encoded word (CW) in EEPROM 10 when the engine controlling unit (EGI) 9 receives an exchange command IE and the ID code (ID) and encoded word (CW) from the immobilizer unit (IM) 4. As shown in FIGS. 23A and 23B, the IM unit exchange mode is called for when the engine controlling unit (EGI) 9 receives the exchange command IE, the ID code (ID) and the encoded word (CW) from the immobilizer unit (IM) 4 at step S210 in the general sequence routine of operation of the engine controlling unit (EGI) 9 shown in FIGS. 6A–6B. When the flow chart logic commences and control passes directly to a function block at step S1101 where the encoded word (CW) and the ID code (ID) transmitted from the immobilizer unit (IM) 4 are tentatively stored in RAM 11 of the engine controlling unit (EGI) 9. Subsequently, a regular request command REQ is transmitted to the immobilizer unit (IM) 4 at step S1102. At steps S1103 and S1104, transmission of control commands from the immobilizer unit (IM) 4 is waited for a specified period of time. If there is no transmission of control commands for the specified period of time or if the ignition switch (IG) is turned off within the specific period of time, the flow chart logic terminates the IM unit exchange sequence routine and orders return to the general sequence routine of operation of the engine controlling unit (EGI) 9 for another execution. On the other hand, when an exchange command IE, an ID code (ID) and an encoded word (CW) from the immobilizer unit (IM) 4 are transmitted at step S1103, comparison is made between the ID code (ID) and the encoded word (CW) transmitted from the immobilizer unit (IM) 4 and the ID code (ID) and the encoded word (CW) tentatively stored in RAM 11 of the engine controlling unit (EGI) 9, respectively, at step S1105. If there is an absence coincidence between these ID codes (IDs) and/or these encoded words (CWs) at step S1106, after tentatively storing these ID code (ID) and encoded word (CW) transmitted from the immobilizer unit (IM) 4 in RAM 11 of the engine controlling unit (EGI) 9 at step S1107, another transmission of control commands from the immobilizer unit (IM) 4 is waited at steps S1103 and S1104. On the other hand, when there is a presence of coincidence between both ID codes (IDs) and encoded words (CWs), comparison is made between the ID code (ID) transmitted from the immobilizer unit (IM) 4 and the ID code (ID) registered in EEPROM 10 of the engine controlling unit (EGI) 9 at step S1109. When there is a presence of coincidence between these ID codes (IDs), the encoded word (CW) registered in EEPROM 10 of the engine controlling unit (EGI) 9 is replaced with the encoded word (CW) transmitted from the immobilizer unit (IM) 4 at step S1110. When it is verified that the encoded word (CW) transmitted from the immobilizer unit 4 is certainly registered at step S1111, an encoded word (CW) entry confirmation code CNFCW is transmitted to the immobilizer unit at step S1112. In this instance, the engine controlling unit (EGI) 9 is permitted to try registration of an encoded word (CW) at most three times until the encoded word (CW) is properly registered in EEPROM 10. If three times of registration of the ID code (ID) end in failure, it is determined that registration of the encoded word (CW) is refused. After permitting the engine to remain operated at step S1113 and subsequently clearing the fault codes X2 and X3 if having been set at step S1114, the flow chart logic terminates the IM unit exchange sequence routine and orders return to the general sequence routine of operation of the engine controlling unit (EGI) 9 for another execution.

When there is an absence of coincidence between the ID codes (IDs) at step S1109, then, after setting a fault code X3 at step S1119, stopping the engine at step S1120 and changing the count N of the communication counter by a decrement of one at step S1123 consecutively, the flow chart logic terminates the IM unit exchange sequence routine and orders return to the general sequence routine of operation of the engine controlling unit (EGI) 9 for another execution. Further, when there is an absence of coincidence between the encoded words (CWs) at step S1111, then, after setting a fault code X4 at step S1121, stopping the engine at step S1122 and changing the count N of the communication counter by a decrement of one at step S1123 consecutively, the flow chart logic terminates the IM unit exchange sequence routine and orders return to the general sequence routine of operation of the engine controlling unit (EGI) 9 for another execution.

IM and EGI units exchange mode is used to register ID and CW modes without verifying coincidence between ID codes (IDs) or between encoded words (CWs) in the event where both units 4 and 9 have no ID code (ID) in their EEPROM 5 and 10 which occurs both units 4 and 9 are never used at all or installed in the vehicle antitheft system in place of old units. The immobilizer unit (IM) 4 has an encoded word (CW) registered in EEPROM 5 at the manufacturer. Otherwise the engine controlling unit (EGI) 9 or both immobilizer unit and engine controlling unit (EGI) 9 may have an encoded word (CW) registered in their EEPROMs 5 and 10 at the manufacturer. In the IM and EGI units exchange mode, while an ID code (ID) is newly entered and registered in EEPROM 5 of the immobilizer unit (IM) 4, an ID code (ID) and an encoded word (CW) are newly entered and registered in EEPROM 10 of the engine controlling unit (EGI) 9. In consideration of losing or damaging one of the approved ignition keys, at lest three different ID codes (IDs) can be registered.

Sequence routine of operation of the immobilizer unit in the IM and EGI units exchange mode is called for in the event where the immobilizer unit (IM) 4 with ID codes (IDs) not registered at all receives a special request command SR from the engine controlling unit (EGI) 9 at step S109 in the general sequence routine shown in FIG. 5. The general sequence routine of operation of the immobilizer unit (IM) 4 may be changed so as to proceed to step S109 when neither the immobilizer unit (IM) 4 nor the engine controlling unit (EGI) 9 has an encoded word (CW) and/or an ID code (ID) registered therein at step S102.

Figure 24A:
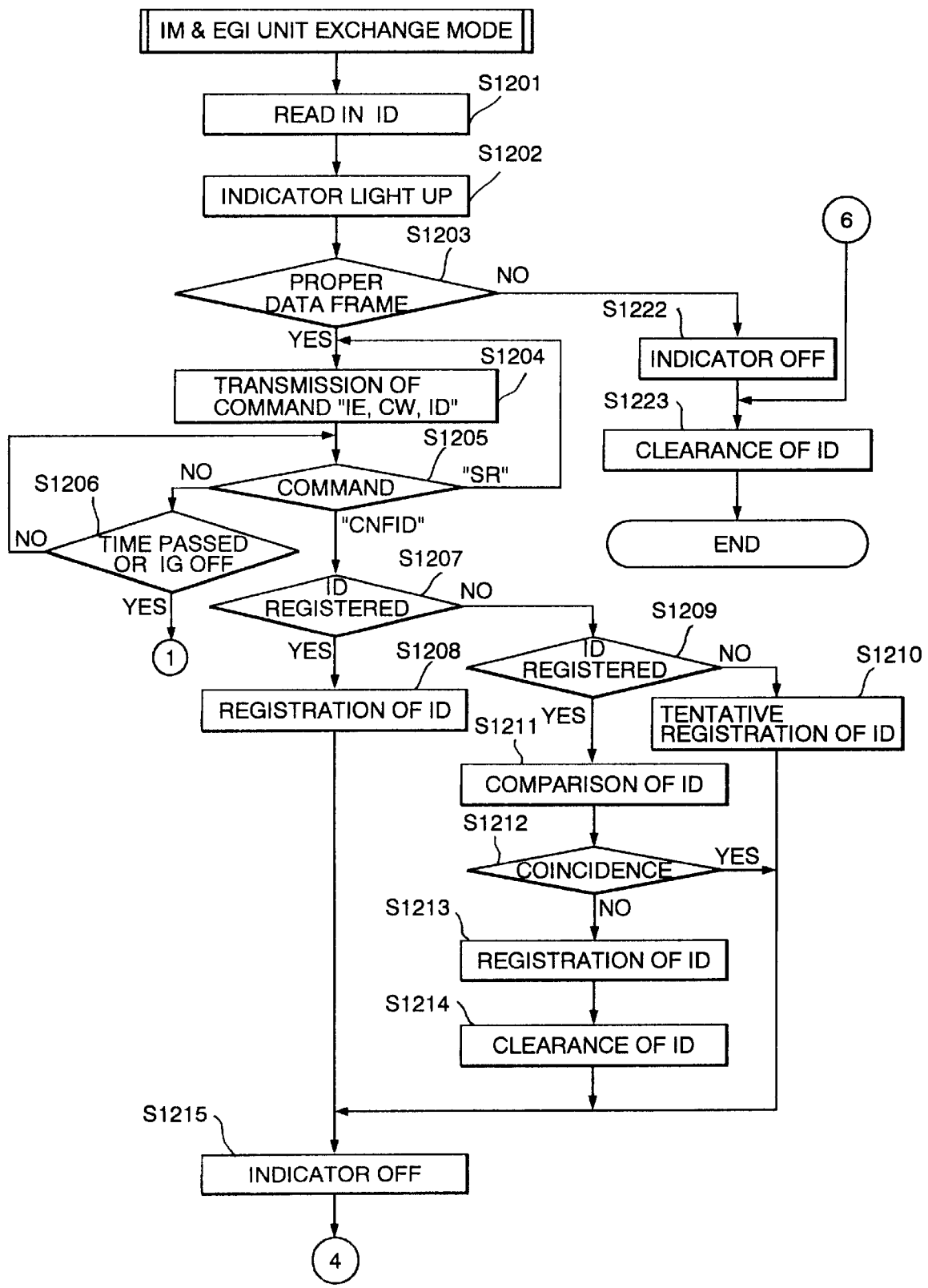
FIGS. 24A and 24B are a flow chart illustrating a sequence routine of operation of the immobilizer unit in an IM and EGI unit exchange mode.
Figure 24B:
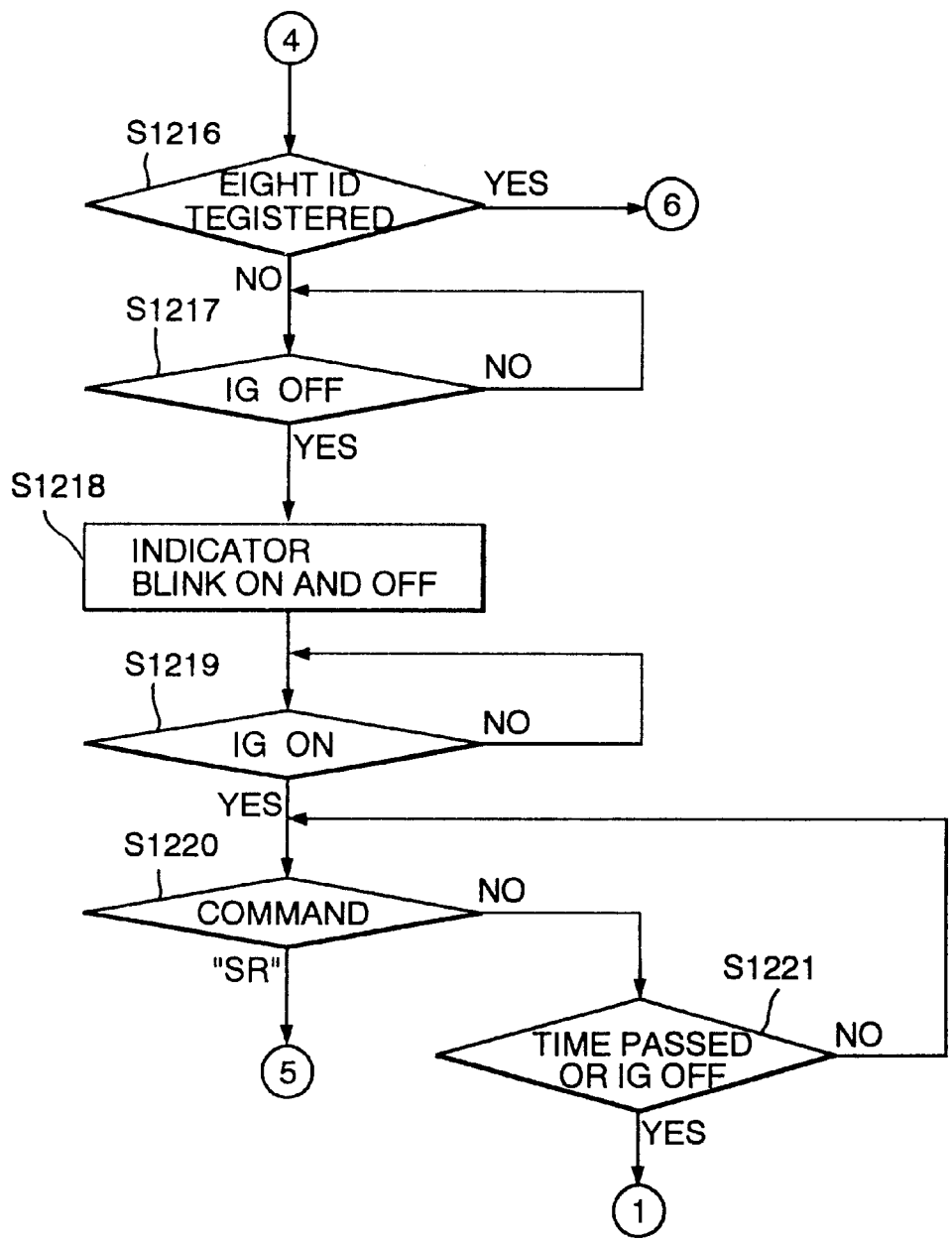

FIGS. 24A and 24B are a flow chart illustrating the sequence routine of operation of the immobilizer unit (IM) 4 in the IM and EGI units exchange mode. When the flow chart logic commences and control passes directly to a function block at step S1201 where the immobilizer unit (IM) 4 reads in an ID code (ID) of an ignition key 1A put in the key cylinder 2A through the transponder 1 at step S1201. After causing the indicator 16 to light up at step S1202, a determination is made at step S1203 as to whether the ID code (ID) read in has a proper data frame. In this instance, in order to make determination of proper data frame of an ID code (ID), the ID code (ID) is read in three times and the ID code (ID) is regarded as having a proper data frame when there is a presence of coincidence among all of the three ID codes (IDs). When the ID code (ID) has a proper data frame, the immobilizer unit (IM) 4 transmits an exchange command RG, an additional code entry command $AD_n$, the ID code (ID) and encoded word (CW) to the engine controlling unit (EGI) 9 at step S1204. Thereafter, the immobilizer unit (IM) 4 waits transmission of control commands from the engine controlling unit (EGI) 9 for a specified period of time at step S1205. When a special request command SR is transmitted from the engine controlling unit (EGI) 9, the immobilizer unit (IM) 4 transmits an exchange command RG, an additional code entry command $AD_n$, the ID code (ID) and the encoded word (CW) to the engine controlling unit (EGI) 9 once again at step S1204. When no control command is transmitted from the engine controlling unit (EGI) 9 for the specified period of time at step S1206 or when the ignition switch (IG) 15 is turned off within the specified period of time at step S1206, the flow chart logic terminates the IM and EGI units exchange sequence routine and orders return to the general sequence routine of operation of the (IM) unit 4 for another execution. When an ID code entry confirmation command CNFID is transmitted from the engine controlling unit (EGI) 9, a determination is made at step S1207 as to whether the immobilizer unit (IM) 4 has an ID code (ID) registered in EEPROM 5. When the immobilizer unit (IM) 4 already has an ID code (ID) registered in EEPROM 5, the ID code (ID) read in through the transponder 1 is stored and registered in EEPROM 5 at an address designated by an additional code entry command $AD_n$ at step S1208.

When it is determined that the immobilizer unit (IM) 4 has an ID code (ID) registered in EEPROM 5 at all at step S1207, this indicates that the sequence routine is in progress for entry of a first ID code (ID) into the immobilizer unit (IM) 4, then, a determination is made at step S1210 as to whether the immobilizer unit (IM) 4 has an ID code (ID) tentatively stored in RAM 6. When there is no ID code (ID) tentatively registered in RAM 6, the ID code (ID) is tentatively stored in RAM 6 at step S1210. On the other hand, when there is an ID code (ID) tentatively registered in RAM 6, comparison is made between the ID code (ID) tentatively stored in RAM 6 and the ID code (ID) read in at step S1211. When it is verified that there is an absence of coincidence between the ID codes (IDs) at step S1212, after storing and registering these ID codes (IDs) in EEPROM 5 of the immobilizer unit (IM) 4 at step S1213, the ID code (ID) tentatively stored in RAM 6 of the immobilizer unit (IM) 4 is cleared at step S1214.

After storing and registering the ID code (ID) at step S1208 in EEPROM 5, after tentatively storing the ID code (ID) in RAM 6 at step S1210, after clearing the ID code (ID) tentatively stored in RAM 6, or when it is verified that there is a presence of coincidence between the ID codes (IDs) at step S1212, the indicator 16 is caused to go off at step S1215. Subsequently, a determination is made at step S1216 as to whether there are eight ID codes (IDs) stored and registered in EEPROM 5. When it is determined that there are less than eight ID codes (IDs) in EEPROM 5, this indicates that there are empty memory areas for registration of ID codes (IDs), then, at step S1217, the immobilizer unit (IM) 4 waits that the ignition switch (IG) is turned off so as to permit entry of other ID codes (IDs). Subsequently to turning off the ignition switch, the indicator 16 is cased to blink on and off repeatedly the number of times corresponding to the number of ID codes (IDs) registered in EEPROM 5 or registered tentatively in RAM 6 at step S1218. After waiting that the ignition switch (IG) 15 is turned on again at step S1219, transmission of control commands from the engine controlling unit (EGI) 9 is waited for a specified period of time through steps S1220 and S1221. When there is no transmission of control commands for the specified period of time at step S1221 or when the ignition switch (IG) 15 is turned off within the specified period of time at step S1221, the flow chart logic terminates the IM and EGI units exchange sequence routine and orders return to the general sequence routine of operation of the immobilizer unit (IM) 4 for another execution.

When it is determined that the ID code (ID) has an improper data frame st step S1203, after causing the indicator 16 to go off at step S1222 and subsequently clearing the ID code (ID) tentatively stored in RAM 6 at step S1223, the flow chart logic terminates the IM and EGI units exchange sequence routine and orders return to the general sequence routine of operation of the immobilizer unit (IM) 4 for another execution.

When it is determined that there are eight ID codes (IDs) stored and registered in EEPROM 5 at step S1216, after clearing the ID code (ID) tentatively stored in RAM 6 at step S1223, the flow chart logic terminates the IM and EGI units exchange sequence routine and orders return to the general sequence routine of operation of the immobilizer unit (IM) 4 for another execution.

In the IM and EGI units exchange mode, when the ignition switch (IG) 15 remains turned on for a specified period of time, for example 60 seconds, or when it remains turned off for a specified period of time, for example 30 seconds, the flow chart logic orders return to the general sequence routine of operation of the (IM) unit 4 for another execution. Although an ID code (ID) read in through the transponder 1 is tentatively stored in RAM 6 of the immobilizer unit (IM) 4, it may be also tentatively stored in ROM 11 of the engine controlling unit (EGI) 9. Further, tentative storage of ID codes (IDs) in RAM may be performed for more than two ignition keys as well as for two ignition keys. All ID codes (IDs) read in through the transponder 1 may be tentatively stored in RAM and transmitted to EEPROM all at once for registration at termination of the sequence routine of operation in the IM and EGI units exchange mode.

In the case that ID codes (IDs) are registered in immobilizer units and engine controlling unit (EGI) s at the manufacturer, in the event where, for example, work of registering an ID code (ID) in an immobilizer unit is discontinued for some reasons and resumed after a while, it is usually desirable to enter additional ID codes (IDs) or to alter ID codes (IDs) in the two-key entry mode. This is because the encoded word (CW) entry mode demanding complicated code entry operation is unpractical from a view point of working efficiency on a factory assembly line. With regard to prior art vehicle antitheft systems, however, in the event where work of registering ID codes (IDs) in an immobilizer unit is discontinued for some reasons after registration of a single ID code (ID), it is impossible to bring the two-key entry mode into effect. As described above, in the IM and EGI units exchange mode, the two-key entry mode is always available even in the event where registration work is discontinued before completing registration of an ID code (ID) of a first ignition key. This is because, after resuming the ID code registration work with use of a second ignition key having a different ID code (ID) from the first ignition key, the ID code (ID) of the first ignition key is tentatively stored in RAM until registration of the ID codes (IDs) of the first and second ignition keys are properly completed and, consequently, at least two different ID codes (IDs) are registered after resumption of the ID code registration work.

FIG. 25 is a time chart of operation of the indicator 16. The indicator 16 blinks on and off repeatedly the number of times corresponding to the number of ID codes (IDs) registered in EEPROM 5 or tentatively registered in RAM 6 at step S1218 in the sequence routine of operation of the immobilizer unit in the IM and EGI units exchange mode shown in FIGS. 24A and 24B. As shown in FIG. 25 by way of example, in the event where two different ID codes (IDs) are registered, the indicator 16 blinks on and off repeatedly two times, in other words provides a dual peak flash, between a point of time at which a second ignition key is operated to turn off the ignition switch (IG) 15 and a point of time at which a third ignition key is operated to turn on the ignition switch (IG) 15. In this way, it is easy to provide an indication of the number of different ID codes (IDs) registered up to the present and to prevent it from occurring to enter an ID code (ID) of the same ignition key twice. Even if repeating entry of an ID code (ID) of an ignition key, the indicator 16 does not change in the number of blinking on and off, indicating double entry of the ID code (ID) of the same ignition key.

Figure 26A:
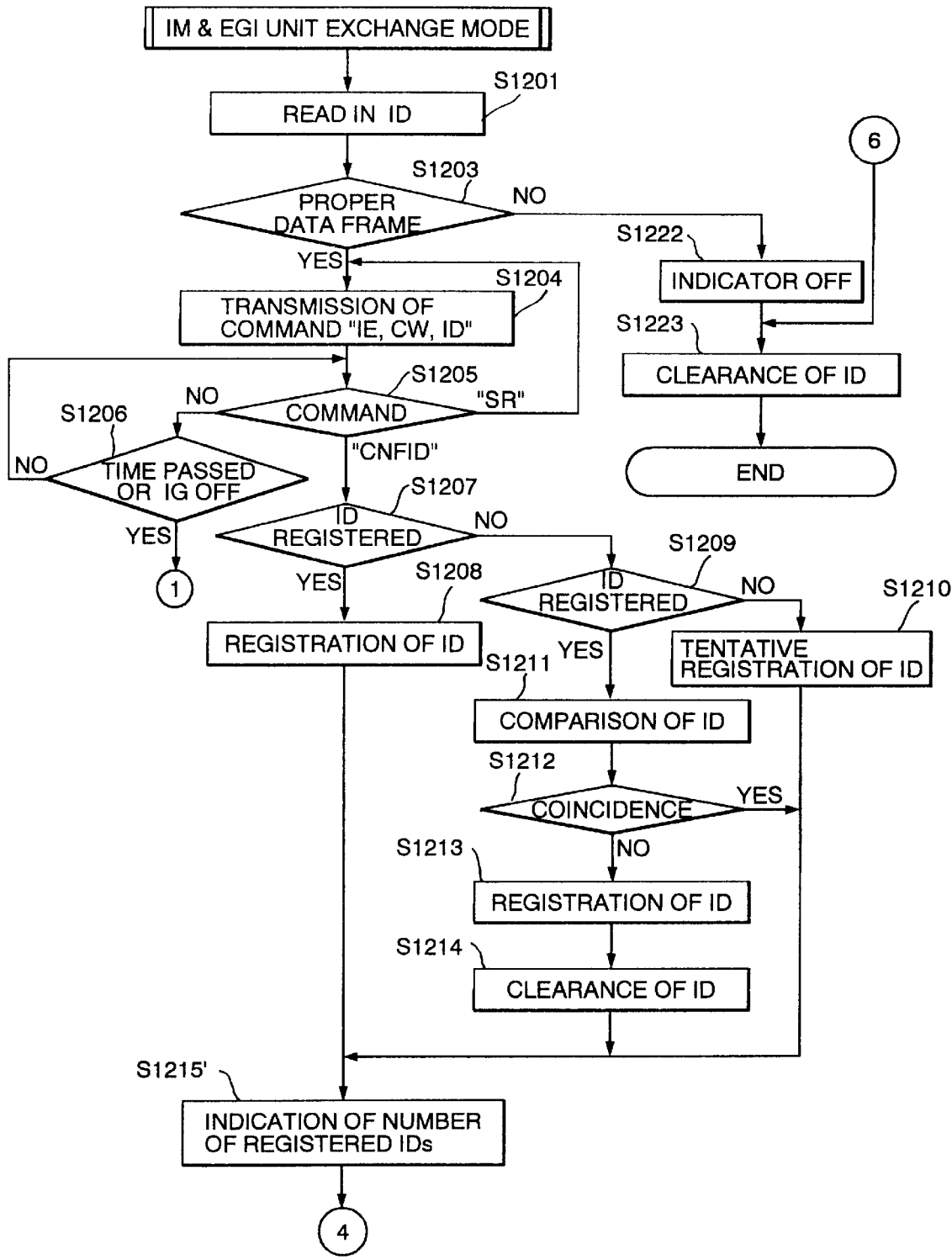
FIGS. 26A and 26B are a flow chart illustrating a variation of the sequence routine of operation of the immobilizer unit in the IM and EGI unit exchange mode.
Figure 26B:
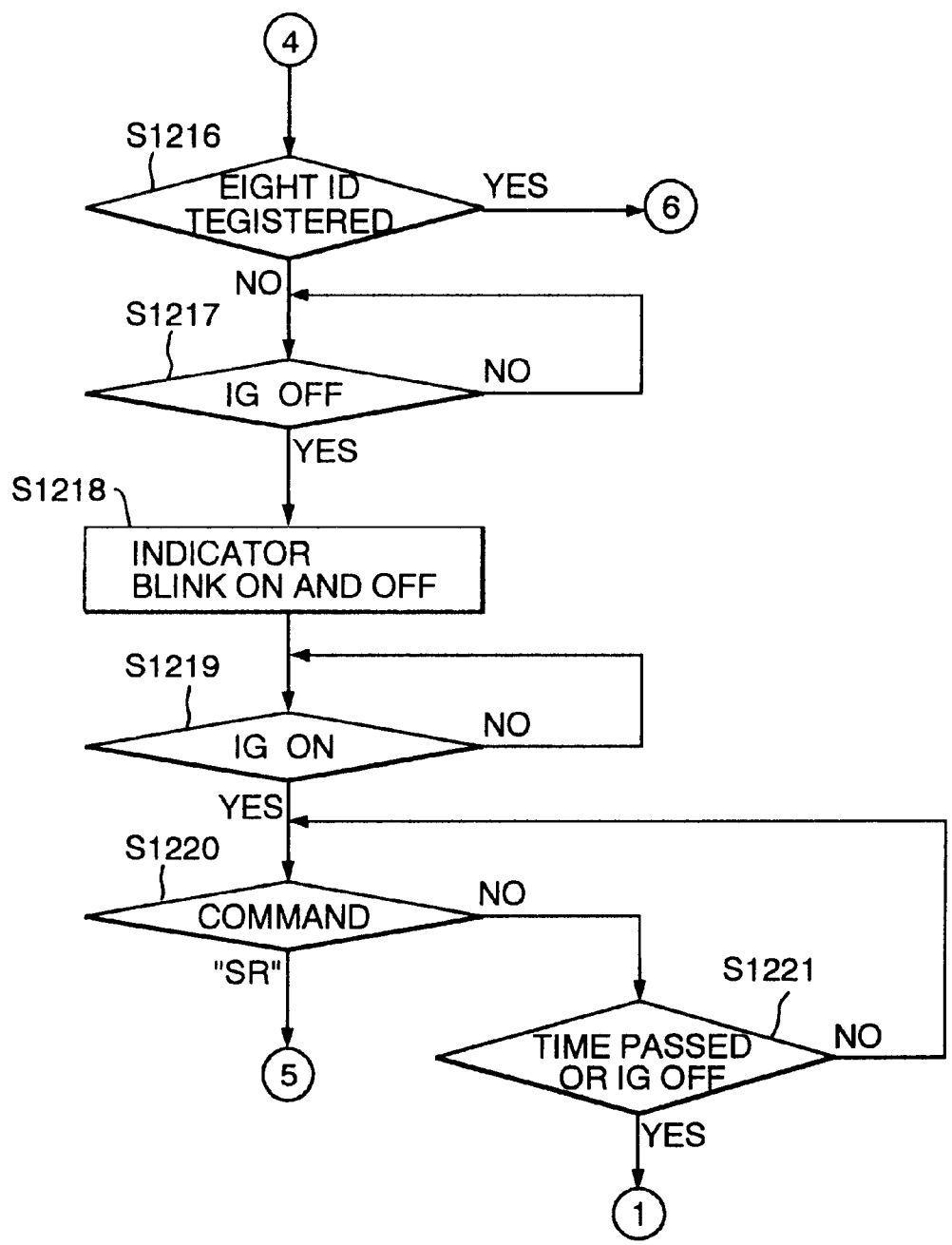

FIGS. 26A and 26B are a flow chart illustrating a variation of the sequence routine of operation of the immobilizer unit (IM) 4 in the IM and EGI units exchange mode in which same steps or processes are denoted by the same reference numbers and need not be repetitively explained. In this IM and EGI units exchange mode, the indicator 16 starts blinking on and off not in response to turning off the ignition switch after registration of an ID code (ID) but as soon as after registration of an ID code (ID). That is, the indicator 16 is not caused to light up at step S1202 immediately after reading in an ID code (ID) through the transponder 1 of an ignition key 1A and nor caused to blink on and off repeatedly the number of times corresponding to the number of ID codes (IDs) registered in EEPROM 5 or ID codes (IDs) tentatively stored in RAM 6 at step S1218 after the ignition switch (IG) 15 is turned off. In place of these steps S1202 and 1218, the indicator 16 is caused to blink on and off repeatedly the number of times corresponding to the number of ID codes (IDs) registered in EEPROM 5 or ID codes (IDs) tentatively stored in RAM 6 at step S1215' immediately after storing and registering the ID code (ID) read in through the transponder 1 of an ignition key 1A at step S1208.

Figure 27:
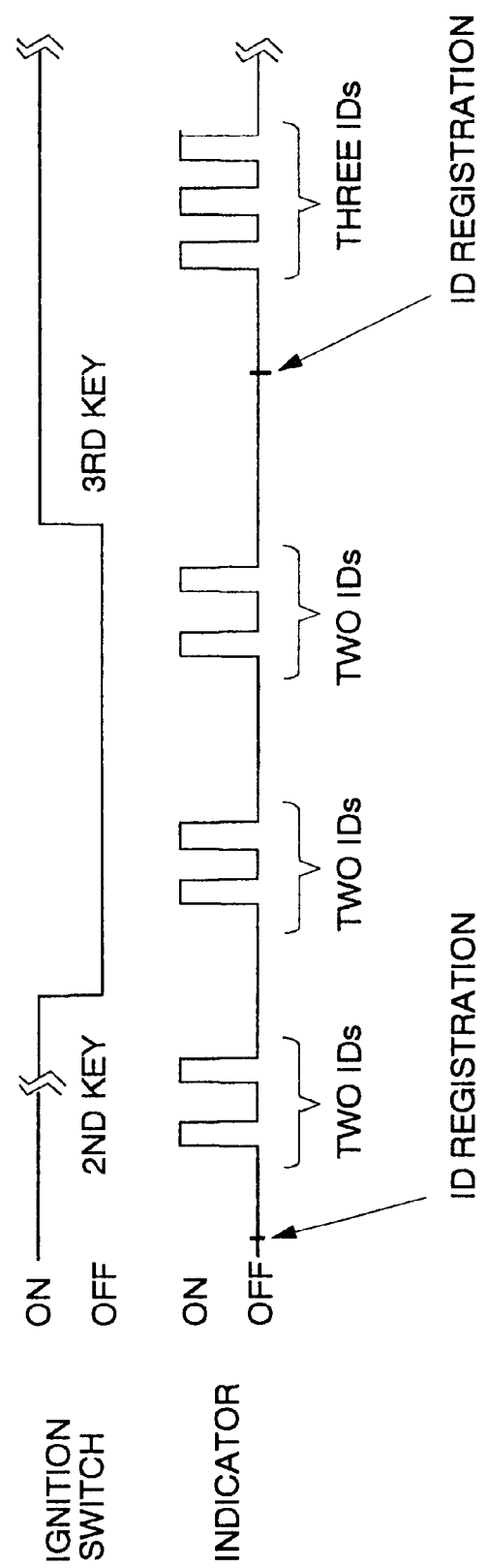
FIG. 27 is a time chart of operation of the indicator with respect to operation of the ignition switch for an indication of the number of entered ID codes according to the sequence routine shown in FIGS. 26A and 26B.

FIG. 27 is a time chart of operation of the indicator 16 to blink on and off repeatedly the number of times corresponding to the number of ID codes (IDs) registered in EEPROM 5 or tentatively registered in RAM 6 at step S1215' in the sequence routine of operation of the immobilizer unit in the IM and EGI unit exchange mode shown in FIGS. 26A and 26B. As shown in FIG. 27 by way of example, the indicator 16 blinks on and off repeatedly two times at a regular interval when registration of an ID code (ID) of a second ignition key is completed and continues to blink on and off repeatedly two times at regular intervals even after turning off the ignition switch (IG) 15 until entering an ID code (ID) of a third ignition key. When registration of an ID code (ID) of a third ignition key is completed, then, the indicator 16 blinks on and off repeatedly three times at regular intervals, in other words, provides a triple peak flashes at regular intervals. In this way, the indicator 16 always provides an indication of the number of ID codes (IDs) registered. Further, because the indicator 16 blinks on and off during ID code registration work, it is easy to know the number of ID codes (IDs) registered up to the present. Termination of operation in the IM and EGI unit exchange mode is confirmed based on the fact that the indicator 16 goes off. It is easily prevented from occurring to enter an ID code (ID) of the same ignition key twice. The indicator 16 does not change the number of peaks of a flash even if repeating entry of an ID code (ID) of an ignition key more than one time, so as to let the operator know double entry of the ID code (ID). This results in preventing a decline in working efficiency of the ID code registration. The utilization of the indicator 16 for providing an indication of the number of ID codes (IDs) eliminates a special indication instrument and provides an inexpensive vehicle antitheft system.

Figure 28:
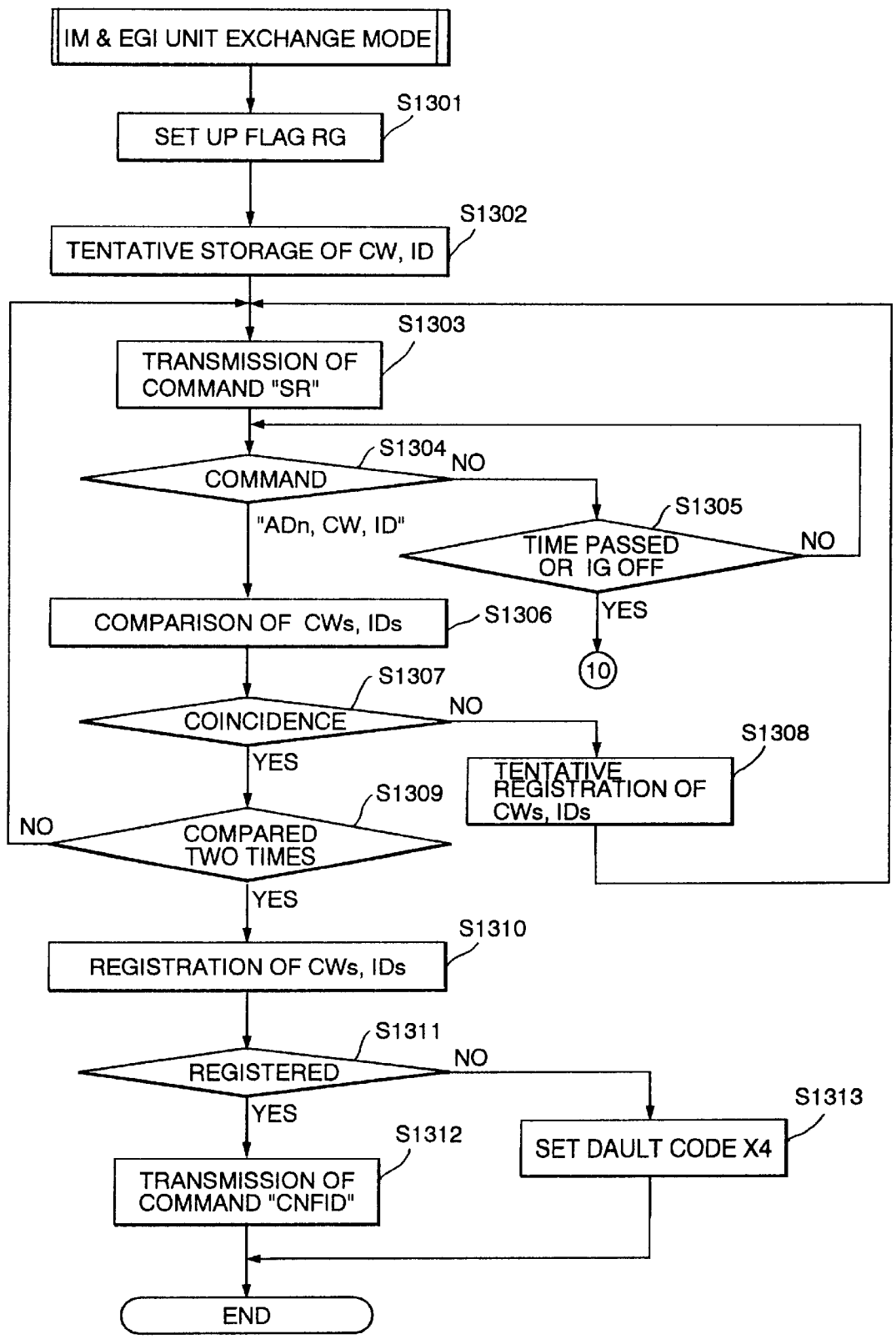
FIG. 28 is a flow chart illustrating a sequence routine of operation of the engine controlling unit in the IM and EGI unit exchange mode.

FIG. 28 is a flow chart illustrating the sequence routine of operation of the engine controlling unit (EGI) 9 in the IM and EGI units exchange mode. The sequence routine of operation of the engine controlling unit (EGI) 9 in the IM and EGI unit exchange mode is called for in the event where the engine controlling unit (EGI) 9 has no ID code (ID) registered in EEPROM 10 at all or where, while the exchange mode flag RG is up, the engine controlling unit (EGI) 9 receives an additional code entry command $AD_n$, an exchange command RG, an ID code (ID) and an encoded word (CW) from the immobilizer unit (IM) 4.

As shown in FIG. 28, in response to receiving an additional code entry command $AD_n$, an exchange command RG, an ID code (ID) and an encoded word (CW) from the immobilizer unit (IM) 4 at step S218 or step S226 in the general sequence routine of operation shown in FIGS. 6A–6C, the engine controlling unit (EGI) 9 shifts to the IM and EGI unit exchange mode and directly passes to a function block at step S1301 where the exchange mode flag RG is up. As was previously described, the exchange mode flag RG set up indicates that the engine controlling unit (EGI) 9 is in the IM and EGI unit exchange mode. Subsequently, after tentatively storing the ID code (ID) and the encoded word (CW) transmitted from the immobilizer unit (IM) 4 in RAM 11 at step S1302, the engine controlling unit (EGI) 9 transmits a special request command SR to the immobilizer unit (IM) 4 at step S1303. Through steps S1304 and S1305, transmission of control commands from the immobilizer unit (IM) 4 is waited for a specified period of time. When no control command is transmitted from the immobilizer unit (IM) 4 for the specified period of time at step S1305 or when the ignition switch (IG) 15 is turned off within the specified period of time at step S1305, the flow chart logic terminates the IM and EGI unit exchange sequence routine and orders return to the general sequence routine of operation of the (EGI) unit 9 for another execution. On the other hand, when the engine controlling unit (EGI) 9 receives an additional code entry command $AD_n$, an exchange command RG, an encoded word (CW) and an ID code (ID) from the immobilizer unit (IM) 4, comparison is made between the encoded word (CW) and the ID code (ID) tentatively stored in RAM 11 of the engine controlling unit (EGI) 9 and the encoded word (CW) and the ID code (ID) transmitted from the immobilizer unit (IM) 4 at step S1306. When there is an absence of coincidence between the encoded words (CWs) and/or between the ID codes (IDs) at step S1307, after tentatively storing the encoded word (CW) and the ID code (ID) transmitted from the immobilizer unit (IM) 4 in RAM 11 of the engine controlling unit (EGI) 9 at step S1308, transmission of control commands from the immobilizer unit (IM) 4 is waited again at step S1304. On the other hand, when there is a presence of coincidence between the encoded words (CWs) and between the ID codes (IDs), a determination is made at step S1309 as to whether the comparison between the encoded words (CWs) and between the ID codes (IDs) is made twice. When the comparison made at step S1307 is first, the flow chart logic orders return to step S1303 to transmit another special request command SR to the immobilizer unit (IM) 4. When the comparison made at step S1307 is second, the encoded word (CW) and the ID code (ID) transmitted from the immobilizer unit (IM) 4 is stored and registered in EEPROM 10 of the engine controlling unit (EGI) 9 at addresses designated by the additional code entry command $AD_n$ at step S1310. Subsequently, after transmitting an ID code entry confirmation command CNFID to the immobilizer unit (IM) 4 at step S1312 when registration of the encoded word (CW) and the ID code (ID) is confirmed at step S1311 or after setting the fault code X4 at step S1313 when it is verified that the registration of the CW and ID codes (IDs) ended in failure at step S1311, the flow chart logic terminates the IM and EGI unit exchange sequence routine and orders return to the general sequence routine of operation of the (EGI) unit 9 for another execution.

Figure 29:
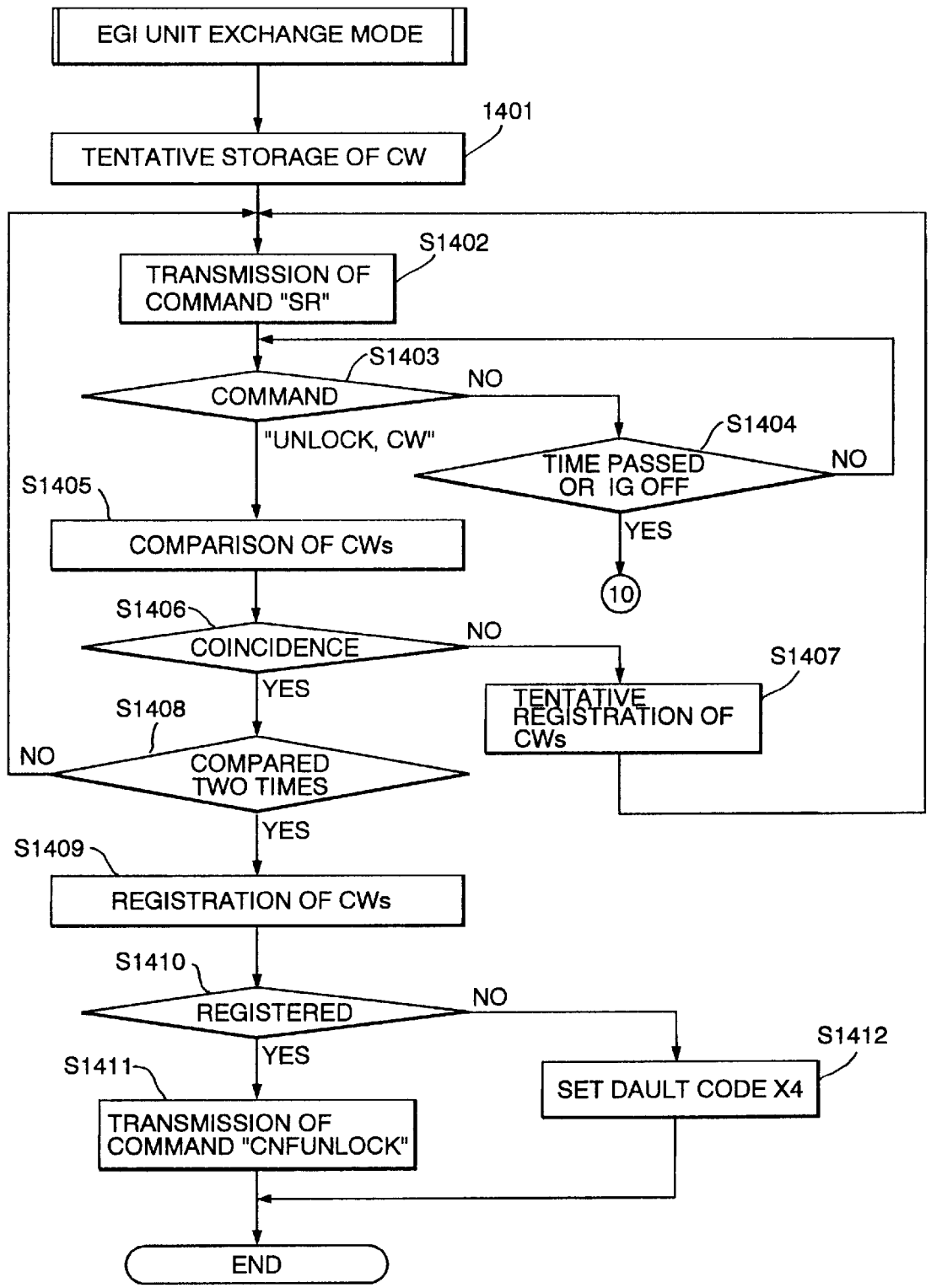
FIG. 29 is a flow chart illustrating a sequence routine of operation of the engine controlling unit in the EGI unit exchange mode.

FIG. 29 is a flow chart illustrating the sequence routine of operation of the engine controlling unit (EGI) 9 in the EGI unit exchange mode in which the encoded word (CW) having been registered in the immobilizer unit (IM) 4 is registered in EEPROM 10 of the engine controlling unit (EGI) 9. In the EGI exchange mode, the immobilizer unit (IM) 4 operates in the regular operation mode shown in FIG. 10. The sequence routine of operation of the engine controlling unit (EGI) 9 in the EGI unit exchange mode is called for in the event where the engine controlling unit (EGI) 9 has no ID code (ID) registered in EEPROM 10 at all and receives an unlock command UNLOCK and an encoded word (CW) from the immobilizer unit (IM) 4 at step S226 in the general sequence routine of operation of the engine controlling unit (EGI) shown in FIGS. 6A–6C. When the flow chart logic commences and control passes directly to a function block at step 1401 where the engine controlling unit (EGI) tentatively stores the encoded word (CW) transmitted from the immobilizer unit (IM) 4 is in RAM 11 thereof. Subsequently, after transmitting a special request command SR to the immobilizer unit (IM) 4 at step S1402, transmission of control commands from the immobilizer unit (IM) 4 is waited for a specified period of time through steps S1403 and S1404. When no control command is transmitted from the immobilizer unit (IM) 4 for the specified period of time at step S1404 or when the ignition switch (IG) 15 is turned off within the specified period of time at step S1404, the flow chart logic terminates the IM and EGI unit exchange sequence routine and orders return to the general sequence routine of operation of the (EGI) unit 9 for another execution. On the other hand, when the engine controlling unit (EGI) 9 receives an unlock command UNLOCK and an encoded word (CW) from the immobilizer unit (IM) 4, comparison is made between the CW tentatively stored in RAM 11 of the engine controlling unit (EGI) 9 and the encoded word (CW) transmitted from the immobilizer unit (IM) 4 at step S1405. When there is an absence of coincidence between these encoded words (CWs) at step S1406, after tentatively storing the encoded word (CW) transmitted from the immobilizer unit (IM) 4 in RAM 11 of the engine controlling unit (EGI) 9 at step S1407, another special request command SR is transmitted to the immobilizer unit (IM) 4 again at step S1402. On the other hand, when there is a presence of coincidence between the encoded words (CWs), a determination is made at step S1408 as to whether the comparison between the encoded words (CWs) is made twice at step S1406. When the comparison is first, the flow chart logic orders return to step S1402 to transmit another special request command SR to the immobilizer unit (IM) 4. When the comparison made at step S1408 is second, the encoded word (CW) transmitted from the immobilizer unit (IM) 4 and all ID codes (IDs) registered in EEPROM 5 of the immobilizer unit (IM) 4 are stored and registered in EEPROM 10 of the engine controlling unit (EGI) 9 at step S1409. Subsequently, after transmitting an unlock confirmation command CNFUNLOCK to the immobilizer unit 4 at step S1411 when registration of the encoded words (CWs) is confirmed at step S1410 or after setting the fault code X4 at step S1412 when it is verified that the registration of the encoded words (CWs) ended in failure at step S1410, the flow chart logic terminates the EGI unit exchange sequence routine and orders return to the general sequence routine of operation of the (EGI) unit 9 for another execution.

Figure 32:
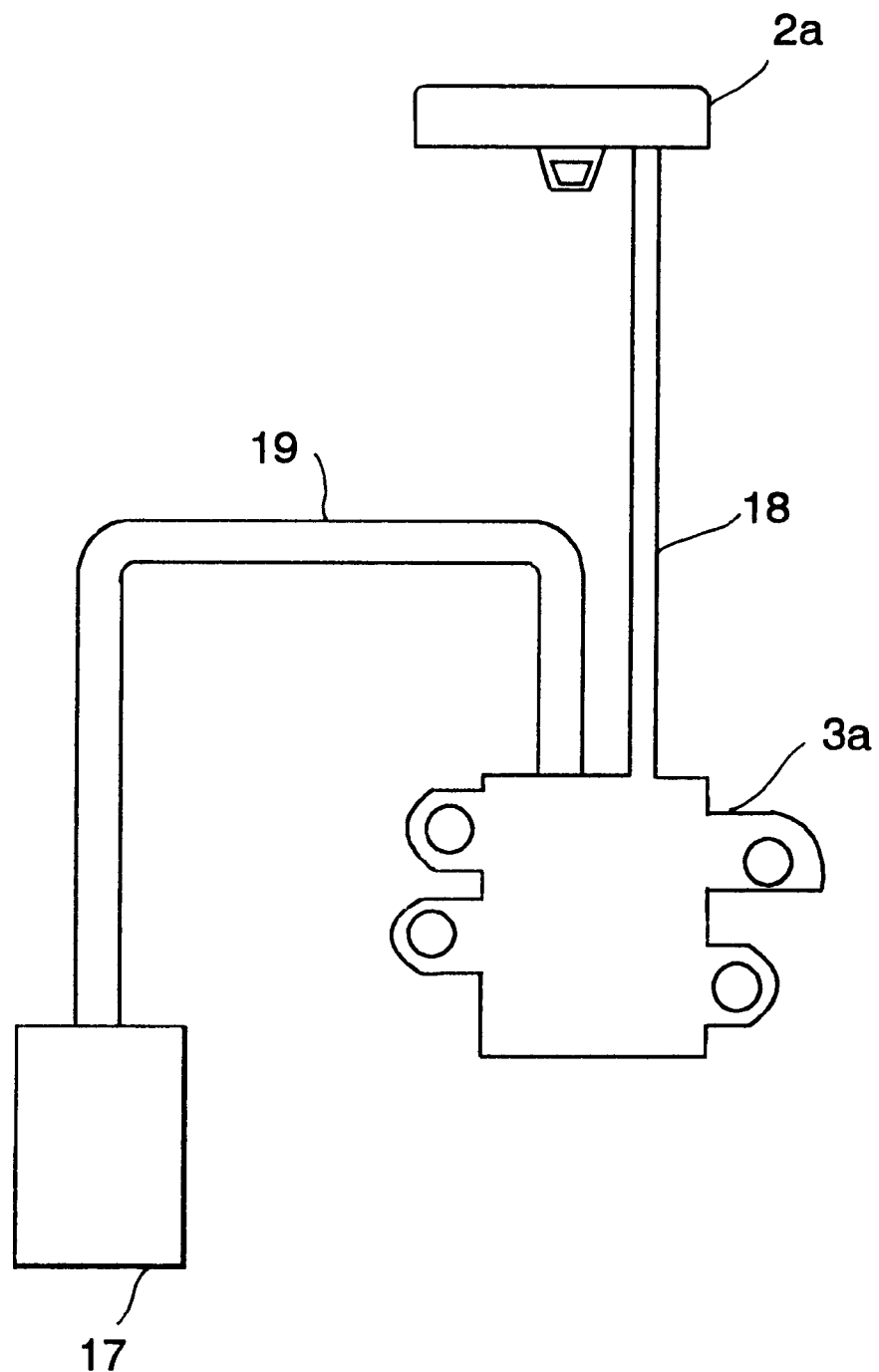
FIG. 32 is a schematic illustration of a prior art construction of a coil antenna, an amplifier and a connector.

FIG. 32 schematically shows a prior art vehicle antitheft system. In prior art vehicle antitheft system, there are used lead wires 18 and 19 to connect a coil antenna 2a and an amplifier 3a, and the amplifier 3a and a connector 17a, respectively.

Figure 30:
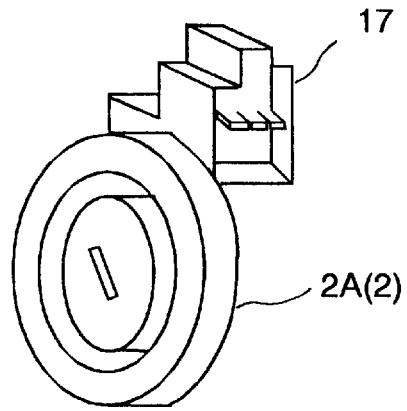
FIG. 30 is a schematic illustration of an integral construction of a coil antenna and a connector.
Figure 31:
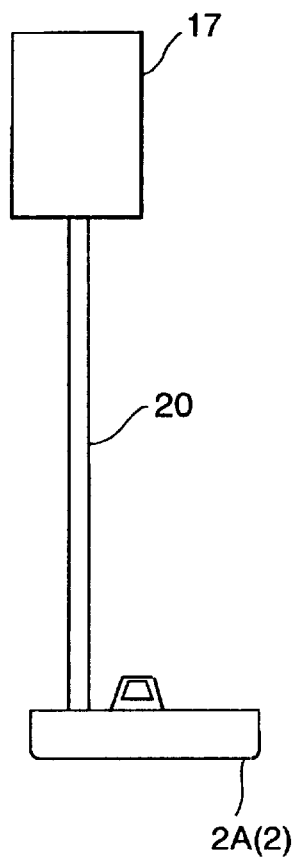
FIG. 31 is a schematic illustration of an improved construction of a coil antenna and a connector.

Vehicle antitheft system according to the invention has not always need of the amplifier 3. In such a case, the coil antenna 2 and connector 17 may be provided as one integral part, or otherwise connected directly to each other without using any lead wire, as shown in FIG. 30, which is always desirable to construct the vehicle antitheft system at low costs. Further, as shown in FIG. 31, the coil antenna 2 and connector 17 may be connected to each other by means of a thick lead wire 20. In the vehicle antitheft system thus constructed, faults due to breaking down of a wire and/or improper connection between the coil antenna 2 and connector 17 are less encountered by the vehicle antitheft system.

It is to be understood that the present invention may be embodied with various changes, modifications and improvements, which may occur to those skilled in the art, without departing from the spirit and scope of the invention defined in the following claims.

What is claimed is:

1. A vehicle antitheft system which comprises an ignition key of a type having a built-in signal transmitter for transmitting a first code assigned to the ignition key as a code signal and code verifying means for reading in said first code of an ignition key of said type upon operation of said ignition key, comparing said first code read therein with a plurality of second codes registered in memory means and transmitting an engine actuation command to engine controlling means so as to permit said engine controlling means to perform control of operation of the engine when there is a specified relationship between said first code and any one of said second codes in said memory means, said vehicle antitheft system comprising:

mode shifting means for shifting said vehicle antitheft system to a code alteration mode in which said second codes in said memory means are permitted to be altered when said code verifying means reads in at least two said first codes different from each other having a specified relationship with respect to said second codes in said memory means, and to a code registration mode in which said second codes are registered in said memory means;

tentative memory means for tentatively storing said first code transmitted from said signal transmitter in said code registration mode; and registration control means for controlling storage of at least two said first codes in said memory means when said tentative memory means becomes ready for storage of said at least two first codes.

2. A vehicle antitheft system as defined in claim 1, wherein said first code and said second code are coincident under said specified relationship.

3. A vehicle antitheft system as defined in claim 1, wherein said mode shifting means shifts said vehicle antitheft system when said memory has no second code registered in said memory.

4. A vehicle antitheft system as defined in claim 1, wherein said registration control means performs storage of at least two said two first codes in said memory means simultaneously when said tentative memory means becomes ready for storage of said at least two first codes.

5. A vehicle antitheft system as defined in claim 1, wherein said code verifying means transmits a third code stored in said memory when there is a specified relationship between said first code and any one of said fourth codes in said memory, and said engine controlling means stores a fourth code, comparing said third code transmitted from said code verifying means with said fourth code, and is permitted to perform control of operation of the engine when there is a specified relationship between said third code and said fourth code.

6. A vehicle antitheft system as defined in claim 5, wherein said mode shifting means shifts said vehicle antitheft system to said code registration mode when there is a specified relationship between said third code and a fifth code manually entered therein.

7. A vehicle antitheft system as defined in claim 6, wherein said fifth code is entered through a specified operation of said ignition key.

8. A vehicle antitheft system as defined in claim 1, and further comprising first determination means for determining whether said code verifying means is unused and second determination means for determining whether said engine controlling means is unused, wherein said mode shift means shifts said vehicle antitheft system to said code registration mode when both said code verifying means and said engine controlling means are determined to be unused.

9. A vehicle antitheft system which comprises an ignition key of a type having a built-in signal transmitter for transmitting a first code assigned to the ignition key as a code signal and code verifying means for reading in said first code of an ignition key of said type upon operation of said ignition key, comparing said first code read therein with a plurality of second codes registered in a memory and transmitting an engine actuation command to engine controlling means so as to permit said engine controlling means to perform control of operation of the engine when there is a specified relationship between said first code and any one of said second codes in said memory, said vehicle antitheft system comprising:

mode shifting means for shifting said vehicle antitheft system to a code alteration mode in which said second codes in said memory are altered when said code verifying means reads in two said first codes different from each other having a specified relationship with respect to said second codes in said memory, and to a code registration mode in which first codes are registered in said memory;

tentative memory means for tentatively storing said first code transmitted from said signal transmitter in said code registration mode; and registration control means for controlling storage of said two first codes in said memory when said tentative memory means becomes ready for storage of said two first codes.

10. A method of entering codes in a vehicle antitheft system which comprises an ignition key of a type having a built-in signal transmitter for transmitting a first code assigned to the ignition key as a code signal and code verifying means for reading in said first code of an ignition key of said type upon operation of said ignition key, comparing said first code read therein with a plurality of second codes registered in memory means and transmitting an engine actuation command to engine controlling means so as to permit said engine controlling means to perform control of operation of the engine when there is a specified relationship between said first code and any one of said second codes in said memory means, said code entry method comprising the steps of:

shifting said vehicle antitheft system to a code registration mode in which said second codes are registered in said memory means;

tentatively storing said first codes transmitted from said signal transmitter in order in tentative memory means in said code registration mode; and determining whether said tentative memory means is ready for storage of at least two said first codes different from each other; and registering said two first codes in said memory means when said tentative memory means is determined to be ready for storage of said two first codes.

11. A code entry method as defined in claim 10, wherein said step of shifting said vehicle antitheft system to said code registration mode compsises the steps of:

detecting that said memory means has no second code registered therein; and detecting that said code verifying means receives said first code from said signal transmitter of an ignition key.

12. A code entry method as defined in claim 10, and further comprising the steps of:

comparing a plurality of said first codes transmitted from said signal transmitter with one another in said code registration mode; and registering at least two said first codes determined to be different from each other in said memory means when said tentative memory means is determined to be ready for storage of said two first codes different from each other.

13. A code entry method as defined in claim 10, wherein said two first codes are registered in said memory means simultaneously when said tentative memory means becomes ready for storage of said two first codes.

14. A code entry method as defined in claim 10, wherein said step of shifting said vehicle antitheft system to said code registration mode compsises the steps of:

determining whether said code verifying means and said engine controlling means are unused; and said mode shift means shifts said vehicle antitheft system to said code registration mode when both said code verifying means and said engine controlling means are determined to be unused.

15. A method of entering codes in a vehicle antitheft system which comprises an ignition key of a type having a built-in signal transmitter for transmitting a first code assigned to the ignition key as a code signal and code verifying means for reading in said first code of an ignition key of said type upon operation of said ignition key, comparing said first code read therein with a plurality of second codes registered in memory means and transmitting an engine actuation command to engine controlling means so as to permit said engine controlling means to perform control of operation of the engine when there is a specified relationship between said first code and any one of said second codes in said memory means, said code entry method comprising the steps of:

shifting said vehicle antitheft system to a code registration mode in which said second codes are registered in said memory means;

tentatively storing said first codes transmitted from said signal transmitter in order in tentative memory means in said code registration mode; and determining whether said tentative memory means is ready for storage of two said first codes different from each other; and registering said two first codes in said memory means when said tentative memory means is determined to be ready for storage of said two first codes.

* * * * *